United States Patent [19]

Saito et al.

[11] Patent Number: 4,491,886
[45] Date of Patent: Jan. 1, 1985

[54] TAPE LOADING APPARATUS

[75] Inventors: Akiro Saito, Kanagawa; Naoki Kamaya; Junya Endo, both of Tokyo; Seisuke Ohba, Kanagawa; Akira Kumano, Tokyo; Yoshinori Ida, Kanagawa; Hideo Horie, Tokyo, all of Japan

[73] Assignee: Sony Corporation, Tokyo, Japan

[21] Appl. No.: 353,494

[22] Filed: Mar. 1, 1982

Related U.S. Application Data

[63] Continuation-in-part of Ser. No. 322,015, Nov. 16, 1981, abandoned.

[30] Foreign Application Priority Data

Nov. 17, 1980 [JP] Japan ................... 55-161802

[51] Int. Cl.³ .............................................. G11B 15/66
[52] U.S. Cl. .................................................... 360/85
[58] Field of Search ........................................ 360/85

[56] References Cited

U.S. PATENT DOCUMENTS 3,871,025 3/1975 Nakamoto ..................... 360/85
4,264,937 4/1981 Kabacinski .................... 360/85
4,357,639 11/1982 Hama et al. ................... 360/85

Primary Examiner—Robert S. Tupper
Attorney, Agent, or Firm—Lewis H. Eslinger; Alvin Sinderbrand

[57] ABSTRACT

A cassette-type tape recording and/or reproducing apparatus having a tape guide drum with a rotary head moved in a circular path substantially coinciding with the drum circumference, and a holder spaced from the guide drum and locating a tape cassette in an operative position at which a plane passing through the tape in the cassette is inclined in respect to the plane of rotation of the rotary head; is provided with a tape loading apparatus having a tape guiding element guided for movement in a path extending from a first position for engaging the tape in the operatively positioned cassette, to a second position spaced substantially from the first position and at which the engaged tape is wrapped about the circumference of the guide drum, with at least a portion of the path leading to the second position of the tape guiding element being inclined relative to the plane of rotation of the head so that the tape wrapped on the circumference of the guide drum is arranged substantially helically in respect to the latter, a drive ring rotatable in a plane substantially parallel to the plane passing through the tape in the operatively positioned cassette, and a connecting rod assembly extending between the drive ring and a movable base of the tape guiding element and through which the drive ring, moving in such plane of movement thereof, can effect movements of the tape guiding element in the path thereof between the first and second positions.

32 Claims, 56 Drawing Figures

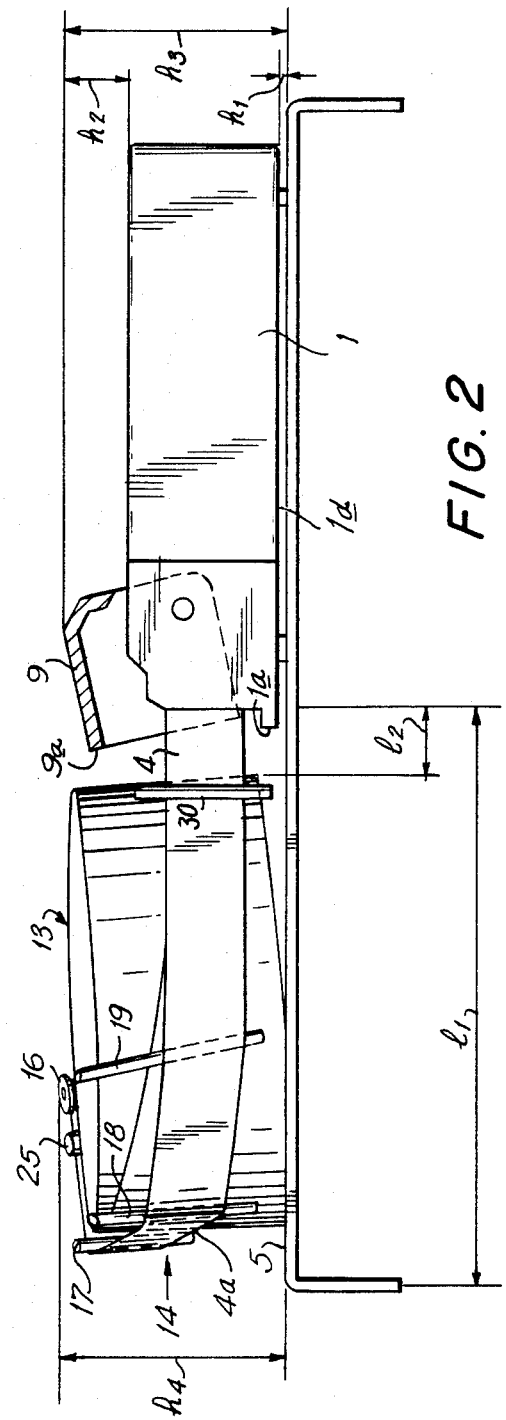
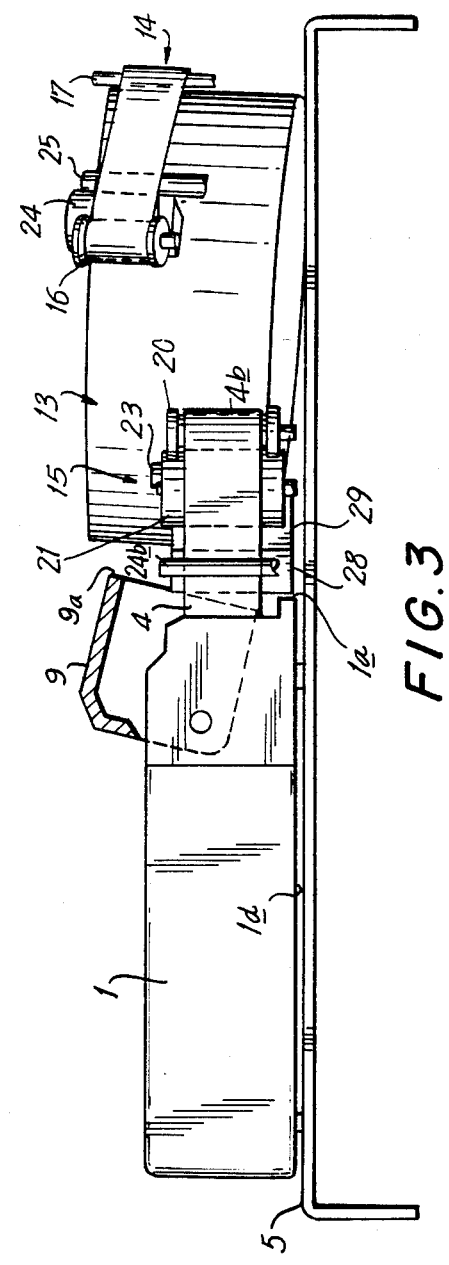

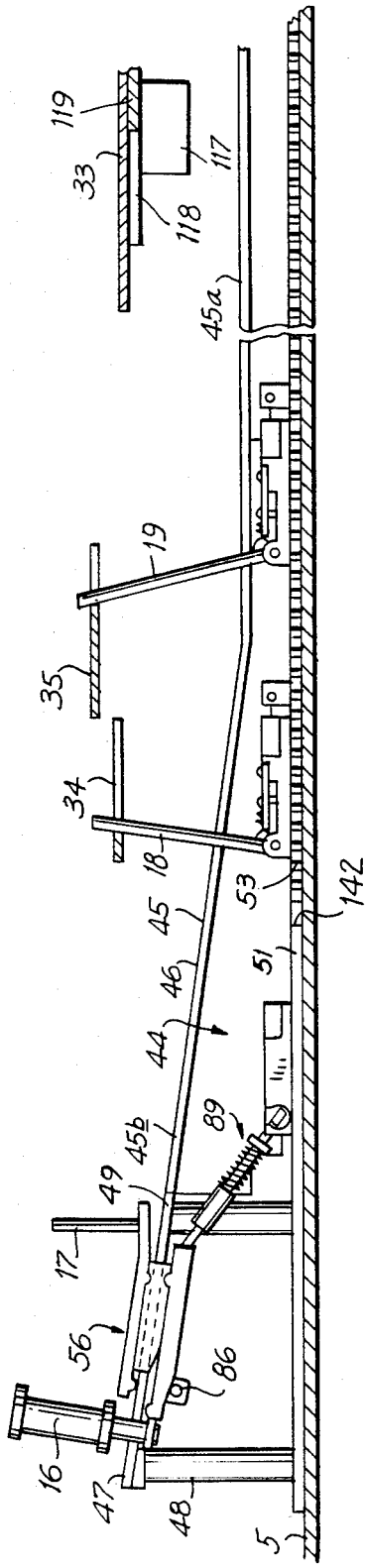

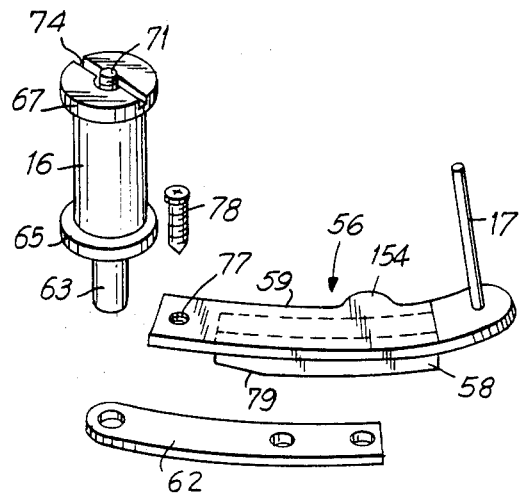
FIG. 11
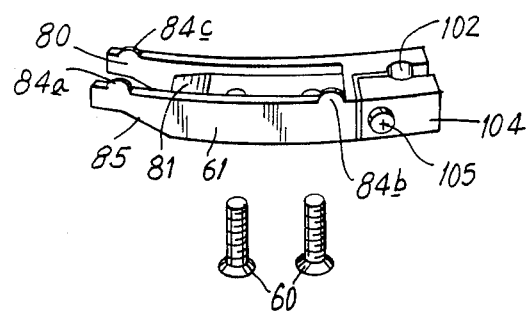
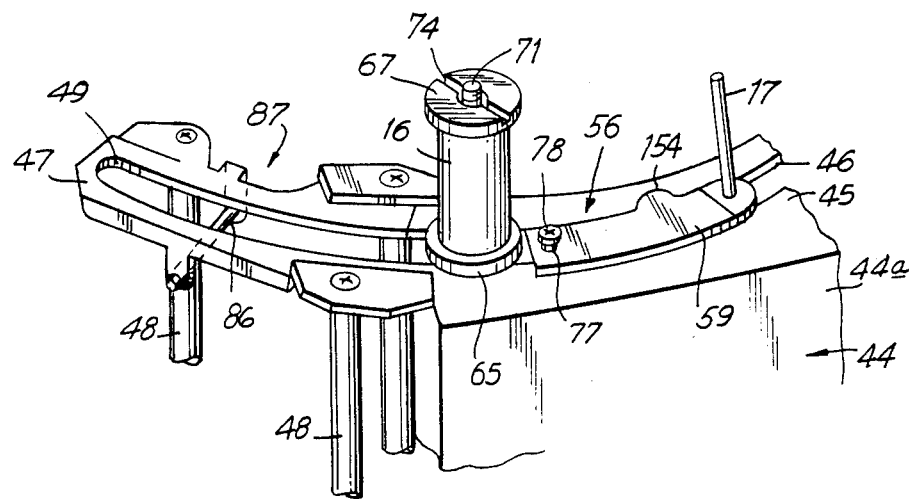
FIG. 12

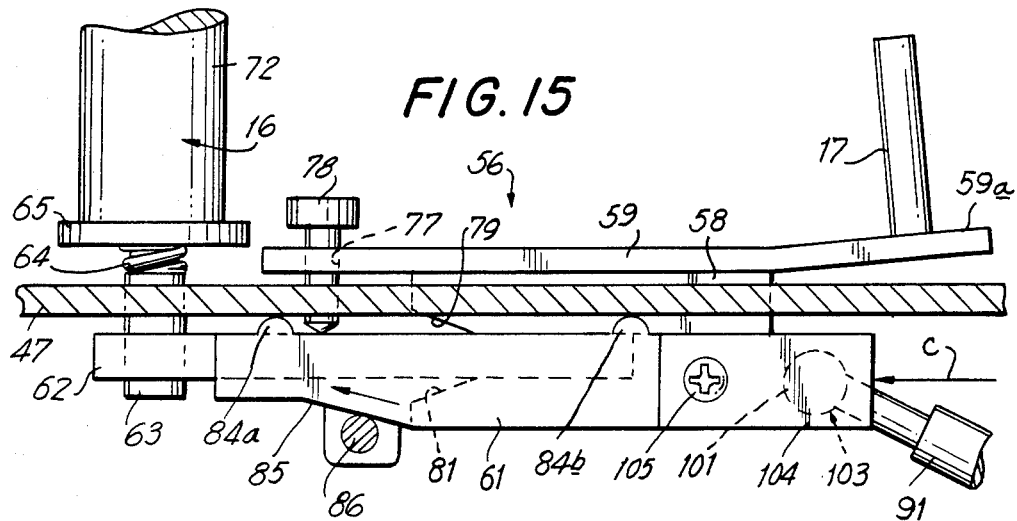
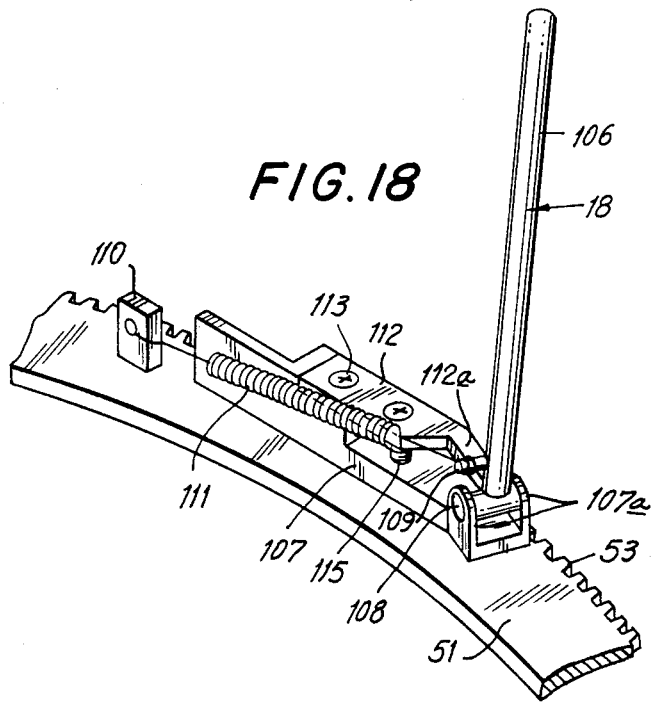

FIG.21
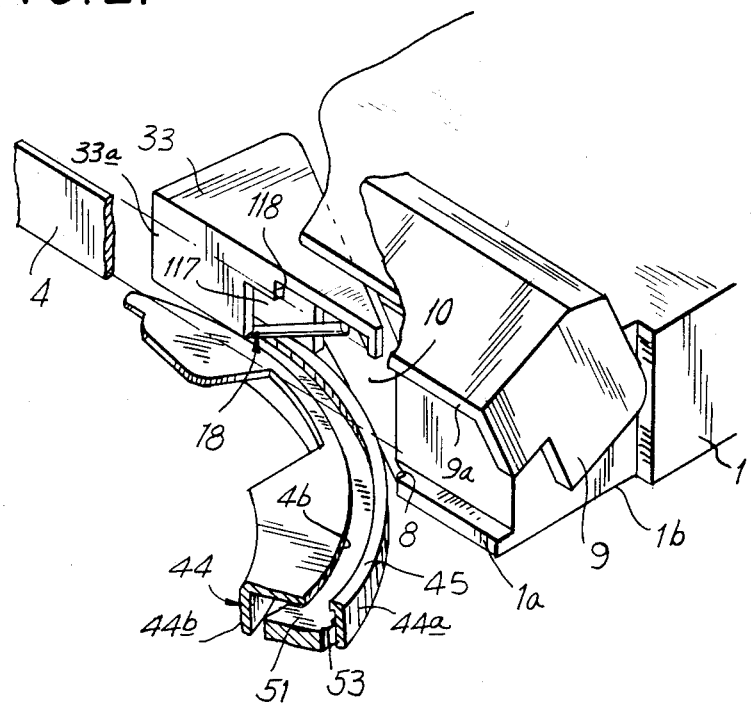
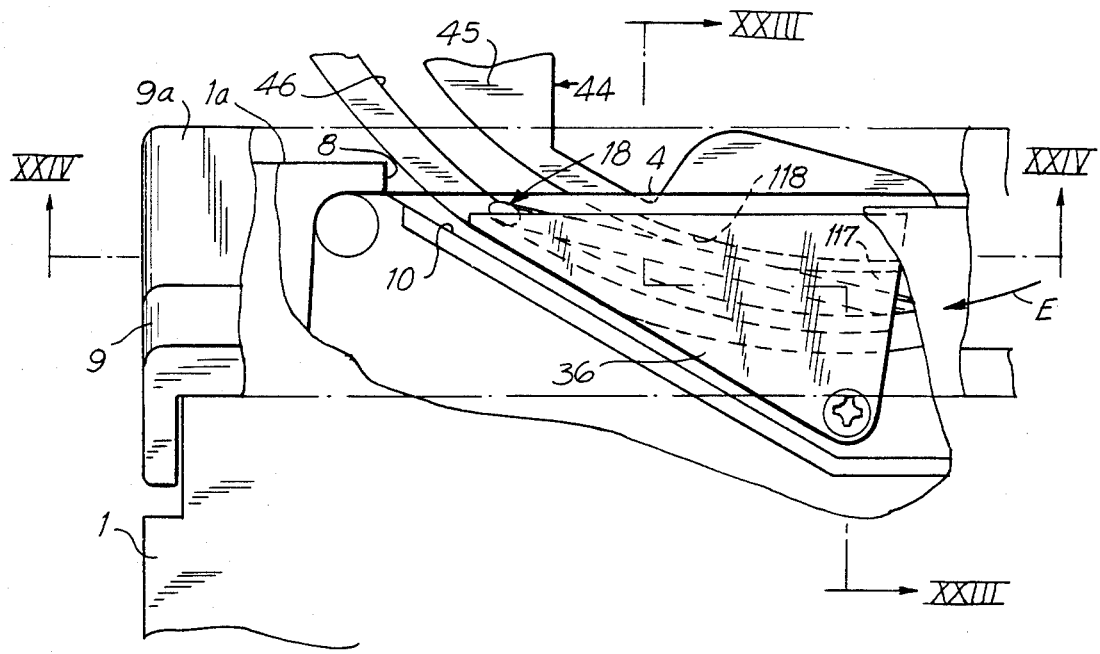
FIG.22

FIG. 23
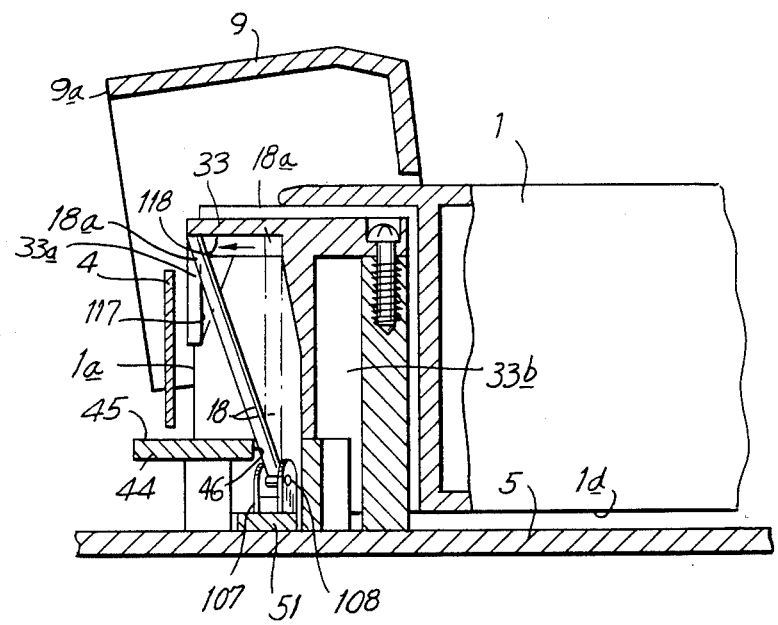
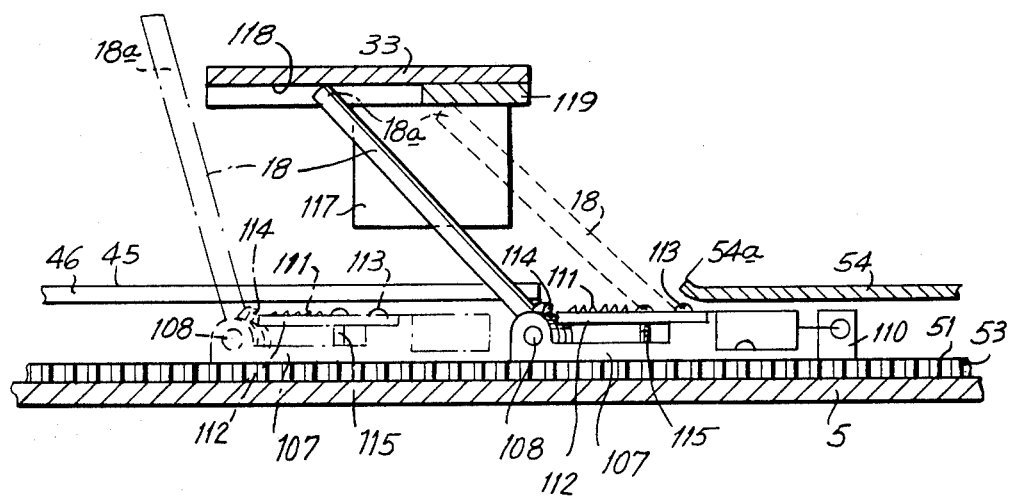
FIG. 24

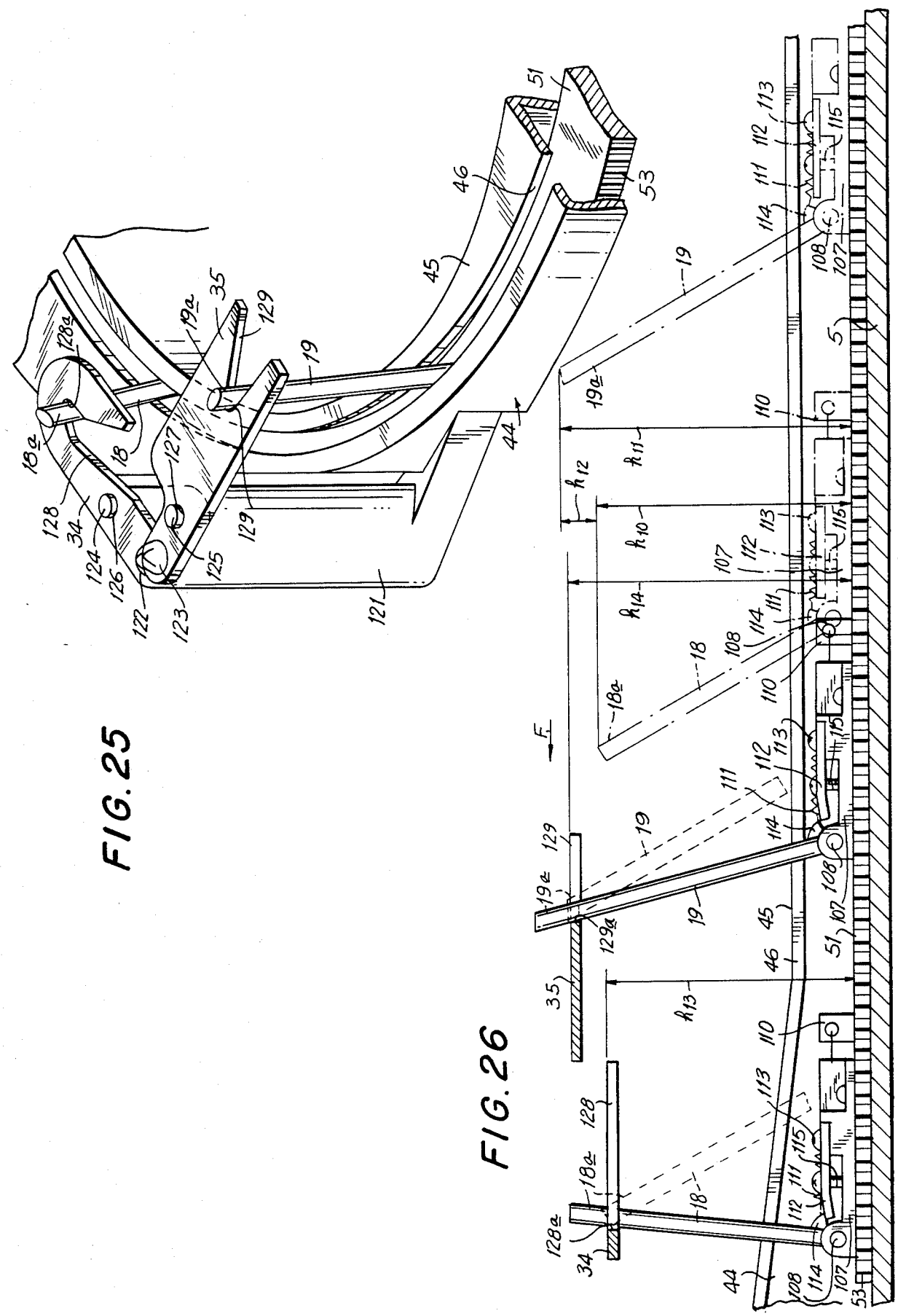

FIG.42
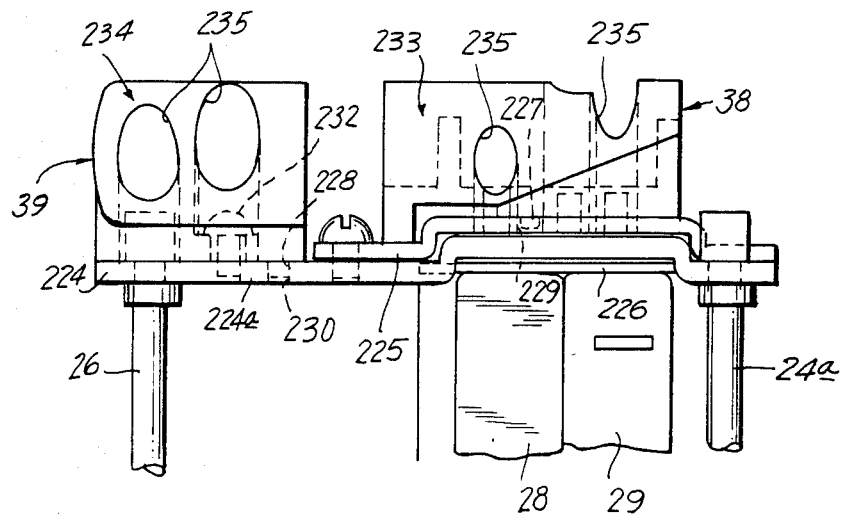
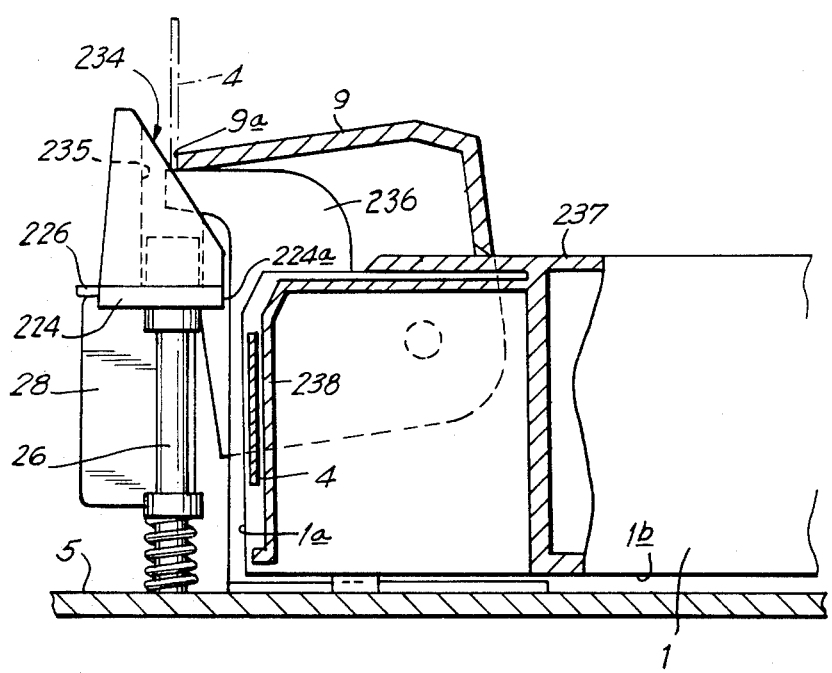
FIG.44

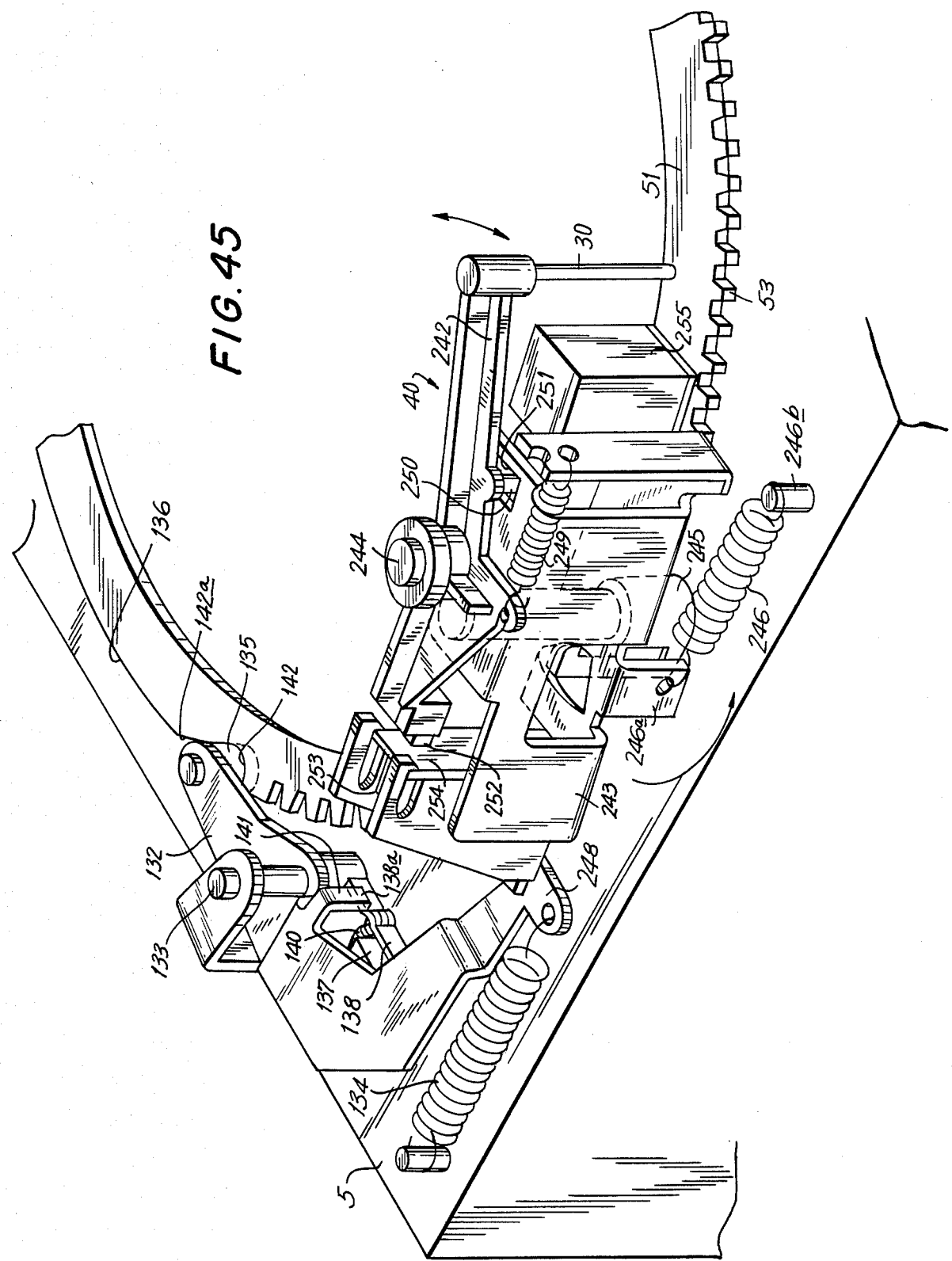

FIG. 49
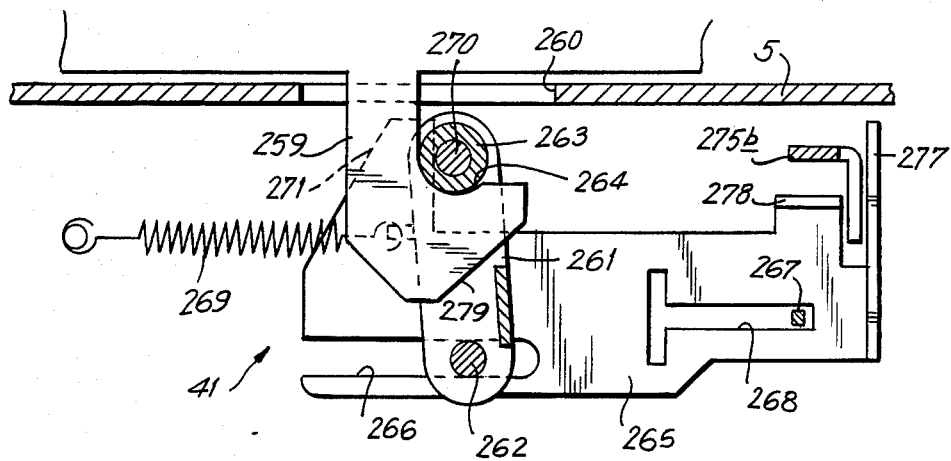
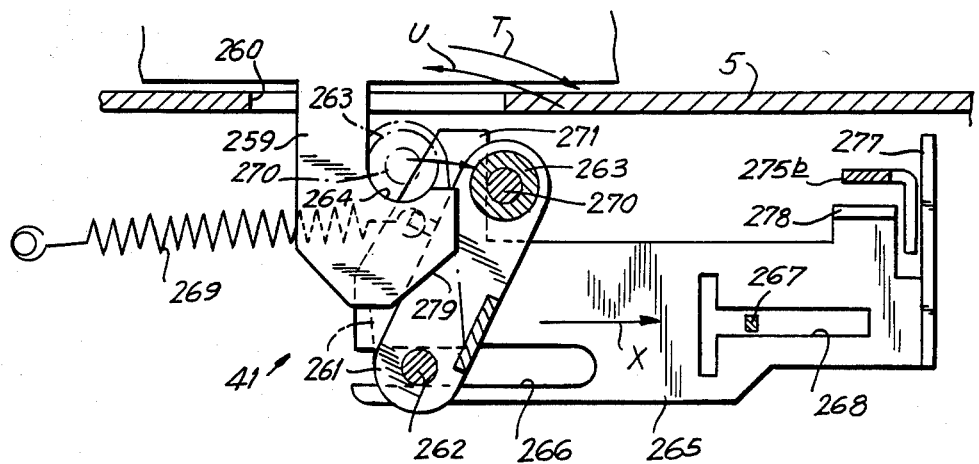
FIG. 50

TAPE LOADING APPARATUS

RELATED APPLICATION

This application is a Continuation-In-Part of our co-pending application Ser. No. 322,015, filed Nov. 16, 1981 now abandoned.

BACKGROUND OF THE INVENTION

Field of the Invention

This invention relates generally to a magnetic recording and/or reproducing apparatus, such as, a video tape recorder (VTR), and, more particularly, is directed to an improved apparatus for effecting automatic loading and/or unloading of the tape in a VTR.

Existing video tape recording and reproducing apparatus generally comprises a tape guide drum having a rotary magnetic head assembly associated therewith to record or reproduce video signals on or from a magnetic tape which is usually wound on supply and take-up reels contained in a cassette. In preparing such video tape recording and reproducing apparatus for operation, the tape extending between the supply and take-up reels must be withdrawn from the cassette and wrapped about at least a portion of the circumference of the tape guide drum for guiding thereby with respect to the rotary magnetic head assembly, and the withdrawn tape has to be positioned between a rotated capstan and a pinch roller so that the tape can be longitudinally driven by cooperation of the capstan and pinch roller and by suitable operation of the take-up reel.

One existing type of automatic tape loading and unloading apparatus is disclosed in U.S. Pat. No. 3,821,805, having a common assignee herewith, but it is inherent in such apparatus that the same cannot be embodied in a compact VTR.

A proposed arrangement of an automatic tape loading and/or unloading apparatus suitable for a compact VTR is disclosed in U.S. patent application Ser. No. 154,524, filed May 29, 1980, and also having a common assignee herewith. In such tape loading and/or unloading apparatus, there are provided a feed or supply side tape guide for wrapping tape withdrawn from an operatively positioned cassette helically about the peripheral surface of the tape guide drum, and a take-up side tape guide which is moved in a direction opposite to that of the feed or supply side tape guide with the tape guide drum therebetween. Although the foregoing arrangement makes it possible to provide an automatic tape loading and/or unloading apparatus which can be incorporated in a relatively compact VTR, there are a number of disadvantages, in that the structures for establishing the path of movement of the feed or supply side tape guide and for driving the same are undesirably complicated, and further in that the configuration of the path of movement of the feed side tape guide is restricted by various factors so that the optimum path for obtaining smooth movement of the tape guide and smooth guiding of the tape at the completion of loading is not attainable.

OBJECTS AND SUMMARY OF THE INVENTION

Accordingly, it is an object of this invention to provide an automatic tape loading and unloading apparatus for a VTR which avoids the above described problems associated with existing apparatus of that type.

More particularly, it is an object of this invention to provide an automatic tape loading and unloading apparatus which can be incorporated in an extremely compact VTR.

Another object of the invention is to provide an automatic tape loading and unloading apparatus, as aforesaid, which is relatively simple in construction, and which performs the tape loading and unloading operations in a smooth manner while avoiding uneven or concentrated stressing of the tape.

Still another object of the invention is to provide an automatic tape loading and unloading apparatus, as aforesaid, and which, at the completion of a tape loading operation, guides the tape by means of securely located and stabilized guide elements so as to avoid vibration of the tape during recording and reproducing operations of the associated VTR.

In accordance with an aspect of this invention, in a cassette-type tape recording and/or reproducing apparatus or VTR having a tape guide drum with at least one rotary transducer or head moved in a circular path substantially coinciding with the circumference of the guide drum, and a holder spaced from the guide drum for receiving a cassette and locating the latter in an operative position at which a plane passing through the tape in the cassette is inclined in respect to a plane of rotation of the rotary transducer; an automatic tape loading and unloading apparatus is provided with tape engaging means, such as, a substantially erect tape guiding element mounted on a movable base, for withdrawing tape from a cassette in the operative position and wrapping the withdrawn tape about at least a portion of the circumference of the guide drum, means, such as, a track member along which the movable base of the tape engaging means is slidable, for guiding the tape engaging means in a path extending from a first position adjacent a cassette in the operative position to a second position spaced substantially from said first position and at which the engaged tape is wrapped about said circumference of the guide drum, with at least a portion of such path leading to said second position being inclined relative to the plane of rotation of the rotary transducer so that the tape wrapped on the circumference of the guide drum is arranged substantially helically in respect to the guide drum, driving means, such as, a rotatable drive ring, for effecting movements of the tape engaging means between its first and second positions, such driving means being movable in a plane substantially parallel to the plane passing through the tape in the operatively positioned cassette, and connecting means extending between the driving means and the tape engaging means, for example, in the form of a connecting rod assembly pivotally connected at its opposite ends to the drive ring and to the movable base of the tape engaging means, and through which said driving means moving in said plane of movement thereof can effect movements of said tape engaging means in said path between said first and second positions.

Further, in a preferred embodiment of the invention, additional tape guiding elements are mounted at spaced apart locations on the driving means for movement with the latter between initial and operative positions corresponding to the disposition of the tape engaging means in the first and second positions, respectively, thereof, with each of the tape guiding elements being individually movable relative to the driving means between a supine condition and a substantially erect condition, and with guide means being operable on the tape guiding elements for disposing each of the latter in its supine condition at the respective initial position, and for moving each tape guiding element to its erect condition in moving with the driving means to the operative position of the respective tape guiding element.

In accordance with another aspect of this invention, the automatic tape loading and unloading apparatus further includes second tape engaging means for withdrawing tape from the operatively positioned cassette and leading the withdrawn tape adjacent a rotated capstan of the VTR, and means for guiding the second tape engaging means in a path lying in a plane parallel with the plane of movement of the driving means and extending from a first position adjacent the operatively positioned cassette to a second position at which the engaged tape is led adjacent the capstan, with the driving means being operative for effecting movements of the second tape engaging means between its first and second positions simultaneously with the movements of the first mentioned tape engaging means between the first and second positions of the latter.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 2 is a schematic side elevational view of the VTR at the tape feeding side thereof;

FIG. 3 is a schematic side elevational view of the VTR at the tape take-up side thereof;

FIG. 9 is an elevational view, partly in section, and developed in a flat plane for showing the feed side loading unit of the tape loading apparatus upon the completion of a tape loading operation;

FIG. 10 is a developed view similar to that of FIG. 9, but showing the feed side loading unit upon the completion of a tape unloading operation;

FIG. 11 is an exploded perspective view of the elements making up a movable base portion of the feed side loading unit;

FIG. 12 is a perspective view of the assembled movable base portion which is shown disposed near its operative position;

FIG. 15 is an enlarged sectional view taken along the line XV—XV on FIG. 13;

FIG. 18 is a perspective view of one of a plurality of collapsible tape guiding elements included in the feed side loading unit, and which is shown in an erect position;

FIG. 21 is a partially cut away perspective view showing a control guide by which movements of the collapsible tape guiding elements of the feed side loading unit are controlled, particularly in the region of a tape cassette;

FIG. 22 is an enlarged, fragmentary plan view, which is partially cut away for showing details of the control guide of FIG. 21;

FIG. 23 is a fragmentary sectional view taken along the line XXIII—XXIII on FIG. 22;

FIG. 24 is a fragmentary sectional view taken along the line XXIV—XXIV on FIG. 22;

FIG. 25 is a perspective view of a positioning plate assembly by which the collapsible tape guiding elements of the feed side loading unit are securely maintained in their operative positions;

FIG. 26 is an elevational view, partly in section, and developed on a flat plane of the tape guiding elements of the feed side loading unit when moving to, and at their respective operative positions;

FIG. 42 is a front elevational view of the tape guiding assembly shown on FIG. 41;

FIGS. 43 and 44 are side elevational views of the tape guiding assembly of FIGS. 41 and 42 and illustrating the operation thereof in cooperation with a cassette shown in section during the movement of such cassette to its operative or loaded position;

FIG. 45 is a perspective view of a tension detecting unit included in the VTR having a tape loading apparatus according to this invention;

FIGS. 49 and 50 are partially cut away side elevational views showing a portion of the cassette holder locking unit conditioned for locking the cassette holder in its lowered or operative position, and for releasing the cassette holder, respectively;

DESCRIPTION OF A PREFERRED EMBODIMENT

Figure 1:
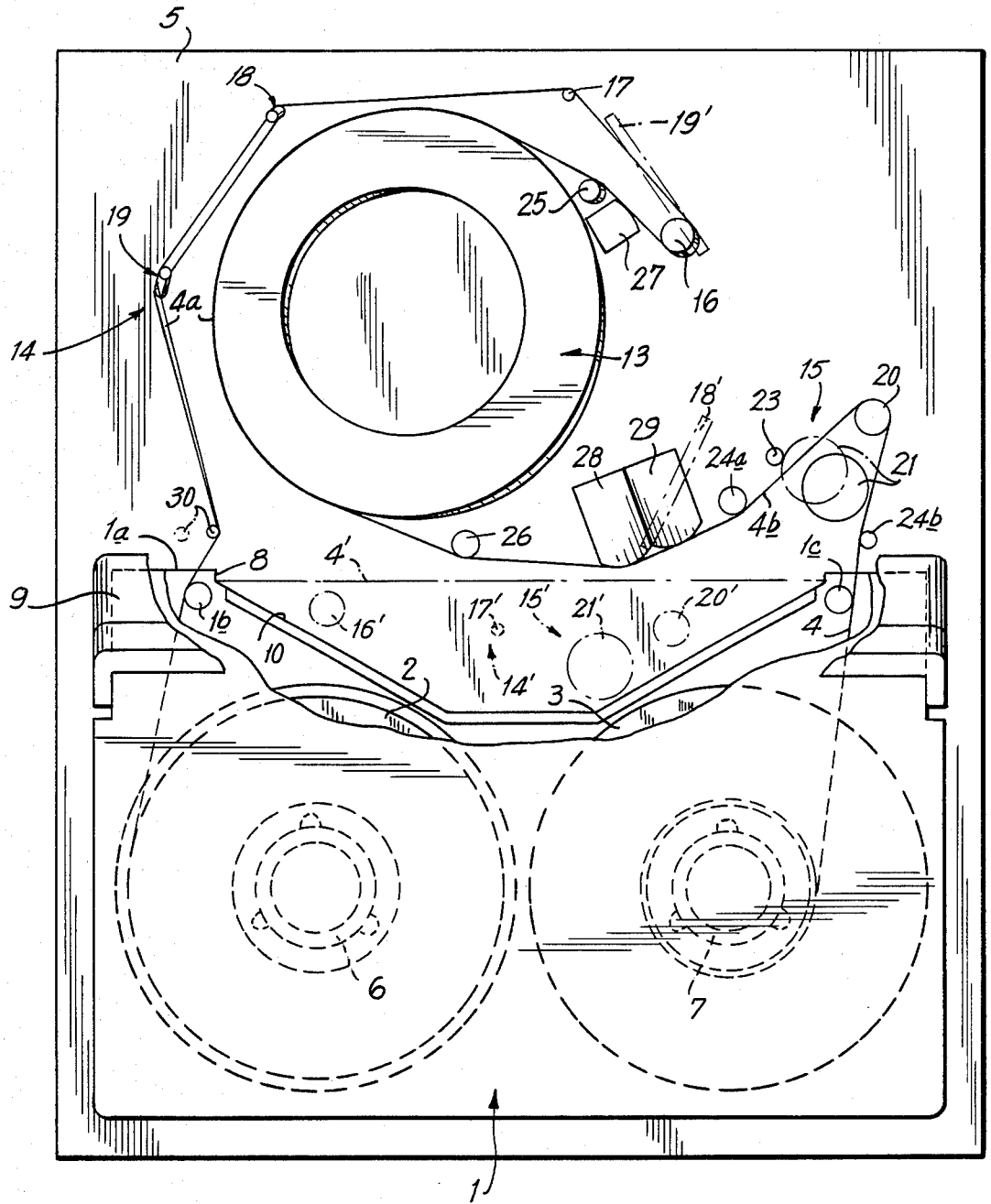
FIG. 1 is a schematic plan view illustrating the guided path of a magnetic tape in a VTR having a tape loading apparatus according to an embodiment of this invention, and showing the tpae in its loaded state.

A tape loading apparatus according to one embodiment of the present invention, as incorporated in a magnetic recording and/or reproducing apparatus, particularly, a helical type VTR, will initially be described in a brief or outline manner with reference to FIGS. 1-4. Such VTR employs interchangeable tape cassettes, one of which is indicated at 1 and shown to include supply and take-up reels 2 and 3 rotatably arranged side-by-side within the cassette 1. A magnetic tape 4 is wound on reels 2 and 3 and extends therebetween about suitable guides 1b and 1c in the cassette so that a run 4' of the tape 4 will extend along one side 1a of the generally rectangular cassette 1 when the latter is not in use. The VTR includes the usual cassette loading mechanism (not shown) which is movable to receive the cassette 1 in an elevated position and then dispose the cassette in an operative horizontal position close to a horizontal chassis 5 of the VTR. In such operative horizontal position of cassette 1, the reels 2 and 3 are engaged with a feed reel mount 6 and a take-up reel mount 7 disposed on chassis 5. During movement of cassette 1 to its inoperative position on chassis 5, a lid 9 of cassette 1 is opened upwardly to uncover a front opening 8 of the cassette extending along the side 1a thereof, and hence to expose the run 4' of the tape. Further, the cassette 1 is shown to have a cut out 10 formed in its underside 1d and communicating with the front opening 8.

The VTR of FIGS. 1-4 is further shown to include a rotary head drum 13 disposed in an inclined manner on chassis 5 in front of the operatively positioned cassette 1 and having one or more rotary magnetic heads (not shown on FIGS. 1-4) by which video signals can be recorded on and/or reproduced from the magnetic tape 4 when the latter is wrapped helically about at least a portion of the periphery of drum 13. The tape loading apparatus according to this invention generally comprises a feed side loading unit or mechanism 14 engageable with the tape run 4' in the operatively positioned cassette 1 and operative, in a loading operation, for drawing the tape from cassette 1 generally near the side of the latter housing the supply reel 2, and a take-up side loading unit or mechanism 15 also engageable with the tape run 4' and being operative, during a loading operation, to withdraw the tape from the portion of cassette 1 housing take-up reel 3. The feed side loading unit 14 generally includes four movable tape guiding elements 16, 17, 18 and 19 which occupy the positions shown in full lines on FIG. 1 at the completion of a tape loading operation, and are movable thereto from their respective initial or inoperative positions indicated in broken lines at 16', 17', 18' and 19', respectively. The take-up side loading unit 15 is shown to include one movable tape guiding element 20 which, at the completion of a tape loading operation, occupies the position shown in full lines on FIG. 1, and also a pinch roller 21 which is in following relation to the tape guiding element 20 during movement of the tape guiding element 20 and pinch roller 21 to their positions shown in full lines on FIG. 1 from their initial or inoperative positions indicated in broken lines at 20' and 21', respectively. The tape guiding elements 16 and 17 of feed side loading unit 14, and the tape guiding element 20 and pinch roller 21 of take-up side loading unit 15 are substantially erect in their inoperative or initial positions indicated at 16', 17', 20' and 21', respectively, as well as in the positions occupied thereby at the completion of a loading operation. However, the tape guiding elements 18 and 19 of feed side loading unit 14 are collapsible so as to occupy substantially supine initial positions, as at 18' and 19', and to be erected or raised for guiding action on the tape 4 in the course of the loading operation as hereinafter described in detail.

Suitably mounted above chassis 5 are a capstan located to be adjacent pinch roller 21 in the operative position of the latter, a fixed tape guide 24a located to lead a run 4b of the tape between pinch roller 21 and capstan 23 to movable tape guide 20 in the operative position of the latter, and a fixed tape guide 24b located to lead the tape from tape guide 20 back to the guide 1c in cassette 1 at the take-up side of the latter. Also suitably mounted above chassis 5 are tape guides 25 and 26 fixedly located adjacent drum 13 for leading the tape tangentially to and from the peripheral surface of drum 13 at points which are approximately diammetrically opposed so that the tape will be wrapped about a little more than a 180° angular extent of the drum, as at 4a. A full width erase head 27 is mounted on chassis 5 so as to engage the tape at the completion of a tape loading operation between guiding element 16 and fixed tape guide 25 for erasing all signals previously recorded on the tape, that is, any video signals recorded in oblique tracks, any audio signals recorded in one or more respective tracks extending longitudinally along one edge portion of the tape, and any control or CTL signals recorded in a track extending longitudinally along the opposite edge of the tape. An audio erase head 28 and a combined head 29 for recording and reproducing audio signals and for recording and reproducing CTL signals are also suitably mounted above chassis 5 for engagement with the tape 4 between guides 26 and 24a upon the completion of a tape loading operation. The head 28 is selectively employed to erase only recorded audio signals, for example, when it is desired to edit or change the audio associated with recorded video, and the head 29, which is disposed downstream relative to the erase head 28, considered in the direction of movement of tape 4 during recording and reproducing operations of the VTR, is employed for recording and reproducing the audio signals and/or for recording and reproducing the CTL signals utilized in the usual servo mechanisms of the VTR. Further, at the completion of a loading operation, a tension detecting pin 30 engages the tape between guiding element 19 of the feed side loading unit 14 and the guide 1b at the respective side of cassette 1 for detecting the tension in the tape being unwound from supply reel 2 and, as hereinafter described, for correspondingly varying the resistance to turning of the supply reel so as to maintain a substantially constant tension.

As previously noted, upon the completion of an unloading operation of the tape loading apparatus according to this invention, the various movable tape guiding elements are in the positions indicated in broken lines at 16'-20' and the pinch roller is in the position indicated in broken lines at 21', with tape guiding elements 18' and 19' being supine. With the movable tape guiding elements 16'-20' and the pinch roller 21' being thus positioned, a cassette 1 is brought down from above to its horizontal operative or loaded position, with the result that the tape guiding elements 16', 17' and 20' and the pinch roller 21' project upwardly through the cut out 10 at the bottom of the cassette 1 and are positioned in back, or at the inside of run 4' of the tape in the cassette.

After the cassette 1 has been disposed in its loaded or operative position, a tape loading operation may be initiated to cause tape guiding elements 16-19 of feed side loading unit 14 to move in a generally clockwise direction about drum 13 from the previously described initial positions indicated at 16'-19'. In synchronism with such movement of tape guiding elements 16-19, the movable tape guiding element 20 and pinch roller 21 of the take-up side loading unit 15 are moved in a generally counterclockwise direction about drum 13 from their initial positions indicated at 20' and 21'. In the course of such movements, the tape 4 in cassette 1 is engaged successively by guiding elements 16-19 at the tape feed side, and by guiding element 20, at the take-up side, whereby loops of the tape 4 are drawn out from the front opening 8 of the cassette 1 at the left-hand and right-hand portions of such opening, as viewed on FIG. 1. It will be appreciated that, in moving from their initial positions indicated in broken lines at 18' and 19' on FIG. 1, the collapsible tape guiding elements 18 and 19 are maintained in their supine or collapsed conditions, as hereinafter described in detail, so as to move, in succession, under heads 28 and 29 and under the tape being drawn out by movable tape guiding element 20 for entry into the operatively positioned cassette 1, whereupon, the tape guiding elements 18 and 19 are made to rise in succession to increasingly erect orientations for engagement with the tape extending between guide 1a in the cassette and movable guiding element 16.

Figure 4:
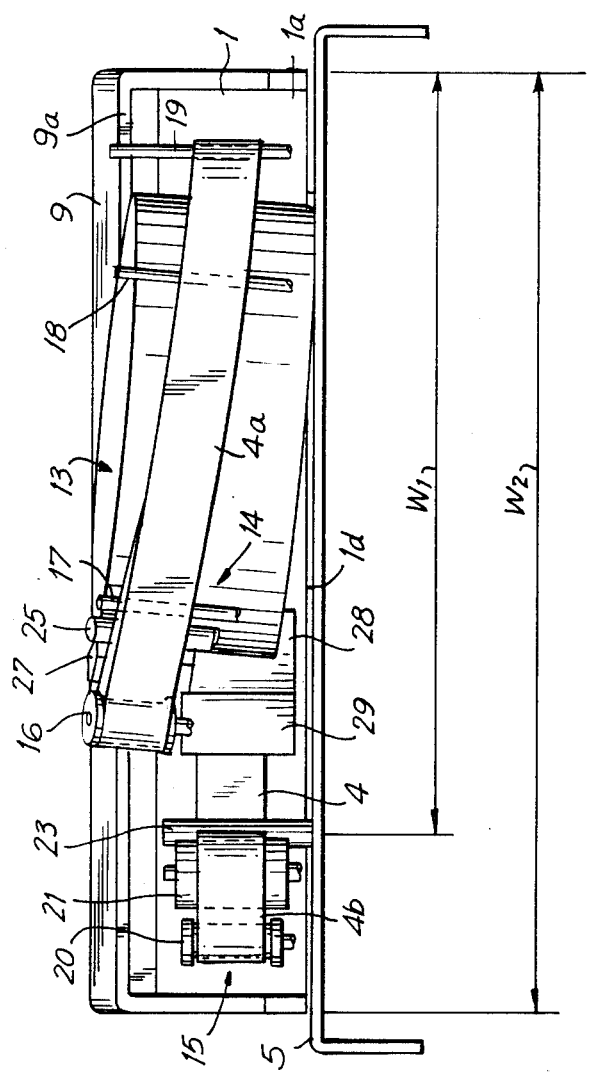
FIG. 4 is a schematic rear elevational view of the VTR with the tape in its loaded state.

As is particularly apparent on FIGS. 2 and 4, as the tape guiding elements 16 and 17 of feed side loading unit 14 are drawn out from the front opening 8 of cassette 1 and move in a clockwise direction about drum 13, such tape guiding elements 16 and 17 initially move in a curved path lying in a horizontal plane, that is, a plane parallel to the underside 1d of cassette 1, and then the arcuate path of tape guiding elements 16 and 17 is inclined upwardly until, at the completion of a loading operation, the tape guiding element 16, in its final or operative position, is substantially elevated in respect to chassis 5 and disposes the tape engaged thereby near to the upper portion of drum 13, as shown particularly on FIG. 4. Thus, the tape 4 being drawn out of cassette 1 past guide 1b in the latter, is initially withdrawn substantially horizontally from the front opening 8 and is then wound or wrapped gradually against the peripheral surface of drum 13 while being lifted or raised gradually in the axial direction of the drum, that is, from the lower portion to the upper portion of the latter. On the other hand, and as clearly shown on FIGS. 3 and 4, the tape guiding element 20 of take-up side loading unit 15 moves in an arcuate path lying in a horizontal plane so that, at the take-up side of cassette 1, the tape 4 is withdrawn from the front opening 8 in the horizontal direction.

When the tape guiding elements 16–20 and pinch roller 21 have attained their respective operative positions indicated in full lines on FIG. 1, the loading of the tape 4 on drum 13 is completed. At the completion of the tape loading operation, the tape 4 extending from supply reel 2 of cassette 1 passes full width erase head 27 and then is wrapped helically, as indicated at 4a, on the peripheral surface of drum 13 for an angular extent of 180°+a, and the tape extending from drum 13 runs horizontally past audio erase head 28, combined CTL and audio recording and reproducing head 29 and capstan 23 before being guided back to take-up reel 3. Further, in the course of the loading operation, the tension detecting pin 30 is moved from its inoperative or initial position, indicated in broken lines at 30', to its operative position shown in full lines on FIG. 1. After completion of the loading operation, a recording or reproducing mode of the VTR may be established, for example, in response to actuation of a corresponding push-button (not shown), so as to bring pinch roller 21 into pressure contact with capstan 23, as shown in broken lines on FIG. 1, whereby the tape is driven between rotated capstan 23 and pinch roller 21. Thus, the driven tape is unwound from supply or feed reel 2 and passes full width erase head 27 prior to moving about the periphery of drum 13 and then passing heads 28 and 29 before being rewound on take-up reel 3. In the recording mode of the VTR, head 27 is made operative to erase any signals previously recorded on the tape, whereupon the rotary head or heads associated with drum 13 record video signals in oblique tracks on the tape and head 29 records associated audio signals and CTL signals in the respective longitudinal tracks. In the reproducing mode of the VTR, the full width erase head 27 is made inoperative and the rotary head or heads associated with drum 13 reproduce the video signals, while head 29 reproduces the associated audio and CTL signals. Upon the completion of a recording or reproducing operation of the VTR, an eject push-button (not shown) may be actuated to cause the return of tape guiding elements 16–20 and pinch roller 21 to their respective initial positions, whereby the tape 4 is unloaded from drum 13 and returned to cassette 1 to permit ejection of the latter.

Figure 5:
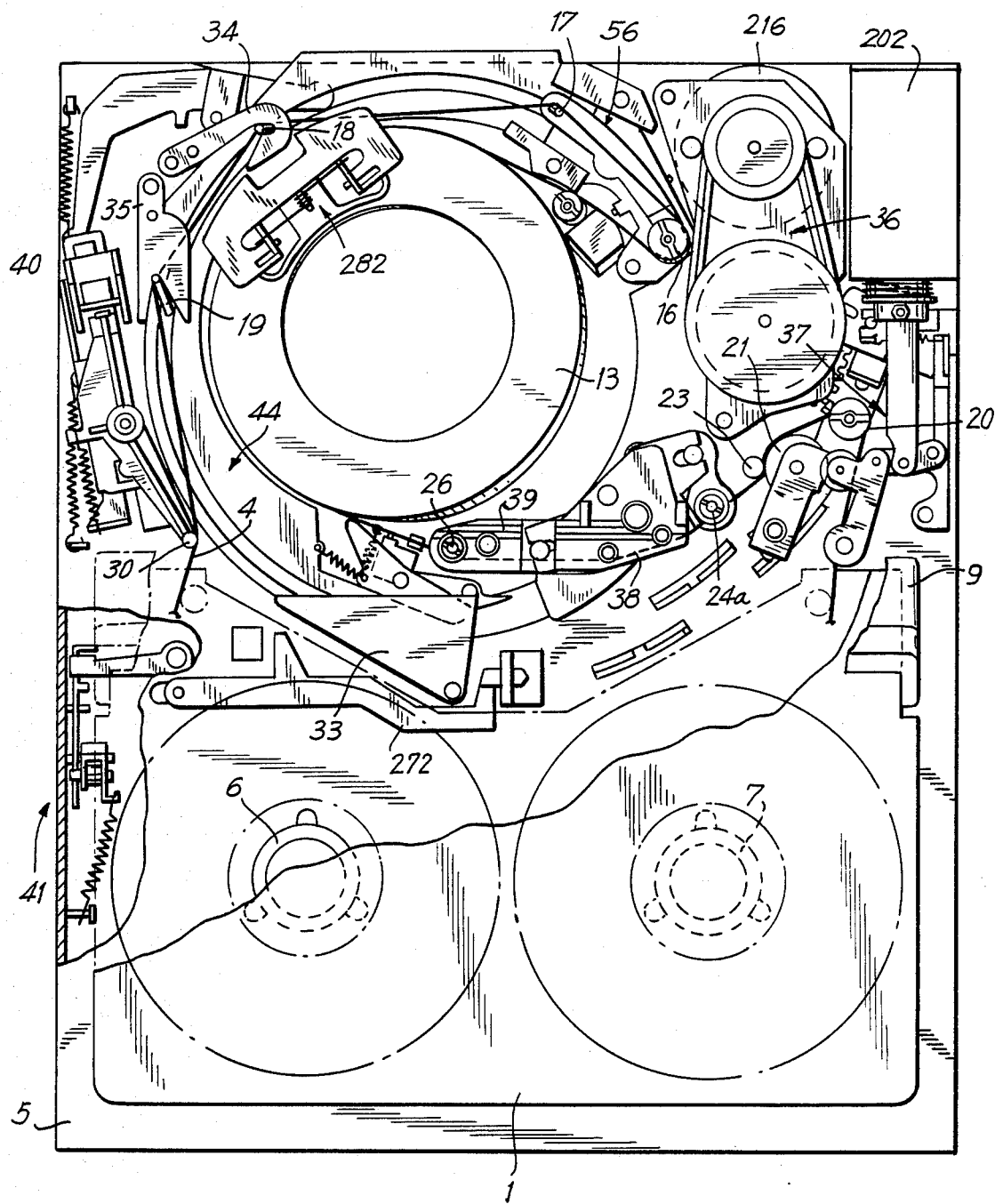
FIG. 5 is a top plan view, which is partly cut away and in section, of the VTR having a tape loading apparatus according to an embodiment of the invention, and which shows the relative dispositions of the major components of such tape loading apparatus with the tape in its loaded state.

In addition to the loading units 14 and 15 which effect the previously described movements of the respective tape guiding elements, the tape loading apparatus according to this invention preferably also comprises the following components which will now be described with reference to FIG. 5. More particularly, a rising motion guide 33 is shown to be located on chassis 5 so as to extend upwardly into the cutout 10 in the bottom of the operatively positioned cassette 1, and such guide 33 is adapted to control the rising or upward swinging movements of the tape guiding elements 18 and 19 as the latter move under the front portion of cassette 1 and into contact with the tape 4 being withdrawn from the latter. As the tape guiding elements 18 and 19 near their respective operative positions, such elements 18 and 19 are respectively engaged by positioned plates 34 and 35 which positively establish the orientations of the operatively positioned guiding elements 18 and 19. At one side of drum 13, a driving unit 36 is mounted on cassette 5 for driving both loading units 14 and 15. Adjacent driving unit 36 there is disposed a pinch roller pressing unit 37 which is operative in the recording or reproducing mode of the VTR to press pinch roller 21 against rotated capstan 23 with the tape 4 therebetween for driving the tape. Head shielding tape guides 38 and 39 are mounted above heads 28 and 29 and the fixed tape guide 26 and are slidably engageable by the tape in cassette 1 to prevent hang up of the tape thereon during loading of the cassette, as hereinafter described in detail. A tension detector 40 is associated with the tension detecting pin 30, and a cassette holder locking unit 41 is provided to prevent removal of a cassette from its operative position other than upon completion of a tape loading operation.

Figure 6:
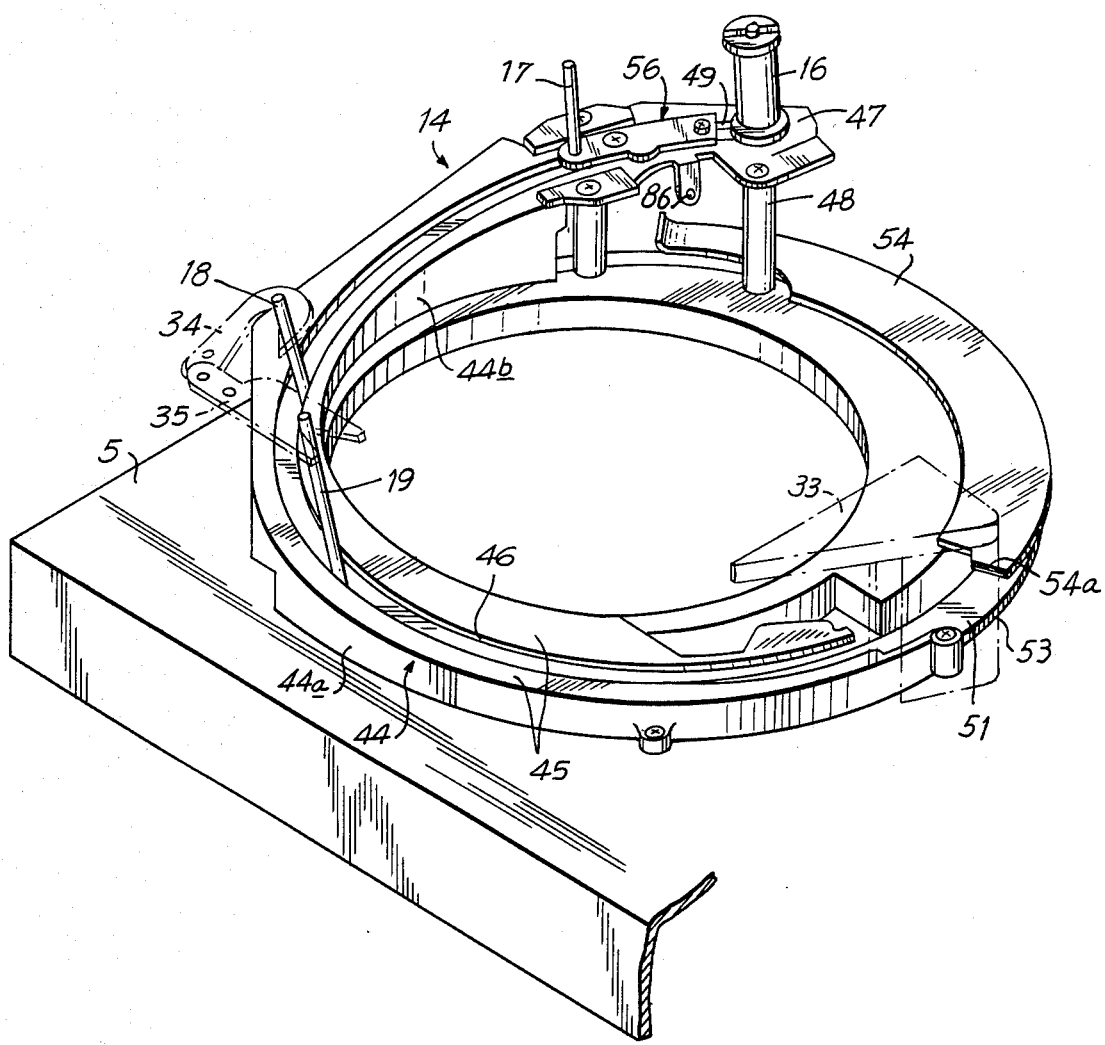
FIG. 6 is a perspective view of a guide assembly included in a feed side loading unit of the tape loading apparatus according to this invention.
Figure 7:
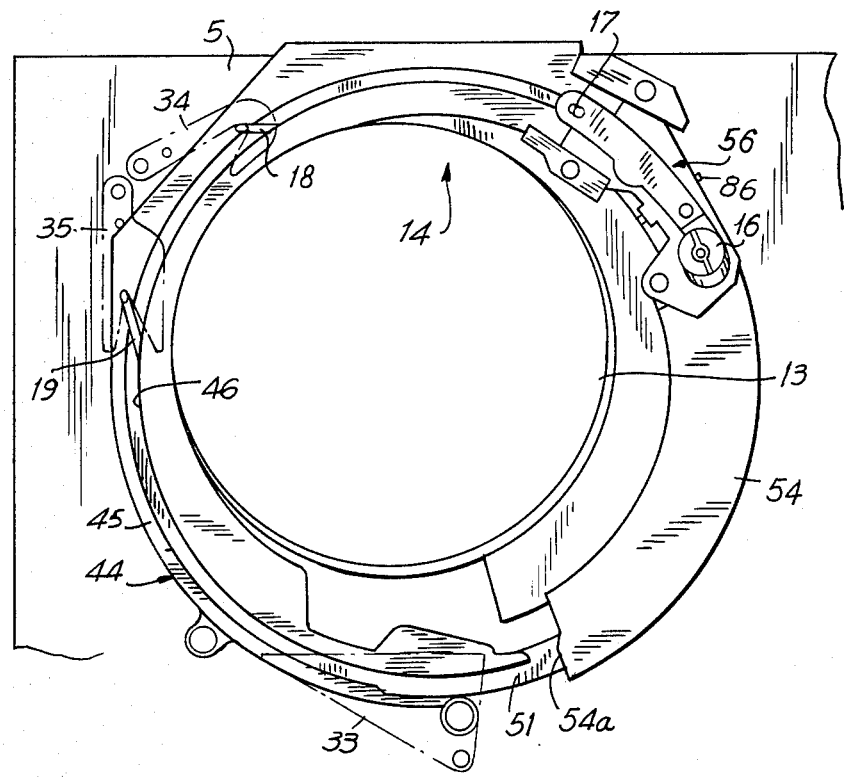
FIG. 7 is a plan view of the guide assembly of FIG. 6.

Referring now to FIGS. 6 and 7, it will be seen that the feed side loading unit 14 comprises a guide track member 44 which may be molded from a synthetic resin and is mounted on chassis 5. Guide track member 44 is generally of inverted U-shaped cross section so as to have arcuate outer and inner side walls 44a and 44b (FIGS. 6 and 21) between which there extends a curving top wall 45 having a similarly curving slot 46 extending therealong. The curved guide track member 44 extends in a clockwise direction, as viewed from above, about drum 13 from a position below the cut out 10 in the underside of an operatively positioned cassette. As is particularly evident in the developed view of FIG. 9, an initial end portion 45a of the top wall 45 of track member 44, that is, the end portion thereof which extends from under an operatively positioned cassette, is horizontal and in relatively close proximity to the chassis 5. The remaining portion 45b of top wall 45 extending from approximately the operative position of tape guiding element 19 is inclined gently upward to the end of track member 44 which is remote from the operatively positioned cassette 1. Adjacent to the end of track member 44 which is remote from the operatively positioned cassette 1, a metal guide plate 47 is rigidly supported on posts 48 extending from chassis 5 so as to dispose plate 47 in flush and similarly inclined relation to the adjacent end portion 45b of wall 45. The guide plate 47 is formed with a guide slot 49 opening at one end of plate 47 in registry with the slot 46 of guide track member 44.

A circular drive ring 51 (FIG. 8) which is eccentric in respect to drum 13 is rotatable on chassis 5 between the outer and inner side walls 44a and 44b of guide track member 44 (FIG. 21). Ring 51 is supported for such rotation in a horizontal plane, for example, by means of three equally spaced apart flanged guide rollers 52 (FIG. 8) rotatably mounted on chassis 5. A substantial portion of the outer periphery of ring 51 is formed with teeth to define a peripheral gear 53 through which ring 51 may be turned, as hereinafter described in detail, for providing a tape loading or unloading operation of the apparatus. As shown particularly on FIGS. 7 and 10, for the purpose of maintaining tape guiding elements 18 and 19 substantially supine when in their inoperative positions and when moving toward and away from such positions, a relatively thin guide depressing plate 54, for example, of stainless steel, which is laterally curved, extends substantially horizontally in relatively close proximity to chassis 5 above ring 51 from approximately the location of guide plate 47 to approximately the end of guide track member 44 extending under cassette 1.

Referring now to FIGS. 11–15, it will be seen that the movable tape guiding elements 16 and 17 are mounted on a movable base portion 56 which is adapted to be moved along the upper wall surface 45 of track member 44 while being guided by slot 46 thereof. The movable base portion 56 is shown to include an upper block 59 adapted to slide on the upper surface of wall 45 and plate 47 and being formed with a depending, integral projection 58 which is laterally curves so as to be received in, and movable along slots 46 and 49. Movable base portion 56 further includes a lower block 61 adapted to be disposed at the under side of wall 45 and secured to projection 58 by means of set screws 60. A relatively thick guide supporting metal plate 62 has one end portion secured between projection 58 and lower block 61 by means of the set screws 60. The other or free end portion of plate 62 projects longitudinally beyond blocks 59 and 61 so as to be cantilevered and somewhat resilient, and a supporting shaft 63 is suitably secured at its lower end in such free end portion of plate 62 and projects upwardly therefrom. A helical compression spring 64 extends around the lower end portion of shaft 63 below a cupped hub 65a of a lower flange member 65. A sleeve 66 is slidable on shaft 63 above flange member 65, and an upper flange member 67 has a hub 67a formed with a threaded bore 68 which is screwed on a threaded upper end portion 69 of shaft 63 so that hub 67a axially abuts the adjacent end of sleeve 66. Upper flange member 67 further has a central, reduced diameter bore 70 which is threaded and opens into threaded bore 68 to receive a locking screw 71 adapted to press axially against the upper end of shaft 63. The tape guiding element 16 is shown to be constituted by a roller 72 which is rotatable on sleeve 66 between the upper and lower flange members 67 and 65. Preferably, and as shown particularly on FIG. 14, roller 72 includes a relatively thick cylindrical central portion 73 having an axial length slightly smaller than that of sleeve 66 and closely engaging the latter with upper and lower shoulders of cylindrical portions 73 being adapted to oppose or confront the cup-shaped hub 65a of lower flange member 65 and the hub 67a of upper flange member 67 for axially locating roller 72. Further, a slot or groove 74 is formed diametrically in the upper surface of upper flange member 67 for receiving a screw driver or similar tool by which upper flange member 67 may be rotated relative to shaft 63.

It will be appreciated that the above described construction for constituting tape guiding element 16 and mounting the latter on movable base portion 56 forms a height adjusting unit 75 for element 16. More particularly, turning of upper flange member 67 relative to shaft 63 will, by reason of threads 69, cause vertical movement of flange member 67. Since spring 64 continuously urges lower flange member 65 and sleeve 66 upwardly against upper flange member 67, the described vertical movement of the latter will cause adjustments of the height of tape guiding element 16 in the direction of arrow A on FIG. 14. After such adjustment has been effected, lock screw 71 may be tightened against the upper end of shaft 63 for securing upper flange member 67 in its adjusted position.

A threaded hole 77 is formed centrally in an end portion of upper block 59 which overlies the cantilevered or free end portion of guide supporting plate 62, and an adjusting screw 78 is threadably inserted in such hole 77 from above to engage, at its lower end, with the upper surface of plate 62. Preferably, the lower surface of the projection 58 of upper block 59 has a bevel or inclination 79 at the end thereof from which plate 62 extends, and the corresponding end portion of lower block 61 has a notch 80 to which an inclined end surface 81 extends so that the inclined end surfaces 79 and 81 and the notch 80 will permit flexing of the free end portion of plate 62, as indicated by the broken lines on FIG. 14.

It will be understood that the mounting of tape guiding element 16 on movable base portion 56 by way of cantilevered plate 62 and the screw 78 acting against such plate 62 provides a tilt adjusting unit 82. More particularly, by adjusting screw 78, the free end portion of guide supporting plate 62 is flexed or deflected in the vertical direction within the space provided between inclined surfaces 79 and 81, with the result that shaft 63 of guiding element 16 is angularly deflected or tilted in the direction of the arrow B on FIG. 14.

The tape guiding element 17 is shown to be constituted by a guide pin which is fixed in respect to an extension 59a of upper block 59 at the end of the latter remote from guiding element 16. The guide pin constituting element 17 is seen to be inclined at a predetermined angle so as to slightly converge upwardly in respect to the axis of element 16.

As shown particularly on FIG. 11, the lower block 61 has protuberances 84a and 84b formed integrally with its upper surface adjacent the opposite ends of its outer side portion, considered in respect to the curvature of track member 44, and a similar protuberance 84c extends from the upper surface of block 61 in lateral alignment with protuberance 84a, but adjacent the inner side of block 61. Thus, when movable base portion 56 is moved on to guide plate 47, protuberances 84a and 84b and protuberance 84c are adapted to engage the underside of plate 47 at opposite sides of slot 49, particularly if base portion 56 is then urged upwardly relative to plate 47. Further, as shown particularly on FIGS. 14 and 15, the end portions of lower block 61 at opposite sides of notch 80 therein are inclined to form a pair of upwardly slanting faces 85, and a lock pin 86 is mounted below guide plate 47 so as to extend transversely in respect to slot 49.

The protuberances 84a–84c, inclined faces 85 and pin 86 combine to provide a locking or securing mechanism 87 by which tape guiding element 16 and 17 are securely positioned when moved to their respective operative positions.

Figure 13:
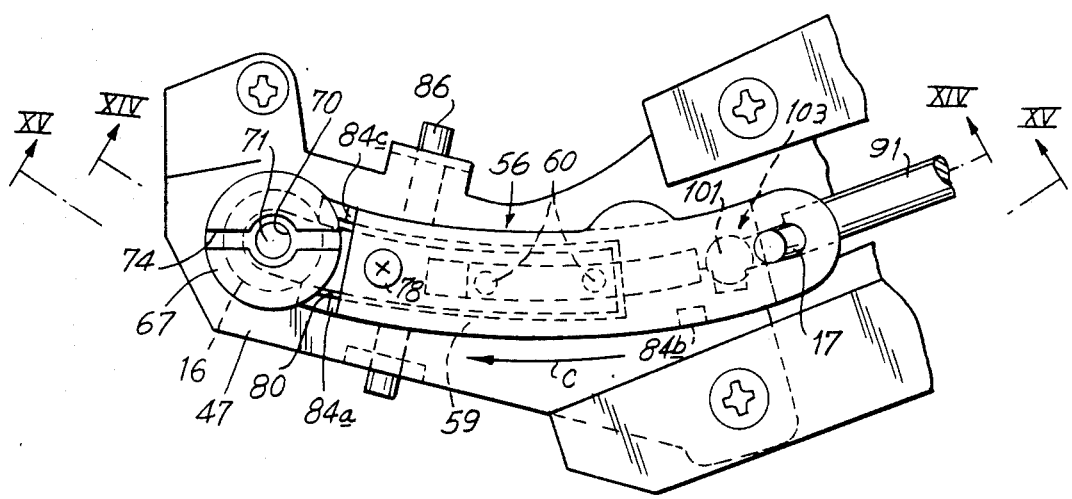
FIG. 13 is a plan view of the movable base portion in its operative position.

More particularly, when movable base portion 56 is moved along slot 49 in the direction of arrow C on FIG. 13 and approaches its operative position there illustrated, both inclined faces 85 of lower block 61 move onto pin 86, as is shown on FIG. 15. Thus, during the final increment of movement of movable base portion 56 to its operative position, the engagement of inclined faces 85 with pin 86 provides a wedge effect by which the final movement of lower block 61, as indicated by the arrow D on FIG. 15, has an upwardly directed component by which the three protuberances 84a–84c are pressed against, or urged into biting contact with the lower surface of guide plate 47 at the opposite sides of slot 49. Consequently, in the operative position of movable base portion 56, the latter is rigidly secured to the fixed guide plate 47 for stable positioning of tape guiding elements 16 and 17.

Figure 16:
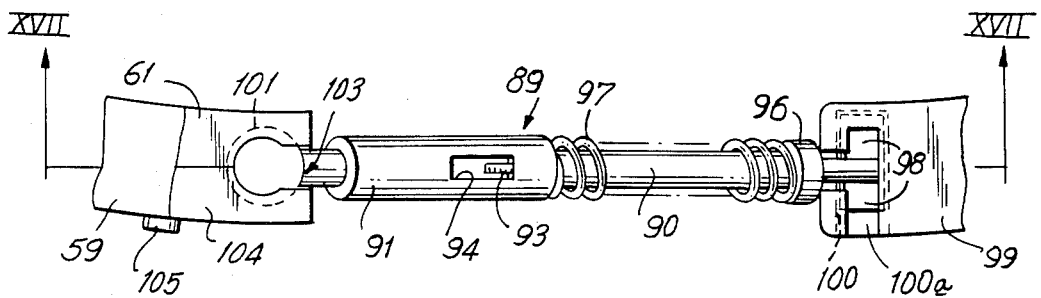
FIG. 16 is a plan view of a connecting rod assembly included in the feed side loading unit for connecting the movable base portion of FIGS. 11-15 with the drive ring of FIG. 8.
Figure 17:
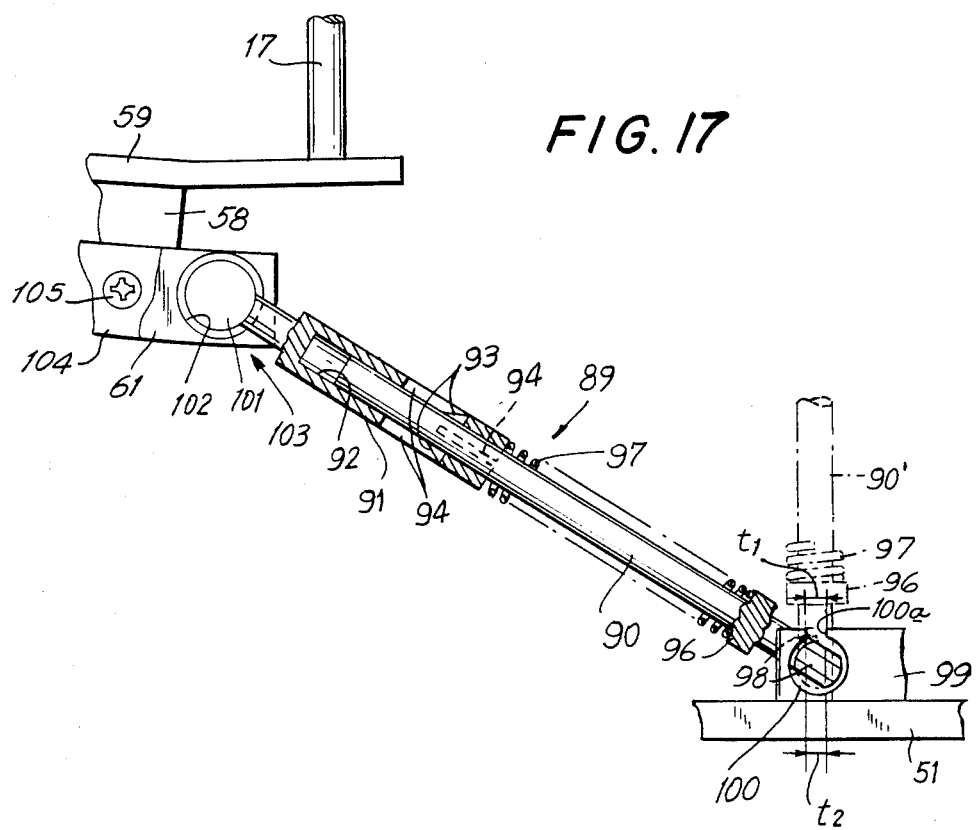
FIG. 17 is a sectional view taken along the line XVII—XVII on FIG. 16.

Referring now to FIGS. 16 and 17, it will be seen that movable base portion 56 is connected to drive ring 51 by a connecting rod assembly 89 which is inclined therebetween. Connecting rod assembly 89 is shown to include a rod 90 and cylinder 91 which may be both molded from a suitable synthetic resin, with the cylinder 91 having an axial bore 92 open at one end for slidably receiving an end portion of rod 90. A pair of triangular projections 93 are formed on such end portion of rod 90 at diametrically opposed locations so as to be slidable in respective diametrically opposed slots 94 extending axially in cylinder 91. Diametrically opposed slits 95 are also formed axially in cylinder 91 extending from the end of the latter at which bore 92 opens, and such slits 95 are angularly displaced by 90° from the slots 94. The projections 93 on rod 90 are in the form of right triangles so as to define slanting faces directed toward the free end of rod 90 and faces at right angles to the axis of rod 90 which are directed away from the free end of the latter. By reason of such configuration of projections 93 and the slits 95 in cylinder 91, rod 90 can be forced axially into cylinder 91 with the open end portion of cylinder 91 being elastically expanded by projections 93 until the latter snap into slots 94. Thereafter, the faces of projections 93 extending at right angles to the axis of rod 90 will prevent the axially separation of the latter from cylinder 91. At the end of rod 90 remote from the end portion thereof slidable in cylinder 91, rod 90 is provided with an integral flange 96, and a helical compression spring 97 is provided on rod 90 between flange 96 and the open end surface of cylinder 91 for yieldably urging rod 90 to its extended position relative to cylinder 91 in which projections 93 engage ends of slots 94 for preventing removal of rod 90 from cylinder 91, as shown on FIG. 17.

Extending from the end of rod 90 having flange 96 thereon is a terminal portion having lugs 98 extending laterally from its opposite sides, with each lug 98 having the cross sectional configuration of a circle with diametrically opposed flattened faces extending parallel to the axis of rod 90. Such projections 98 are rotatable in circular seats 100 formed in a bracket 99 secured on ring 51. The circular seats 100 open upwardly through narrowed passages 100a of a width t₁ greater than the width of each projection 98 between the flat faces of the latter. Thus, if rod 90 is initially disposed in a vertical position, as indicated in broken lines at 90' on FIG. 17, projections 98 can pass through passages 100a for installation in circular seats 100. Thereafter, when rod 90 is inclined, projections 98 are rotatably retained in seats 100.

The end of cylinder 91 remote from the opening of its bore 92 has a ball 101 formed integrally therewith to be received in a socket 102 provided at the end of lower block 61 of movable base portion 56 remote from notch or cut out 80. Thus, a ball-and-socket joint 103 is provided for connecting rod assembly 89 to movable base portion 56. Preferably, as shown particularly on FIG. 11, the end of lower body or block 61 provided with socket 102 may be longitudinally split, that is, formed with a lateral portion 104 which is detachably secured to the remainder of lower block 61 by a screw 105. Thus, screw 105 can be loosened to permit the insertion or removal of ball 101 in socket 102.

Figure 19:
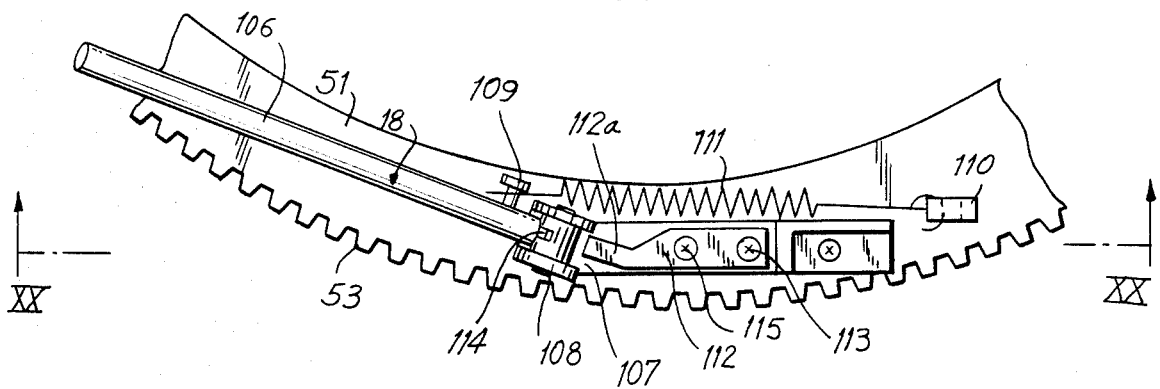
FIG. 19 is a plan view of the tape guiding element of FIG. 18, but shown in a collapsed or supine position.
Figure 20:
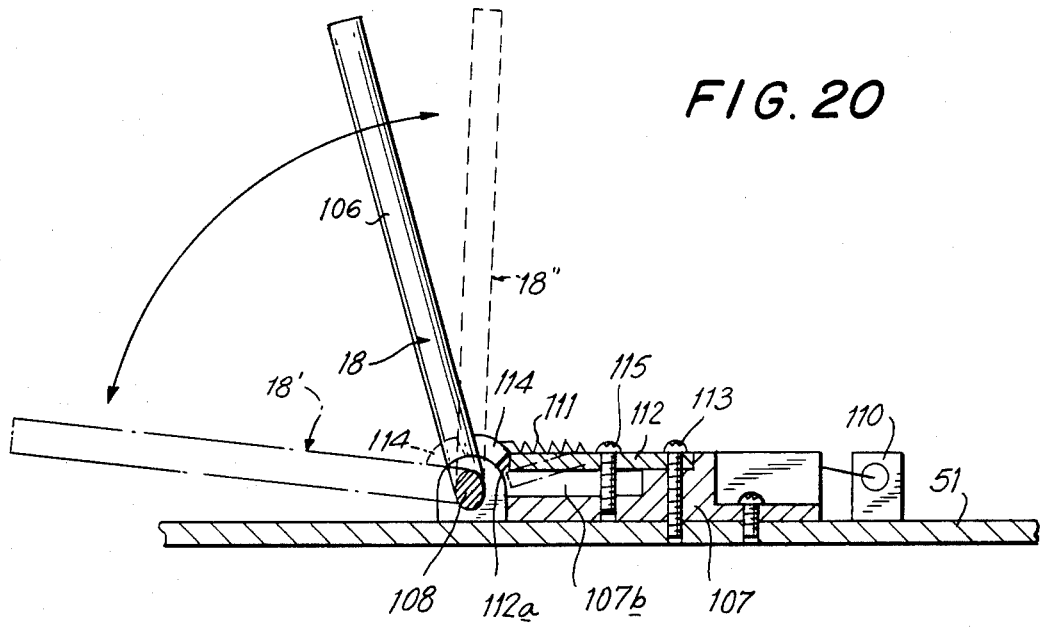
FIG. 20 is a sectional view taken along the line XX—XX on FIG. 19, and showing the tape guiding element in various positions thereof.

Referring now to FIGS. 18-20, it will be seen that the collapsible tape guiding elements 18 and 19 are similar and each include an elongated guide pin 106 which is pivotally mounted, at one end, in a mounting bracket 107 suitably secured on drive ring 51. More particularly, and as is shown for the tape guiding element 18, the elongated guide pin 106 is formed integrally, at one end, with a laterally directed pivot pin 108 which is rotatable in ears 107a on one end of mounting bracket 107. The axis of pivot pin 108 extends generally across the width of drive ring 51 so that guide pin 106 is swingable between a substantially horizontal or supine inoperative position (FIG. 19) in which pin 106 extends generally along the upper surface of ring 51, and a substantially erect position (FIG. 18). The pivoted end portion of pin 106 further has an anchor pin 109 projecting from one side thereof at a distance from pivot pin 108, and a helical tension spring 111 extends between anchor pin 109 and a lug 110 on ring 51 for continuously urging guide pin 106 in the clockwise direction, as viewed on FIG. 20, that is, to its erect position. Further, a lug 114 acting as a stop is formed on guide pin 106 adjacent the pivoted end portion thereof and is engageable with the upper surface of a positioning leaf spring 112 for limiting the pivoting movement of guide pin 106 under the urging of spring 111. As shown particularly on FIG. 20, one end portion of leaf spring 112 is secured by a screw 113 on mounting bracket 107, and the remainder of leaf spring 112 extends over a recess 107b of the mounting bracket so that the end 112a of spring 112 engageable by lug 114 can flex downwardly under the urging of guide pin 106. Further, an adjusting screw 115 extends through leaf spring 112 and is screwed into a tapped hole in bracket 107 for adjusting the position of the free end 112a of spring 112 at which lug 114 first comes into contact therewith during pivoting of guide pin 106 in the direction toward its erect position.

In other words, screw 115 acting on spring 112 makes it possible to adjust the inclination of the guide pin 104 in its raised position shown with full lines on FIG. 20.

So long as collapsible tape guiding elements 18 and 19 are in their respective initial or original positions indicated at 18' and 19' on FIG. 1, such guiding elements are disposed under depressing plate 54 (FIGS. 6 and 7) and are thereby held down so as to be nearly horizontally disposed against the force of the related springs 11, as shown on FIG. 10. At the commencement of the loading operation, in which ring 51 is turned in the clockwise direction as viewed on FIG. 8, the corresponding movements of guiding elements 18 and 19 cause the latter to move successively out from under depressing plate 54 at the end 54a of the latter (FIG. 7).

The swinging movements of guiding elements 18 and 19 under the urging of the respective springs 111 after moving out from under the end 54a of depressing plate 54 are controlled by rising motion guide 33. As shown particularly on FIGS. 21 and 22, guide 33 is desirably molded of a synthetic resin or the like so as to have a substantially triangular planform with depending skirts or walls 33a and 33b depending from the sides of guide 33, at the relatively wide end portion of the latter (FIG. 23), for defining a passage 117 therebetween through which guiding elements 18 and 19 can move in succession. The underside of guide 33 which forms the ceiling of passage 117 is formed with an arcuate guide groove 118 therein (FIGS. 21-24) for guiding the free or tip ends 18a and 19a of guiding elements 18 and 19, respectively, during movements of the latter through passage 117. A cushioning member or pad 119, for example, of an elastomeric synthetic resin, is secured, as by adhesive, in the end portion of guide groove 118 which is adjacent the relatively wide end of rising guide 33.

When a cassette 1 is moved, from above, to its operative position above chassis 5, guide 33 enters the cassette, from below through cut out 10 of the cassette, and is disposed at the inside of tape 4, as shown on FIGS. 22 and 23. When ring 51 is turned in the clockwise direction, as viewed on FIG. 8, for initiating a tape loading operation, the collapsible tape guiding elements 18 and 19 move from their respective original positions indicated at 18' and 19' on FIG. 1 and move in succession in the direction of the arrow E on FIG. 22 so as to successively pass under tape 4 and enter the cassette 1 through cut out 10 thereof. Until the tip ends 18a and 19a of guiding element 18 and 19 have passed under tape 4, the elements 18 and 19 are maintained in their respective supine positions by depressing plate 54, as shown on FIG. 10. However, as the tip 18a or 19a of the guiding element 18 or 19, respectively, passes under tape 4, the guiding element 18 or 19 moves out from under depressing plate 54 at the end 54a of the latter, whereupon, the respective guiding element 18 or 19 is free to be swung upwardly within cassette 1 at the inside of tape 4 by the force of the respective spring 111. In the course of this initial upward swinging movement of guiding element 18 or 19, the respective tip end 18a or 19a initially strikes the lower surface of the cushion or pad 119 which absorbs the shock, and then the tip end 18a or 19a moves into guide groove 118. Until the tip ends 18a and 19a of guiding elements 18 and 19 move successively out of guide groove 118, the height and moving locus of such tip end 18a or 19a is positively controlled by guide 33. As each of the tip ends 18a and 19a moves out of guide groove 118, the respective guiding element 18 or 19 is free to be raised by the respective spring 111 to the risen or erected position, for example, as indicated at 18 on FIG. 20, in which the lug or stop 114 comes into engagement with adjusted leaf spring 112. In such risen or erected position, the guiding elements 18 and 19 successively come into engagement with tape 4 at the inside of the loop being formed in the tape during the withdrawal of the latter from the cassette by guiding elements 16 and 17. It will be seen that the position where the tip ends 18a and 19a of guiding elements 18 and 19 successively exit from guide groove 118, and thus are free to rise, is located adjacent the front opening 8 of the operatively positioned cassette 1, so that the tip ends 18a and 19a can safely pass under the end edge 9a of the opened cassette lid 9 (FIGS. 21 and 22) and avoid the possibility of accidentally engaging such edge 9a with the guiding elements 18 and 19 at the time when the latter are being erected or swung upwardly.

Referring now to FIGS. 25 and 26, it will be seen that the positioning plates 34 and 35 for guiding elements 18 and 19, respectively, are horizontally fixed to the upper end portion of a mounting block 121 by means of screws 122 and 123. The mounting block 121 is suitably secured on chassis 5, and positioning plates 34 and 35 are angularly fixed relative to each other and relative to mounting block or support 121 by means of positioning pins 124 and 125, which may be molded integrally with mounting block 121, and which are received in holes 126 and 127, respectively, formed in positioning plates 34 and 35. The positioning plates 34 and 35 have end portions extending over the path of travel of drive ring 51 and formed with notches 128 and 129, respectively, which open generally tangentially in respect to ring 51 in the direction opposed to the direction of turning of ring 51 for effecting a loading operation.

As shown on FIG. 26, positioning plates 34 and 35 are supported at different heights or elevations $h_{13}$ and $h_{14}$ above ring 51 so that, during a loading operation, the guiding element 18, in its so-called risen position determined by the engagement of its stop or lug 114 with the respective adjusted leaf spring 112, may move under positioning plate 35 and then engage its end or tip portion 18a in notch 128 of positioning plate 34. More particularly, as shown on FIG. 26, the leaf springs 112 associated with guiding elements 18 and 19 are adjusted so that such guiding elements, upon being released from guide 33 and thus free to be swung upwardly to their respective risen positions shown in dot-dash lines at 18 and 19, will have their free ends or tip ends 18a and 19a at the heights $h_{10}$ and $h_{11}$ above ring 51. As shown, the height $h_{10}$ is smaller than the height $h_{11}$ by the distance $h_{12}$. Further, positioning plate 34 is mounted so that its height $h_{13}$ above ring 51 is somewhat smaller than the height $h_{10}$, while the other positioning plate 35 is mounted so that its height $h_{14}$ above ring 51 is greater than the height $h_{10}$ and somewhat smaller than the height $h_{11}$.

Figure 8:
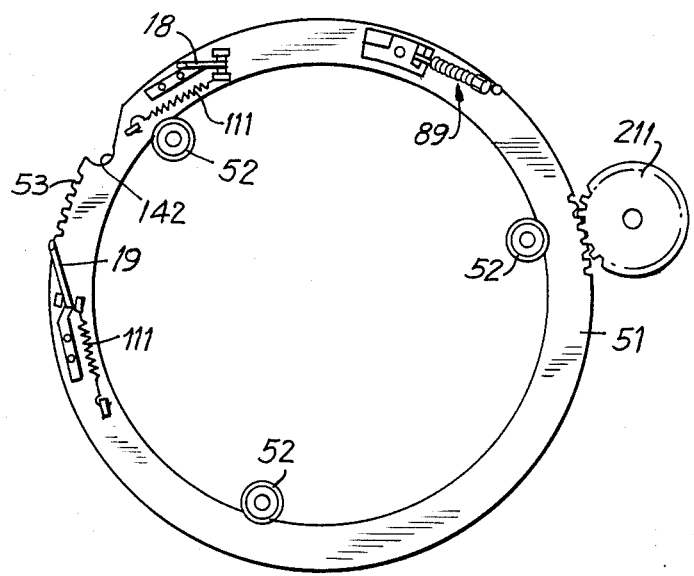
FIG. 8 is a plan view of a drive ring included in the feed side loading unit and which is disposed below the guid assembly of FIG. 7.

It will be appreciated that, during a tape loading operation initiated by rotation of ring 51 in the clockwise direction as viewed on FIG. 8, the tape guiding elements 18 and 19, after emerging from under guide 33, extend upwardly through slot 46 of track member 44 and are maintained in their risen conditions indicated in dot-dash lines at 18 and 19 on FIG. 26 while moving horizontally in the direction of the arrow F toward their respective operative positions. Thus, guiding elements 18 in its risen condition or state moves under positioning plate 35 and, as guiding elements 18 and 19 near their respective operative positions, their respective tip or free ends 18a and 19a are received in notches 128 and 129, respectively, of positioning plates 34 and 35 and abut against the closed ends 128a and 129a of the respective notches. After such abutment of tip ends 18a and 19a against the closed ends 128a and 129a of the respective notches, ring 51 undergoes a final increment of movement in the direction of arrow F on FIG. 26. During this final increment of movement of ring 51, corresponding movements of the tip or free end portions 18a and 19a of guiding elements 18 and 19 are prevented and, therefore, guiding elements 18 and 19 are pivoted about their respective pivot pins 108 in the clockwise direction, as viewed on FIG. 26. When the movement of ring 51 in the direction of arrow F has ended, the operatively positioned guiding elements 18 and 19 are in precisely predetermined respective angular positions relative to chassis 5, as indicated in solid lines on FIG. 26. It will be apparent that, such pivotal movements of guiding elements 18 and 19 to their operative positions as a result of the final increment of rotation of ring 51 are resisted by the respective leaf springs 112. Thus, for example, as shown on FIG. 20, when guiding element 18 is moved from its risen position shown in full lines to its operative position indicated in dotted lines at 18" on FIG. 20, leaf spring 112 has its free end 112a flexed or deflected downwardly to the position indicated in dotted lines. Accordingly, at the completion of the movement of ring 51, each of guiding elements 18 and 19 is firmly and stably secured in its respective operative positions by the spring 112 acting resiliently against the stop or lug 114 at the lower end of the guiding element 18 or 19, and by the positioning plate 34 or 35 acting against the upper or tip end 18a or 19a of the guiding element.

Figure 27:
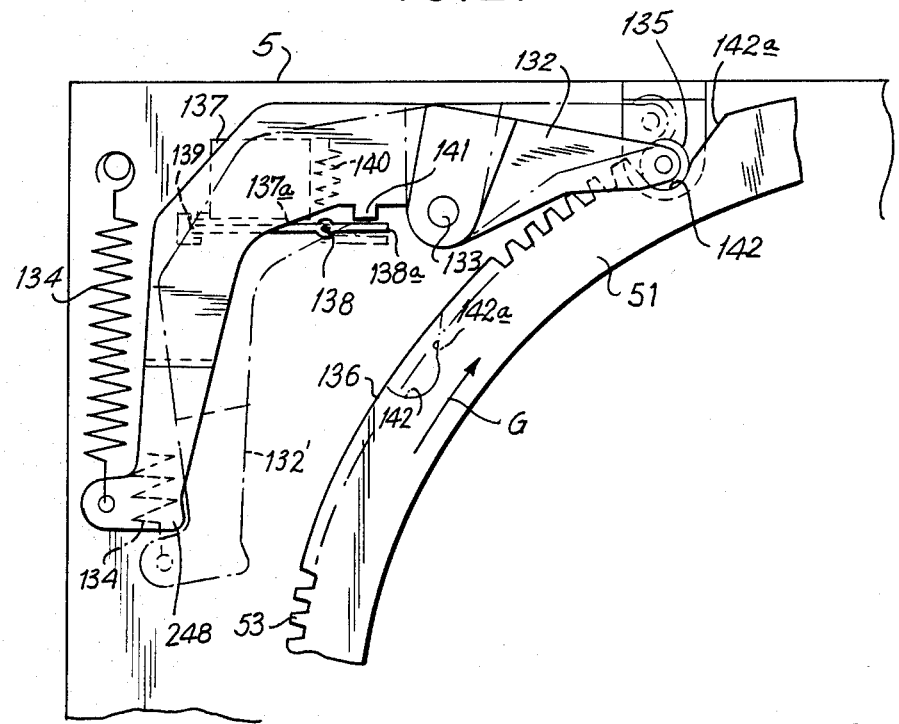
FIG. 27 is a plan view of a detecting device for detecting the end or completion of a tape loading operation of the apparatus according to this invention.

Referring now to FIG. 27, it will be seen that, when drive ring 51 attains its final position at the completion of its rotation in the direction of the arrow G for effecting a loading operation, a lever 132 which is pivoted on a pine 133 secured to chassis 5 is effective to detect the completion of the loading operation and to secure ring 51 in its respective position. More particularly, lever 132 is shown to be biased in the clockwise direction, as viewed on FIG. 27, by means of a helical tension spring connected between one end of lever 132 and chassis 5. The opposite end of lever 132 carries a rotatable roller 135 which is urged at all times against the periphery 136 of ring 51 by the action of spring 134 on lever 132. A switch 137 for detecting the end of a loading operation is mounted on chassis 5 adjacent lever 132, and an operating lever 138 is pivoted at a fulcrum 139 and confronts an actuator 137a of switch 137. A tension spring 140 is connected between operating lever 138 and chassis 5 and urges lever 138 in the direction to engage its free end portion 138a with a lug 141 on lever 132. Drive ring 51 has a locking detent or recess 142 in its periphery at a location to receive roller 135 when ring 51 is in its final position upon the completion of a tape loading operation. In any other position of ring 51, roller rides on the peripheral surface of ring 51 and, accordingly, pivots lever 132 in the counterclockwise direction against the force of spring 134 from the position shown in full lines on FIG. 27, to the position indicated in broken lines at 132'. Pivoting of lever 132 to the position indicated at 132' causes lug 141 to act on operating lever 138 for pivoting the latter in the clockwise direction about fulcrum 139, whereby actuator 137a of detecting switch 137 is extended to turn OFF the switch. On the other hand, when ring 51 is turned in the direction of the arrow G on FIG. 27 and reaches the position shown in full lines at the completion of a loading operation, the engagement of roller 135 in detent 142 locks ring 51 in such position, and the resulting pivoting of lever 132 in the clockwise direction by spring 134 moves lug 141 away from operating lever 138 so that spring 140 can cause the latter to depress actuator 137a and thereby turn ON detecting switch 137. Thus, switch 137 detects the completion of a tape loading operation. It will be seen that, at the side of detent 142 extending in the direction G of the rotation of ring 51 for a tape loading operation, ring 51 has an inclined ramp 142a extending from the bottom of detent or recess 142 to the outer periphery of the ring. Thus, when drive ring 51 is turned in the direction opposite to that indicated by the arrow G on FIG. 27 from the position shown in full lines on that view, that is, when ring 51 is turned in the counterclockwise direction for initiating a tape unloading operation, roller 135 ascends the inclined ramp 142a to again ride on the outer periphery of ring 51, whereby lever 132 is again pivoted to the position indicated in broken lines at 132' and detecting switch 137 is turned OFF.

Figure 28:
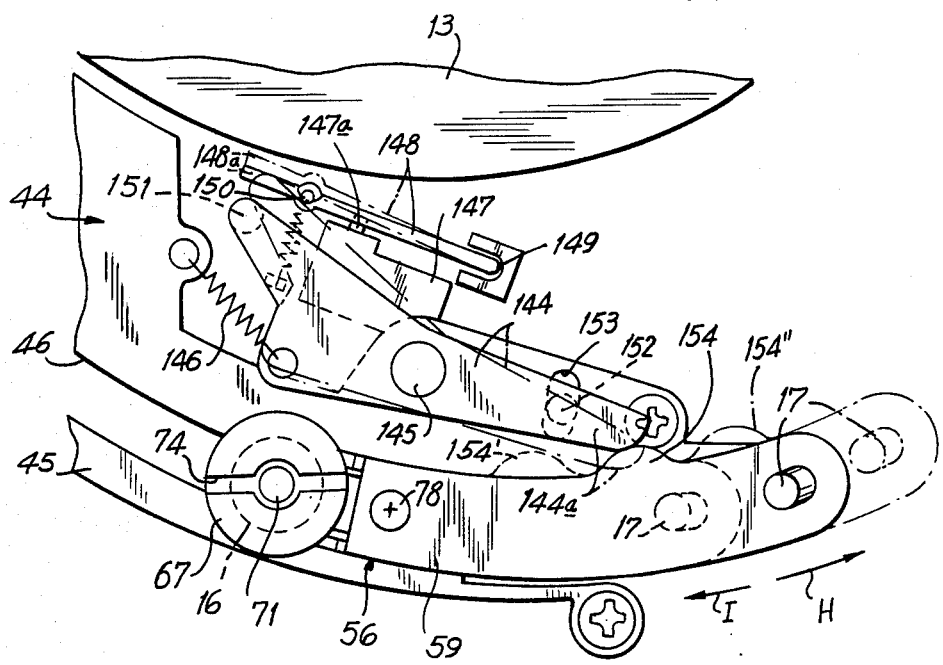
FIG. 28 is a plan view of a detecting device for detecting the end or completion of an unloading operation of the apparatus.

Referring now to FIG. 28, it will be seen that, in order to detect the completion of a tape unloading operation of the apparatus according to this invention, a lever 144 is pivotally mounted on a pivot 145 which is carried by track member 44 near to the path of movement of base portion 56 when the guiding elements 16 and 17 thereon are near their initial positions indicated at 16' and 17' on FIG. 1. A tension spring 146 is connected between lever 144 and an anchor on track member 44 for urging lever 144 in the clockwise direction. A detecting switch 147 is mounted on chassis 5 below detecting lever 144 and has its actuator 147a confronted by an operating lever 148 which is pivoted at one end on a fulcrum 149 and urged by a spring 150 to depress actuator 147a and to engage the free end 148a of lever 148 with a pin 151 depending from one end of detecting lever 144. The opposite end portion 144a of lever 144 has a pin 152 depending therefrom and engaging slidably in an arcuate slot 153 formed in track member 144 so as to limit the pivotal movement of lever 144. Further, as shown on FIG. 28, a protuberance 154 extends from the inside edge portion of upper block 59 of movable base portion 56 and is positioned to be engaged by the end 144a of detecting lever 144 when movable base portion 56 and guiding elements 16 and 17 thereon are in their respective initial positions shown in full lines on FIG. 28. When protuberance 154 engages lever 144, the latter is turned in the counterclockwise direction against the force of spring 146 so as to move pin 151 away from operating lever 148, as shown in full lines on FIG. 28, with the result that actuator 147a is depressed to turn ON detecting switch 147. However, as indicated with dot-dash lines at 154' and at 154" on FIG. 28, at the moment when movable base portion 56 is moved either in the direction of the arrow I or the arrow H, respectively, from its position shown in full lines, protuberance 154 moves away from end 144a of detecting lever 144 and, as a result thereof, spring 146 pivots lever 144 in the clockwise direction so that pin 151 acts against operating lever 148 to move the latter away from actuator 147a and thereby turn OFF detecting switch 147.

Figure 29:
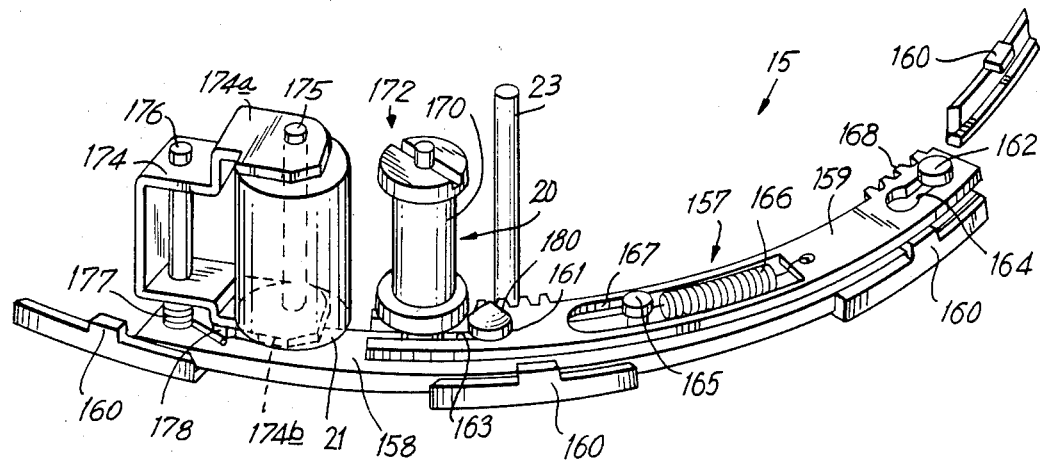
FIG. 29 is a perspective view of a movable base assembly included in a take-up side loading unit of the tape loading apparatus according to an embodiment of this invention.
Figure 30:
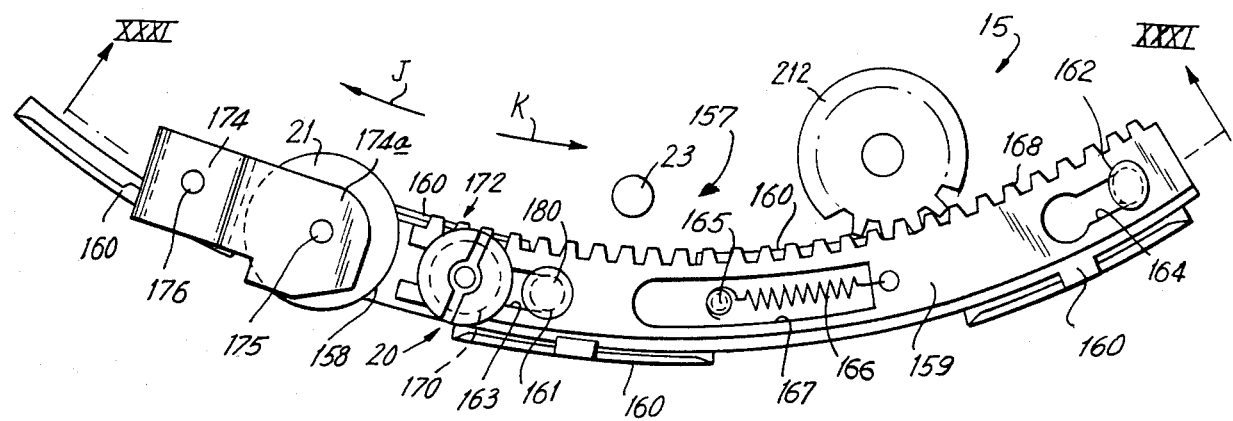
FIG. 30 is a plan view of the movable base assembly of the take-up side loading unit.
Figure 31:
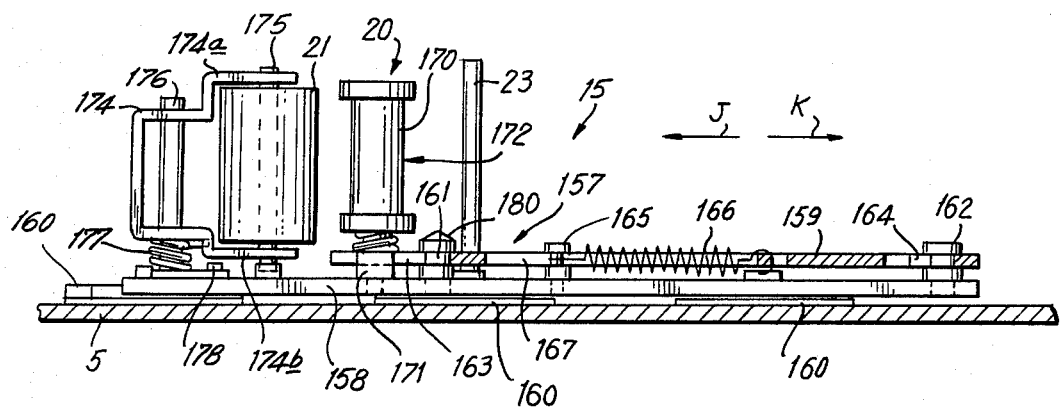
FIG. 31 is a sectional view taken along the line XXXI—XXXI on FIG. 30.

Referring now to FIGS. 29-31, it will be seen that tape guiding element 20 and pinch roller 21 of the take-up side loading unit 15 are mounted on a movable base 157 which is adapted to be moved horizontally in an arcuate path on chassis 5. Movable base 157 is desirably comprised of elongated, laterally curved lower and upper slide plates 158 and 159. Lower slide plate 158 is guided by a plurality of slide guides 160 which are desirably molded from a synthetic resin or the like and fixedly mounted on chassis 5 at spaced apart locations along the inner and outer margins of the desired arcuate path of travel of plate 158. Upper slide plate 159 is disposed horizontally above slide plate 58 in parallel with the latter and has a pair of elongated arcuate apertures 163 and 164 at spaced apart locations along plate 159 to slidably receive guide pins 161 and 162, respectively, extending from lower slide plate 158. Thus, upper slide plate 159 can move longitudinally to a limited extent relative to lower slide plate 158. Upper slide plate 159 is urged in the direction of the arrow J on FIG. 30 relative to lower slide plate 158 by means of a helical tension spring 166 which is received in an elongated cut out 167 in upper plate 159 and connected, at its ends, to upper slide plate 159 and to an anchor pin 165 extending from lower slide plate 158. The longitudinal movement of upper slide plate 159 relative to lower slide plate 158 in the direction of arrow J under the urging of spring 166 is limited by the engagement of ends of elongated apertures 163 and 164 with the respective pins 161 and 162. A rack 168 is formed along the inner longitudinal edge of upper slide plate 159 so that movable base 157 may be longitudinally driven, as hereinafter described in detail.

Figure 14:
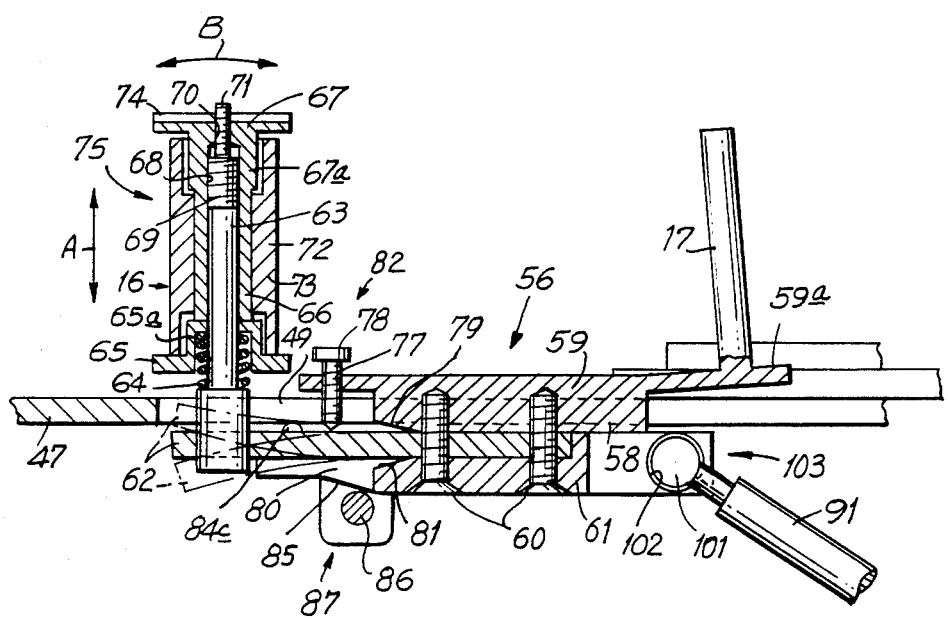
FIG. 14 is a sectional view taken along the line XIV—XIV on FIG. 13.

The tape guiding element 20 includes a rotatable roller 170 which corresponds to the roller 72 of the movable tape guiding element 16, and which is similarly rotatably mounted on a supporting shaft 171 by means of a height adjusting unit 172 of essentially the same construction as the height adjusting unit 75 for element 16 which has been previously described in detail with reference to FIG. 14. The supporting shaft 171 for roller 170 of tape guiding element 20 is mounted in an erect or perpendicular position on lower slide plate 158 near to to the end of upper slide plate 159 which has slot 163 therein.

Pinch roller 21 is shown to be rotatably mounted on a supporting shaft 175 which extends vertically between upper and lower end portions or arms 174a and 174b of a substantially U-shaped pinch roller supporting lever 174. Supporting lever 174 is pivotally mounted on a vertical pivot shaft 176 extending from an end portion of lower slide plate 158. A torsion spring 177 is provided around shaft 176 to urge pinch roller supporting lever 174 to pivot in the clockwise direction, as viewed on FIG. 30, and such pivotal movement of lever 174 is suitably restricted, for example, by the abutment of lower end of the shaft 175 with a stop or projection 178 formed on the upper surface of slide plate 158. If movable tape guiding element 20 and pinch roller 21 are in their initial or original positions indicated in broken lines at 20' and 21' on FIG. 1, upper slide plate 159 may be moved longitudinally in the direction of arrow K on FIG. 30, as will be hereinafter described in detail, with the result that lower slide plate 158 is similarly pulled by spring 166 so as to move horizontally on chassis 5 in the path defined by guides 160. Thus, guiding element 20 and pinch roller 21 are moved to their operative positions shown in full lines on FIG. 1. When movable base 157 is returned in the direction of arrow J in the course of a tape unloading operation, the ends of apertures 163 and 164 of plate 159 abut guide pins 161 and 162, respectively, whereby lower slide plate 158 is correspondingly moved for returning guiding element 20 and pinch roller 21 to their initial or original positions.

Figure 32:
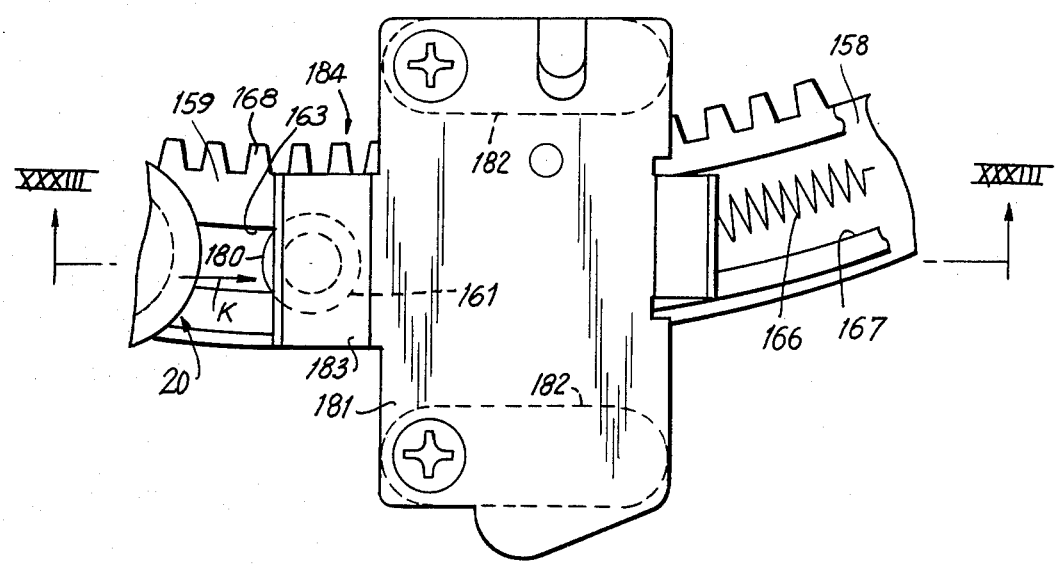
FIG. 32 is a fragmentary enlarged plan view of a locking mechanism which cooperates with the movable base assembly of the take-up side loading unit in the operative position of such assembly.
Figure 33:
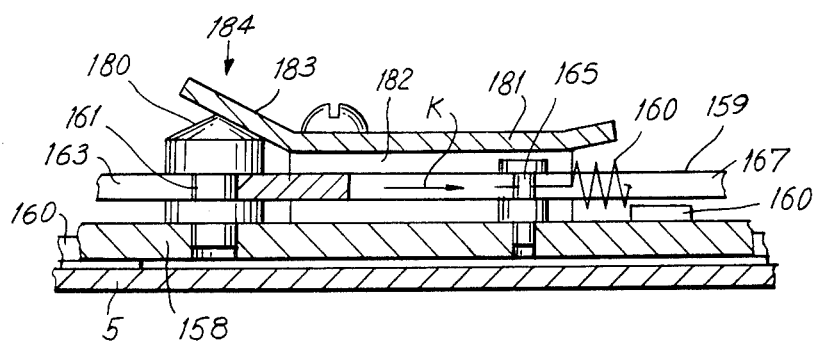
FIG. 33 is a sectional view taken along the line XXXIII—XXXIII on FIG. 32.

Referring now to FIGS. 32 and 33, it will be seen that the head of guide pin 161 is formed with a conical top surface 180, and that a locking plate 181 is supported, at its opposite sides, on posts 182 extending upwardly from chassis 5 so that plate 181 will span the path of movable base 157 adjacent the position of pin 161 at the completion of a tape loading operation. The locking plate 181 has an inclined portion 183 extending centrally therefrom so as to be engageable by the conical surface 180 on the head of guide pin 161. The inclined portion 183 of plate 181 and the conical head surface 180 on guide pin 161 cooperate to provide a locking mechanism 184 by which tape guiding element 20 is securely and stably located in its operative position shown on FIG. 1. More particularly, when movable base 157 is moved in the direction of arrow K to its operative position in the course of a tape loading operation, the conical head surface 180 of guide pin 161 engages the lower surface of the inclined portion 183 of plate 181 to provide a wedge effect by which plates 159 and 158 are made to bear downwardly against each other and against the bearing surfaces on guides 160. In this case, the driving force in the direction of the arrow K on upper slide plate 159 is transmitted to lower slide plate 158 through spring 166 which is placed under tension and thereby provides a continuing force by which the conical head surface 180 of guide pin 161 maintains bearing contact with inclined portion 183 of plate 181.

Figure 34:
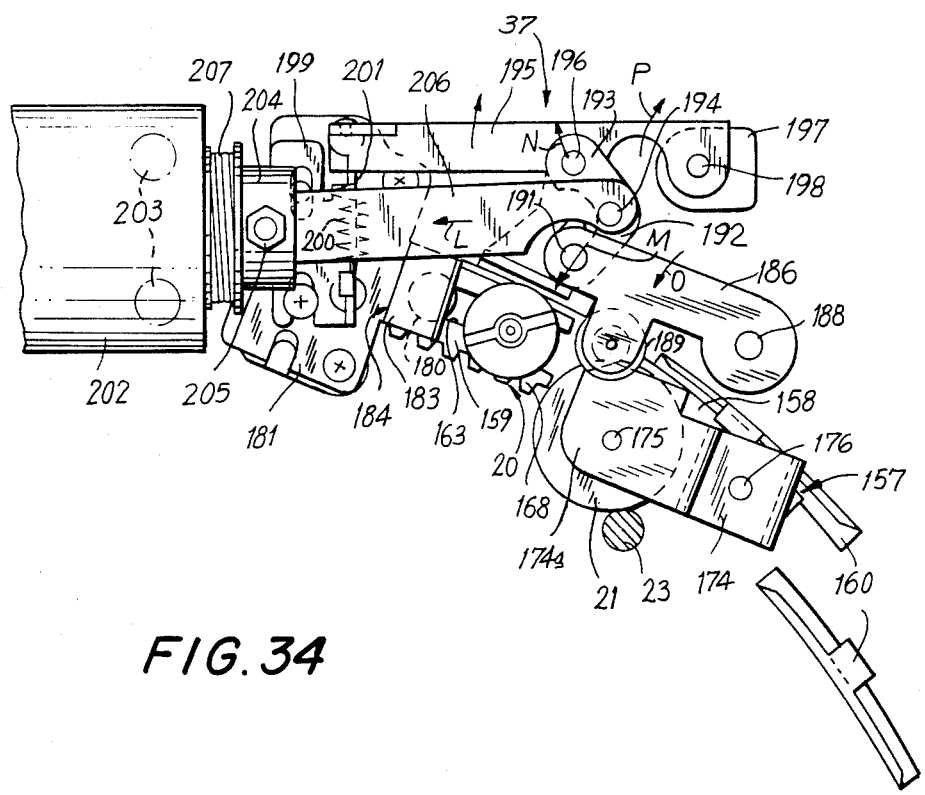
FIG. 34 is a plan view of a pinch roller pressing unit which cooperates with a pinch roller of the take-up side loading unit.
Figure 35:
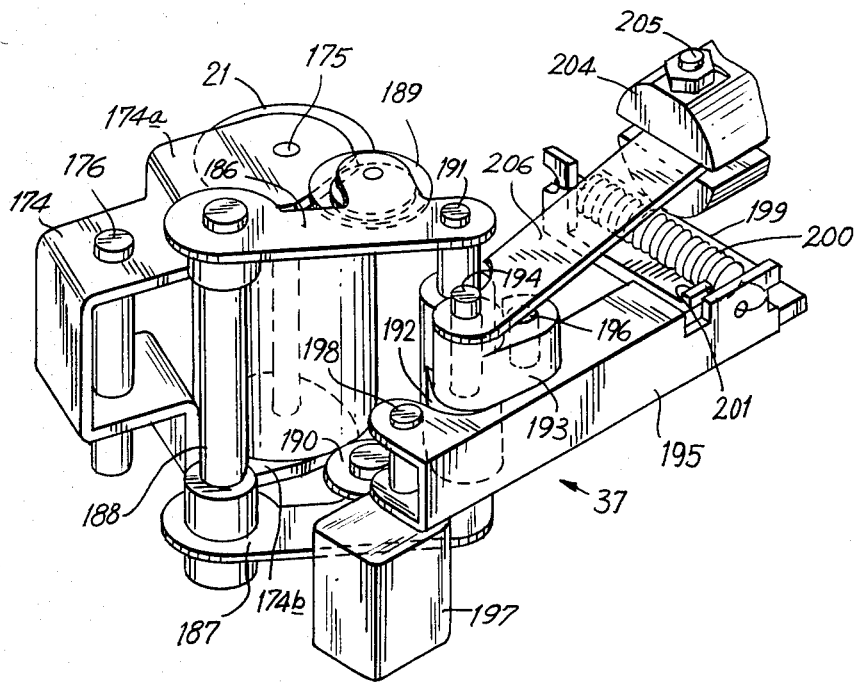
FIG. 35 is a perspective view of the pinch roller pressing unit.
Figure 36:
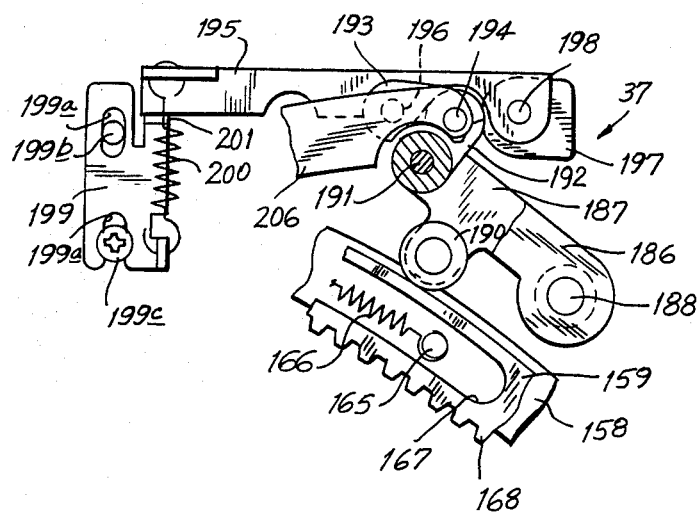
FIGS. 36, 37 and 38 are plan views, partly cut away and in section, and showing parts of the pinch roller pressing unit of FIG. 34 in different phases of its operating cycle.
Figure 37:
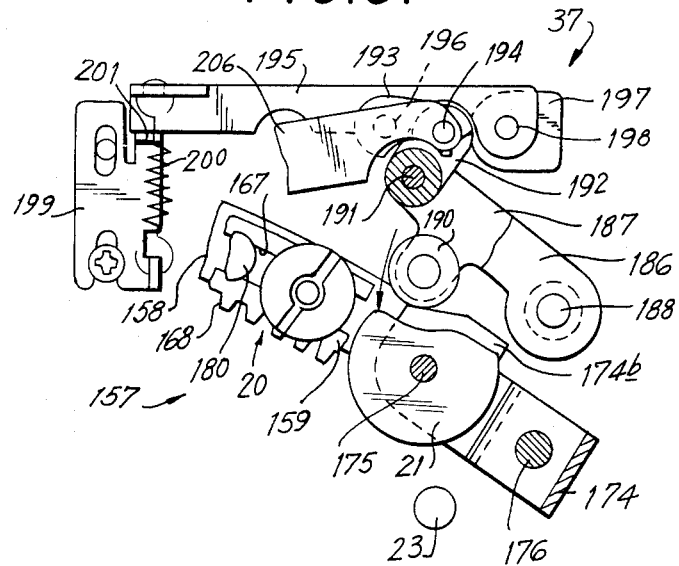
Figure 38:
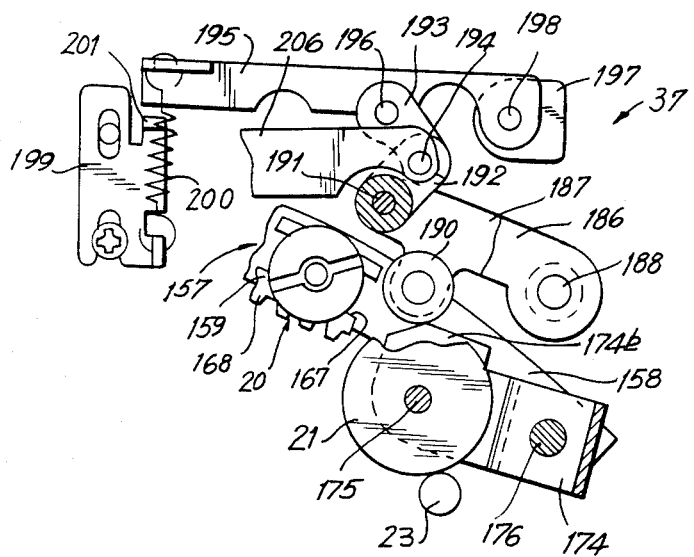

As shown on FIGS. 34, 37 and 38, in the operative position of movable base 157, pinch roller 21 is disposed adjacent to capstan 23 and also adjacent to pinch roller pressing unit 37 which is operative, in the recording or reproducing mode of the VTR, to press pinch roller 21 against rotated capstan 23 with the tape 4 therebetween for driving the tape. In the illustrated embodiment, pressing unit 37 is shown to include upper and lower pressing levers 186 and 187 pivotally mounted, at one end, on a shaft 188 which extends upwardly from chassis 5. The levers 186 and 187 have upper and lower rollers 189 and 190, respectively, rotatably mounted thereon, and vertically disposed so as to be at the same heights above chassis 5 as the upper and lower arms 174a and 174b, respectively, of the pinch roller supporting lever 174. The free ends of pressing levers 186 and 187 are connected by a vertical pin 191 on which there is pivoted a first toggle link 192. The toggle link 192 is, in turn, connected with a second toggle link 193 by means of a connecting pin 194. A limiter arm 195 (FIGS. 34–38) is connected, intermediate its ends, with toggle link 193 by means of a pivot pin 196, and is pivotally supported on a fixed base 197 extending from chassis 5 by means of a pivot pin 198 engaging one end of arm 195. The limiter arm 195 is urged to pivot in the counterclockwise direction, as viewed on FIGS. 34 and 36–38, by a helical tension spring 200 which is connected between the end of arm 195 remote from pivot pin 198 and a spring force adjusting plate 199 which, as shown particularly on FIG. 34, is adjustably mounted on locking plate 181. As particularly shown on FIG. 36, the adjustable mounting of plate 199 may be effected by providing such plate with elongated slots 199a which receive a pin 199b and a screw 199c extending from locking plate 181. Thus, screw 199c may be loosened to permit displacement of plate 199 in the direction for either increasing or decreasing the tension of spring 200. The pivotal movement of limiter arm 195 by spring 200 is restricted by the abutment of arm 195 with a stop or projection 201 formed on plate 199. Thus, the described adjustment of plate 199 also determines the initial or rest position of limiter arm 195.

A solenoid 202 (FIGS. 5 and 34) is mounted on chassis 5 through a plurality of supporting posts 203 (FIG. 34), and has an armature 204 pivotally connected, as at 205, to one end of a link 206 which has its other end pivotally connected to the pin 194 between toggle links 192 and 193. Solenoid 202 is of the type in which armature 204 is normally extended longitudinally by means of a helical compression spring 207, and such armature is retracted or drawn into the housing of solenoid 202 against the force of spring 207 only when the solenoid 202 is energized.

When movable base 157 is in its original position, as shown on FIG. 36, lower pressing roller 190 of unit 37 bears against the outside edge of upper slide plate 159, that is, the edge opposite to rack 168, and upper and lower pressing levers 186 and 187 are thereby urged in the clockwise direction as viewed on FIG. 36. When movable base 157 is moved to its operative position, as shown on FIG. 37, lower pressing roller 190 moves off upper slide plate 159 and the upper and lower rollers 189 and 190 come into contact with the upper and lower arms 174a and 174b of pinch roller supporting lever 174. Thereafter, when solenoid 202 is energized for establishing the recording or reproducing mode of the VTR, armature 204 is retracted so that connecting link 206 pulls pivot pin 194 in the direction of the arrow L on FIG. 34 and, accordingly, toggle links 192 and 193 are urged in the directions of the arrows M and N, respectively. Thus, upper and lower pressing levers 186 and 187 are pivoted in the direction of the arrow O and the respective rollers 189 and 190 act against the upper and lower arms 174a and 174b for pivoting pinch roller supporting lever 174 in the direction of the arrow Q against the force of torsion spring 177 with the result that pinch roller 21 is brought into contact with capstan 23 with the tape 4 therebetween. After such contact of pinch roller 21 with capstan 23 has been established, further movement of pivot pin 194 in the direction of arrow L is accompanied by pivoting of limiter arm 195 in the direction of the arrow P, that is, so as to move arm 195 away from stop 201 against the force of spring 200. Accordingly, the adjusted tension of spring 200 determines the pressure with which pinch roller 21 is urged against capstan 23 with the tape 4 therebetween during a recording or reproducing operation.

When solenoid 202 is de-energized to halt a recording or reproducing operation, spring 207 is effective to extend armature 204 with the result that connecting link 206 moves pivot pin 194 in the direction counter to the direction of arrow L on FIG. 34, whereby pressing levers 186 and 187 are turned in the clockwise direction from the position shown on FIGS. 34 and 38 to the position shown on FIG. 37, with the result that pinch roller supporting lever 174 is turned by torsion spring 177 (FIGS. 29 and 31) for moving pinch roller 21 away from capstan 23. Thereafter, if movable base 157 is returned to its original position, lower roller 190 is again engaged by the outer side of slide plate 159 so that upper and lower pressing rollers 189 and 190 are separated from pinch roller supporting lever 174.

By reason of the inclusion in pinch roller pressing unit 37 of the toggle mechanism constituted by toggle links 192 and 193 and the connecting link 206, pinch roller 21 can be strongly pressed against capstan 23 even if a relatively small solenoid 202 providing a correspondingly weak retracting force on its armature 204 is employed for minimizing the power requirements thereof. Furthermore, although the upper and lower pressing levers 186 and 187 are mounted on a common shaft 188, such levers are capable of slight angular displacements relative to each other. Thus, in the operative condition of pressing unit 37 (FIG. 38), upper and lower rollers 189 and 190 are able to independently act against the upper and lower arms 174a and 174b, respectively, of pinch roller supporting lever 174 for urging pinch roller 21 into contact with capstan 23 with a uniform pressure therebetween at the top and bottom of the pinch roller.

Figure 39:
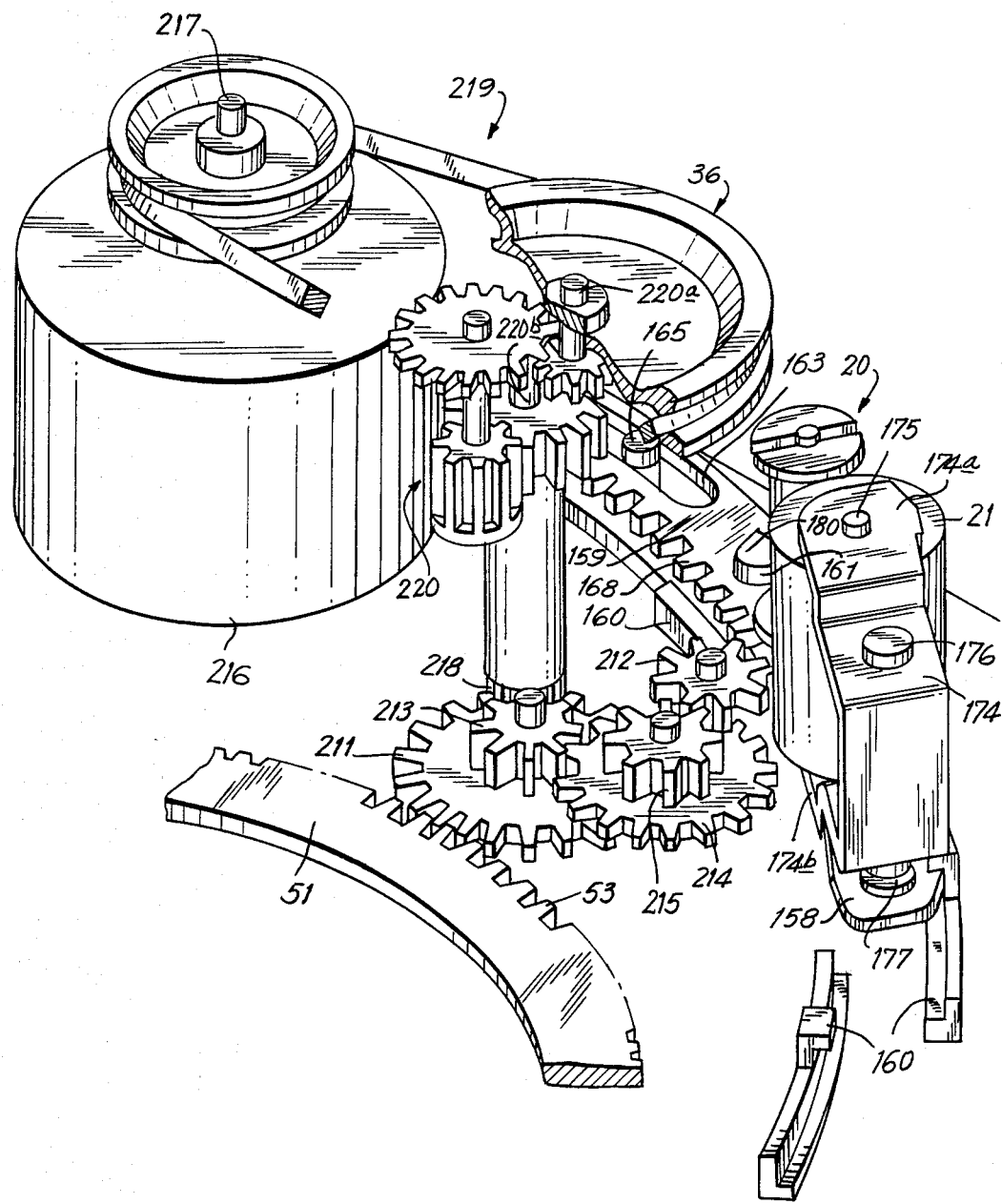
FIG. 39 is a partially cut away perspective view of a driving unit included in the tape loading apparatus according to this invention.
Figure 40:
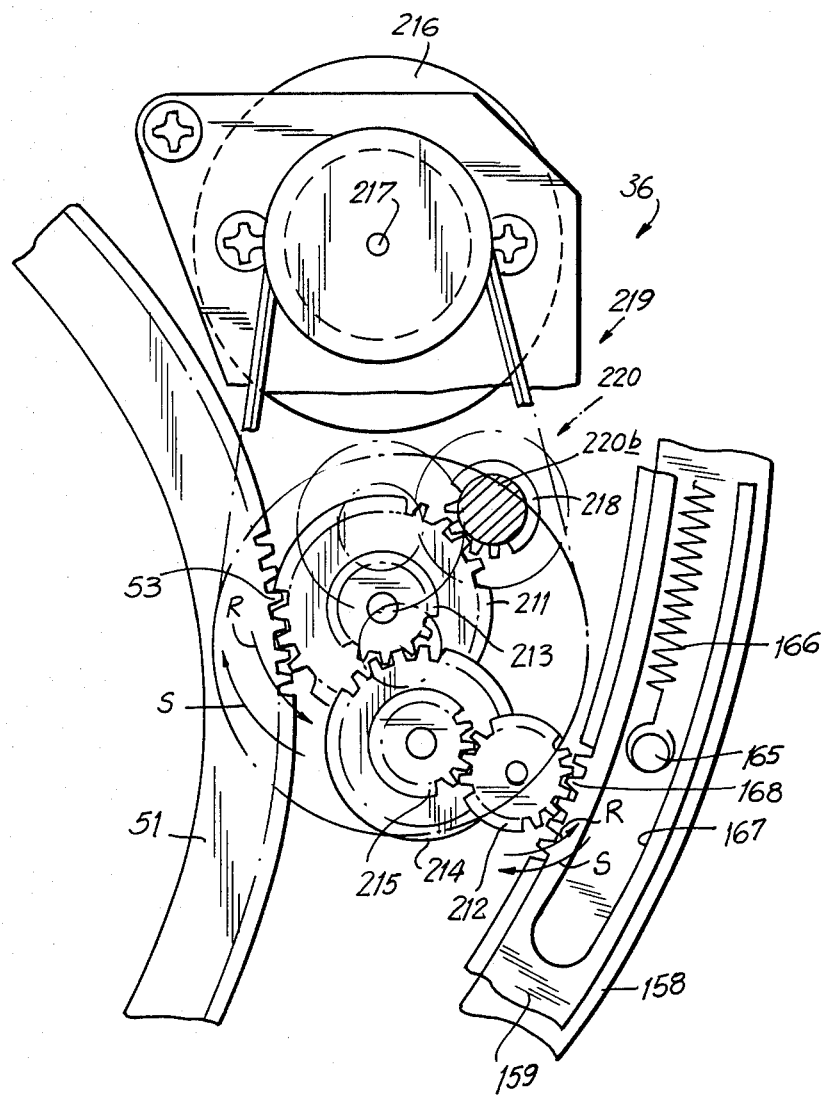
FIG. 40 is a plan view showing principal elements of the driving unit.
Figure 41:
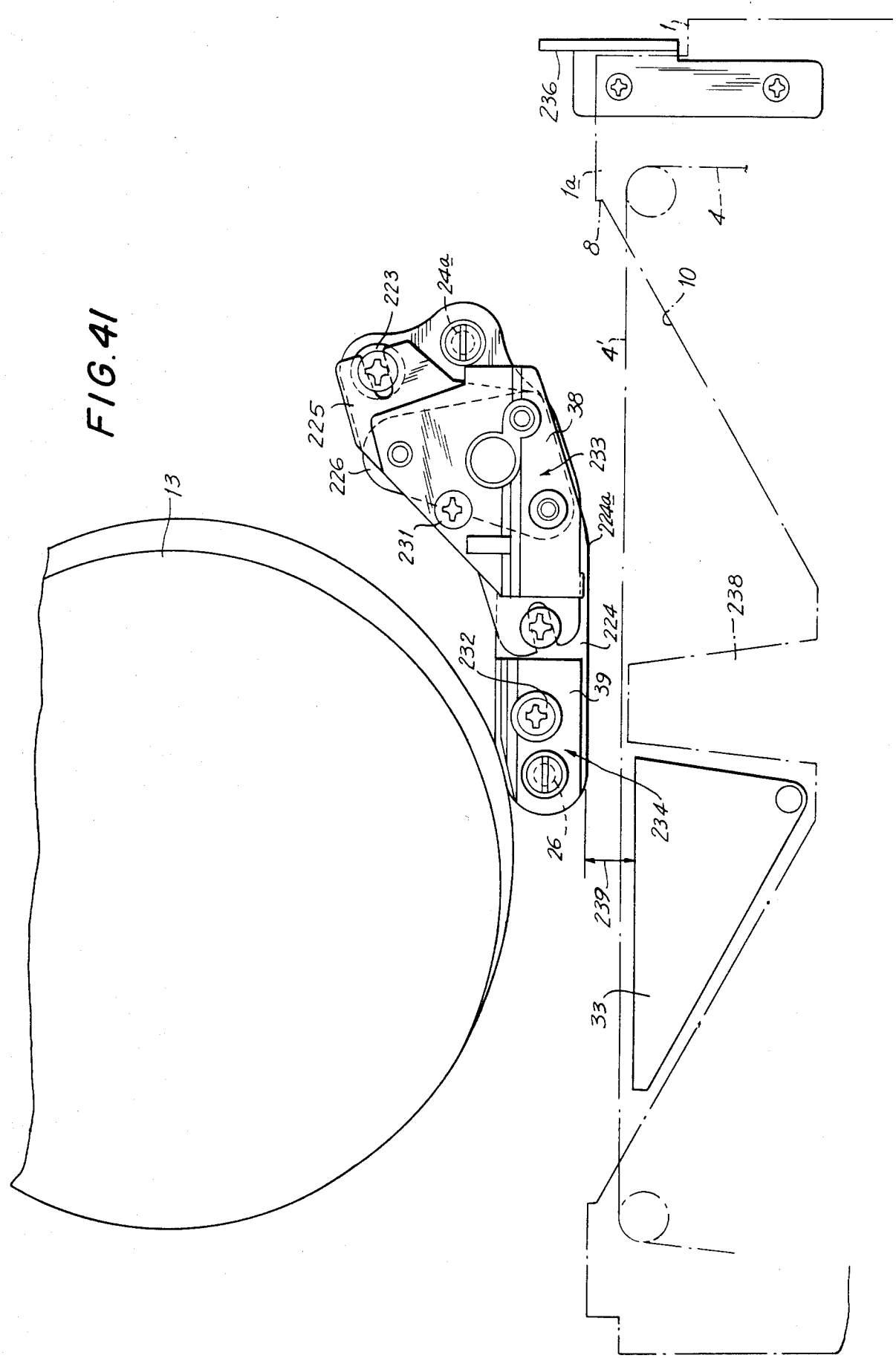
FIG. 41 is a plan view of a head shielding tape guiding assembly on which the tape is slidable upon opening of a cassette lid during movement of the cassette to its operative position.

Referring now to FIGS. 39 and 40, it will be seen that, in the illustrated embodiment of the invention, the driving unit 36 for driving both the feed side loading unit 14 and the take up side loading unit 15 includes driving gears 211 and 212 which are suitably rotatably mounted on chassis 5 between ring 51 and movable base 157, and which respectively mesh with and drive the peripheral gear 53 of ring 51 and the rack 168 on upper slide plate 159. A pinion 213 is rotatable coaxially with gear 211 and meshes with an idler gear 214 which is integral, or rotatably coupled with a coaxial gear 215 meshing with gear 212. Gears 213, 214 and 215 provide a reduction gearing for transmitting the rotation of driving gear 211 to driving gear 212. A reversible electric motor 216 is mounted on chassis 5 and has its shaft 217 rotatably coupled by a belt and pully transmission 219 with an idler shaft 220a which is, in turn, rotatably coupled through a reduction gear transmission 220 with a drive shaft 220b. Finally, a gear 218 secured on drive shaft 220b meshes with gear 211.

It will be apparent that, when motor 216 is operated, gear 218 is driven in one direction or the other by way of belt and pully transmission 219 and gear transmission 220 so that driving gear 211 is driven in mesh with gear 53 on ring 51 for effecting a tape loading or unloading operation by feed side loading unit 14, while simultaneously the other driving gear 212 is driven at a reduced speed in mesh with gear 168 on movable base 157 for similarly effecting a tape loading or unloading operation of take-up side loading unit 15. More particularly, in response to forward rotation of motor 216, both gears 211 and 212 are rotated in the direction of arrows R on FIG. 40 so as to rotate ring 51 in the clockwise direction on FIG. 8 and, at the same time, to move base 157 in the direction of the arrow K on FIG. 30, whereby a tape loading operation is performed by units 14 and 15. It will be appreciated from a consideration of FIG. 1 that, in the course of a tape loading operation, the tape guiding elements 16 and 17 of feed side loading unit 14 move a substantially greater distance from their initial positions to their operative positions than do the tape guiding element 20 and pinch roller 21 of take-up side loading unit 15. Therefore, driving gear 211 is rotated at a substantially greater speed than driving gear 212, for example, gears 213-215 may provide a 4:1 reduction ratio from gear 211 to gear 212 so that ring 51 is moved at a speed four times the speed of movement of movable base 157. The completion of the tape loading operation is detected by detecting switch 137 (FIG. 27) which is effective to halt the operation of motor 216.

When it is desired to provide a tape unloading operation, motor 216 is operated in the reverse direction so that driving gears 211 and 212 are both rotated in the direction of arrows S on FIG. 40, with the result that ring 51 is turned in the counterclockwise direction as viewed on FIG. 8 and, at the same time, movable base 157 is moved in the direction of the arrow J on FIG. 30, thereby to cause tape unloading operation by units 14 and 15.

The completion of a tape unloading operation is detected by switch 147 (FIG. 28). Preferably, when movable base portion 56 of feed side loading unit 14 has been moved back in the direction of the arrow H to the position where its protuberance 154 acts on detecting lever 144 to turn ON detecting switch 147, the operation of motor 216 in the reverse direction is continued. However, when the protuberance reaches the position shown in broken lines at 154'', that is, when detecting switch 147 is turned OFF after having been first turned ON, the direction of rotation of motor 216 is changed over from reverse to forward, so that movable base portion 56 is now moved in the direction of the arrow I. When the protuberance 154 again reaches the position shown in full lines on FIG. 28, and at which protuberance 154 acts on lever 144 to again turn ON switch 147, the operation of motor 216 is halted. It will be appreciated that the foregoing operations of motor 216 can be achieved with a suitable control circuit (not shown) which is triggered when switch 147 is first turned ON during reverse operation of motor 216, so as to cause change-over of motor 216 to forward operation a predetermined time thereafter, and which finally halts the operation of motor 216 the next time switch 147 is turned ON, with the driving circuit for motor 216 then remaining in the condition for forward operation of the motor. Of course, at the completion of the tape unloading operation, movable base 157 of the take-up side loading unit 15 also undergoes a very small movement, for example, of three or four mm, beyond its original position in the reverse direction, and then a corresponding small movement in the forward direction to its original position.

Referring now to FIGS. 41–44, it will be seen that a substantially horizontal supporting plate 224 is mounted on the upper ends of tape guides 24a and 26 and of a support rod 223 which extends upwardly from chassis 5. At one end portion of supporting plate 224, a head mounting plate 225 is mounted thereon so as to be adjustable in the horizontal direction. The audio erase head 28 and the combined audio and CTL recording and reproducing head 29 are suspended from head mounting plate 225 by way of a head adjusting plate 226 so as to permit adjustment of the height and azimuth of the heads 28 and 29. The head shielding tape guides 38 and 39 formed, for example, of a sythetic resin, are respectively attached to the upper portion of head mounting plate 225 and to the upper portion of supporting plate 224 in the vicinity of tape guide 26. Dowels 227 and 228 projecting integrally from the lower surfaces of guides 38 and 39 are engaged in holes 229 and 230 formed in head mounting plate 225 and in supporting plate 224, respectively, for positioning guides 38 and 39 which are then secured by means of screws 231 and 232. At the sides of guides 38 and 39 which face toward the operatively positioned cassette 1, guides 38 and 39 are formed with inclined faces 233 and 234, respectively, down which the tape 4 can slide. The lower edges or margins of these inclined faces 233 and 234 are either flush with, or overhang the edge 224a at the corresponding side of supporting plate 224. A plurality of holes 235 are formed vertically in guides 38 and 39 to permit tools, such as a screw driver or the like, to be inserted therein for effecting various adjustments of heads 28 and 29 and of tape guide 26 following the mounting of guides 38 and 39.

Figure 43:
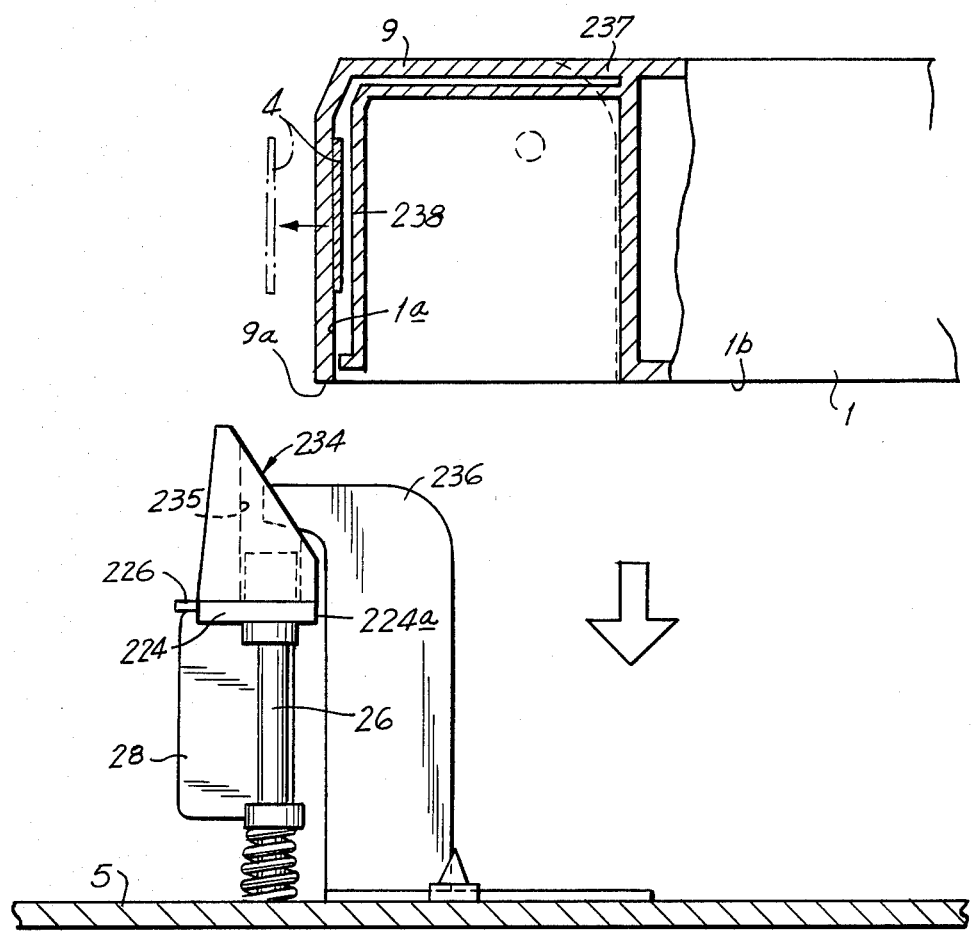

When a cassette 1 is brought down horizontally to its loaded or operative position, as known heretofore, the lower edge 9a of its lid 9 is brought into contact, at one side of the lid, with a lid raising element 236 which is suitably mounted on chassis 5, as shown in FIG. 43. Therefore, in the course of the downward movement of cassette 1, element 236 raises lid 9 to its opened position, as shown on FIG. 44. It will be appreciated that the lid 9 is at least partially opened before the downward movement of cassette 1 to its operative or loaded position is completed so that, if the tape run 4' indicated in broken lines on FIG. 1 is loose, the inherent elasticity of the tape will cause the latter to be urged against the inner surface of lid 9 and, as the lid 9 is opened to a certain extent, the tape 4 may spring out through the front opening 8 of the cassette. In the absence of guides 38 and 39, if the tape 4 springs out of cassette 1 before the movement of the latter to its loaded or operative position is completed, the tape may become entangled with the heads 28 and 29 or guide 26 with serious damage to the tape resulting therefrom.

However, by reason of the presence of guides 38 and 39, if the tape 4 springs from the opening 8 of a cassette 1 during the opening of lid 9 in response to the downward movement of the cassette to its operative or loaded position, such accidentally released tape will slide down the inclined faces 233 and 234 and be pushed back toward cassette 1. Thus, even if the tape accidentally springs out of cassette 1, the entangling of the tape with heads 28 and 29 or tape guide 26 is avoided to prevent damage to the tape. Furthermore, as is known and shown on FIGS. 43 and 44, a tape presser 238 of substantially inverted L-shaped cross section is formed integrally with the body or housing 237 of cassette 1 so as to be disposed inside front lid 9 with the tape 4 therebetween in the closed position of the lid. Therefore, if at the time of the cassette loading operation the tape 4 is deflected back toward cassette 1 by guides 38 and 39, such deflected tape will abut against tape presser 238 and thereby be prevented from moving too deeply into cassette 1. Consequently, as a cassette 1 is moved horizontally downward to its loaded or operative position, the run 4' of tape 4 is inserted safely and smoothly into a very narrow gap, for example, as indicated at 239 on FIG. 41, defined between the rising motion guide 33 and the tape guide 26. Further, the presence of the guides 38 and 39 for slidably guiding the tape 4 during the loading of the cassette 1 makes it possible to make relatively small the gap $l_2$ (FIG. 2) between the front face 1a of the loaded or operatively positioned cassette 1 and the drum 13.

Figure 46:
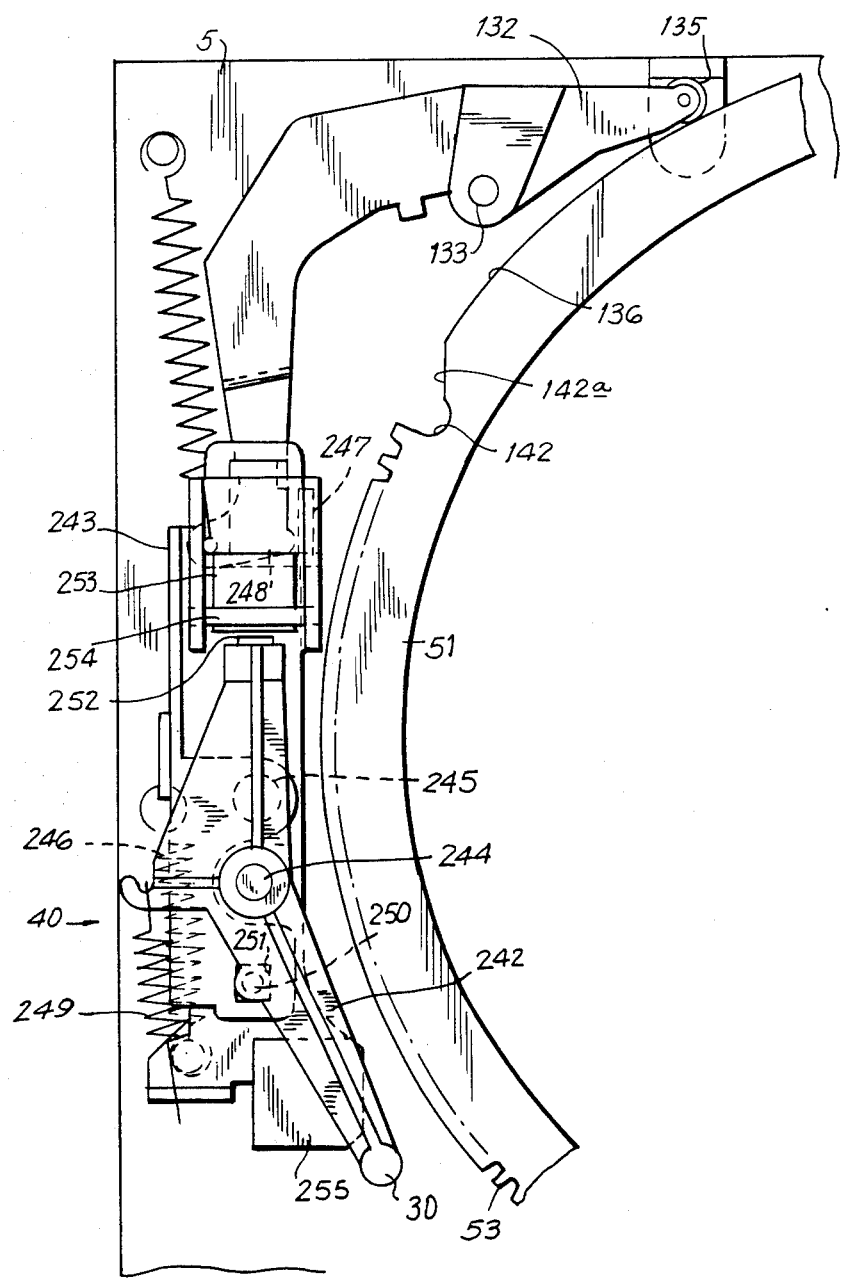
FIGS. 46 and 47 are plan views of the tension detecting unit when the tape loading apparatus according to this invention is in other than its fully tape loaded condition, and in such fully tape loaded condition, respectively.
Figure 47:
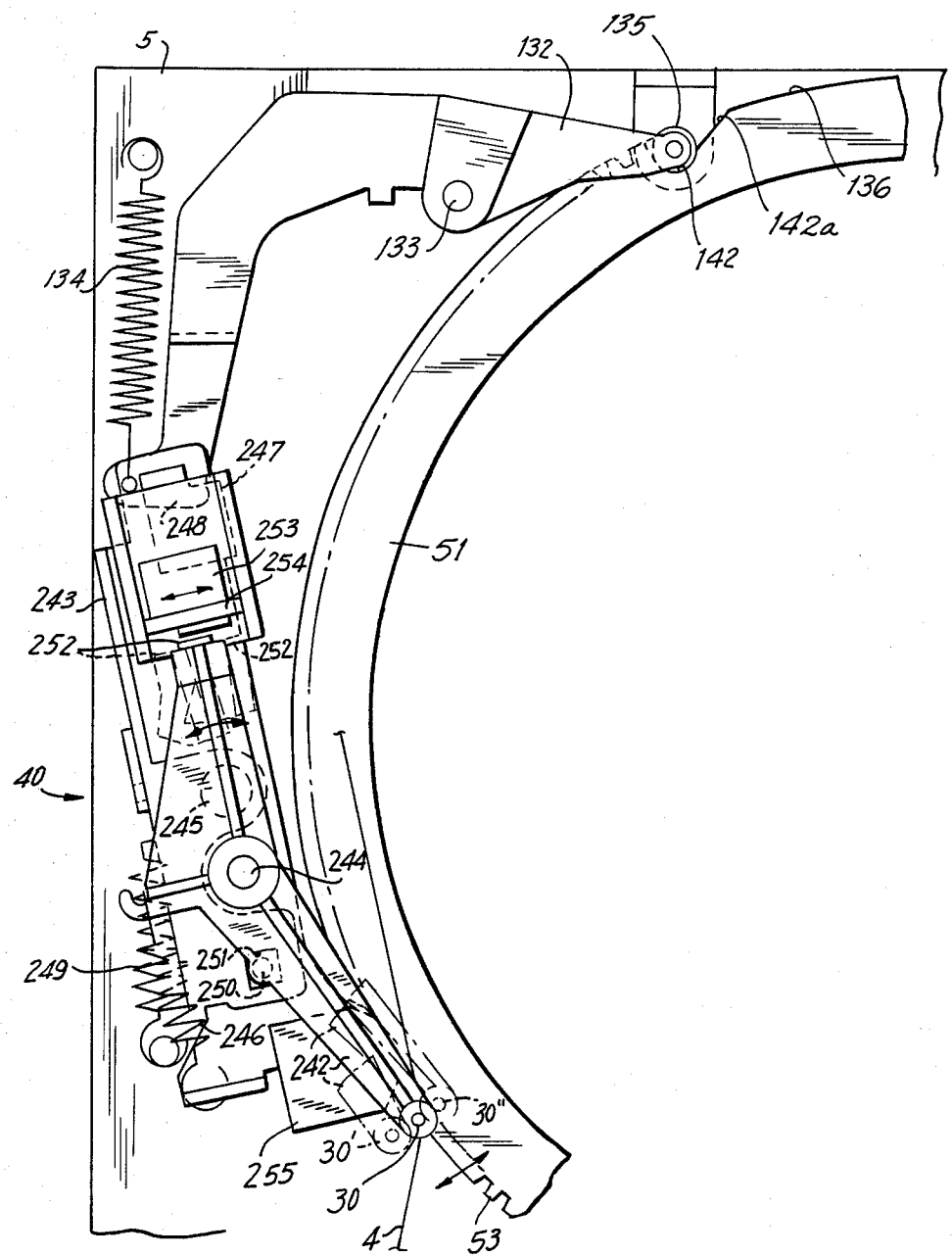

Referring now to FIGS. 45-47, it will be seen that the tension detector 40 includes a tension detecting lever 242 pivotally mounted intermediate its ends on a movable base 243 by means of a vertical pivot pin 244, and having the tension detecting pin 30 depending from one end of lever 242. Movable base 243 is pivotally mounted on a vertical pivot pin 245 which is mounted on chassis 5 and is offset relative to pivot pin 244. Base 243 is biased in the counterclockwise direction, as viewed on FIG. 46, by means of a helical tension spring 246 which extends between a tab 246a struck from movable base 243 and an anchor pin 246b secured to chassis 5 (FIG. 45). A projection 247 at one side of one end of movable base 243 adjacent the bottom of the latter is adapted to abut against an end portion 248 of the lever 132 which detects the completion of a loading operation. Thus, when drive ring 51 is in any position other than that corresponding to the completion of a tape loading operation, for example, as on FIG. 46, roller 135 rides on the periphery 136 of ring 51 and the resulting position of lever 132 causes its end portion 248 to act against projection or abutment 247 for angularly displacing movable base 243 in the clockwise direction to the position shown on FIG. 46 against the force of spring 246. However, at the completion of a tape loading operation, at which time roller 135 on lever 132 engages in recess 142 of ring 51, as on FIG. 47, end portion 248 of lever 132 moves away from projection or abutment 247 and spring 246 angularly displaces movable base 243 to the position shown on FIG. 47. The tension detecting lever 242 is pivotally biased in the counterclockwise direction, as viewed on FIG. 46, with respect to movable base 243 by means of a helical tension spring 249 stretched between detecting lever 242 and movable base 243. A pin 250 depending from tension detecting lever 242 is loosely engaged in a hole 251 formed in movable base 243 for limiting the angular range of displacement of detecting lever 242 relative to movable base 243. The spring 249 is designed to be much weaker than the spring 246.

The end of tension detecting lever 242 remote from pin 30 carries a permanent magnet 252 which is in close proximity to a magneto-resistance sensor 253 provided on a printed circuit board 254 carried by the adjacent end portion of movable base 243. The opposite end portion of movable base 243 carries a balancer 255 for balancing the magneto-resistance sensor 253.

In the VTR to which the tape loading apparatus according to this invention is shown applied, the reel mounts 6 and 7 are driven directly by respective independently controlled motors (not shown), that is, the rotating shaft of each reel mount is integral with the respective motor shaft. The tension detector 40 is intended to electrically detect the tension in the tape 4 between the supply or feed reel 2 and drum 13 while the tape is being driven at a substantially constant speed in the recording or reproducing mode of the VTR. When a change in the tape tension is detected, tension detector 40 correspondingly controls the rotational speed of the motor associated with feed reel mount 6 for thereby maintaining the back tension of the tape at a constant value.

In the unloaded condition of the apparatus according to this invention, that is, at the completion of a tape unloading operation thereof, detector 40 is in the condition shown on FIG. 46. As previously noted, in such condition, roller 135 of lever 132 engages the outer peripheral surface 136 of ring 51 so that projection 247 of movable base 243 is displaced by end portion 248 of lever 132 for pivoting movable base 243 in the clockwise direction against the force of spring 246. Thus, tension detecting lever 242 is maintained in a stand-by or non-operative position in which the depending tension detecting pin 30 is spaced sufficiently from the loading path of tape 4 so as to avoid any interference with the loading operation by feed side loading unit 14.

Upon the completion of the loading operation, tension detector 40 assumes the condition shown on FIG. 47, that is, roller 135 on lever 132 enters detent 142 and, as a result, spring 246 can pivot movable base 243 in the counterclockwise direction and tension detecting lever 242 is moved to its operative position shown in full lines on FIG. 7, and in which tension detecting pin 30 is brought into contact with tape 4 between guide pin 1b in cassette 1 and tape guiding element 19.

In such operative state of tension detector 40, as tape 4 is moved longitudinally at a constant speed in the recording or reproducing mode of the VTR, tension detecting pin 30 is moved within the range indicated between the positions of the pin shown in broken lines at 30' and 30" in accordance with changes in the tape tension. More particularly, as the tape tension is reduced, lever 242 is pivoted counterclockwise by spring 249 and pin 30 is thereby moved to the position indicated at 30". Conversely, if the tape tension is increased, tension detecting lever 242 is pivoted in the clockwise direction against the force of spring 249 and tension detecting pin 30 is thereby moved to the position indicated at 30'. It will be appreciated that the described pivotal movements of tension detecting lever 242 relative to base 243 will cause corresponding movements of magnet 252 in respect to magneto-resistance sensor 253, with the result that the extent of the pivotal movement of tension detecting lever 242, and hence the change in tape tension, is electrically detected by sensor 253. As earlier noted, the rotational speed of the driving motor for the feed reel mount 6 is controlled on the basis of an output of magneto-resistance sensor 253 so as to maintain a constant tension in the tape.

As also earlier noted, at the commencement of a tape unloading operation, roller 135 rolls up the inclined ramp 142a onto the outer periphery 136 of ring 51, whereby lever 132 is returned to the position shown on FIG. 46 for causing pivoting of movable base 243 in the clockwise direction and thereby causing tension detecting lever 242 to assume its stand-by or non-operative position where pin 30 is substantially disengaged from the tape for avoiding any interference with the tape unloading operation.

It will be seen that, in the above described tension detector 40, it is possible to provide a large angular movement of tension detecting lever 242 between its inoperative or stand-by position (FIG. 46) and its operative position (FIG. 47), so as to ensure that tension detector 40 will not interfere, in any way, with the tape loading or unloading operations. However, such large angular displacements of lever 242 between its inoperative and operative positions does not involve correspondingly large displacements of magnet 252 relative to magneto-resistance sensor 253. Therefore, with tension detecting lever 242 disposed in its operative positions as a result of movement of base 243 to its operative position, variations in the tension in the tape 4 engaged withpin 30 cause correspondingly small displacements of magnet 252 relative to sensor 253 so that the tape tension variations can be very accurately sensed or detected. Thus, the described arrangement of tension detector 40 accommodates the desirably high sensitivity of magneto-resistance sensor 253 which can correctly and accurately detect the amount of movement of magnet 252 relative to sensor 253 only when such movement is within a relatively small range.

Figure 48:
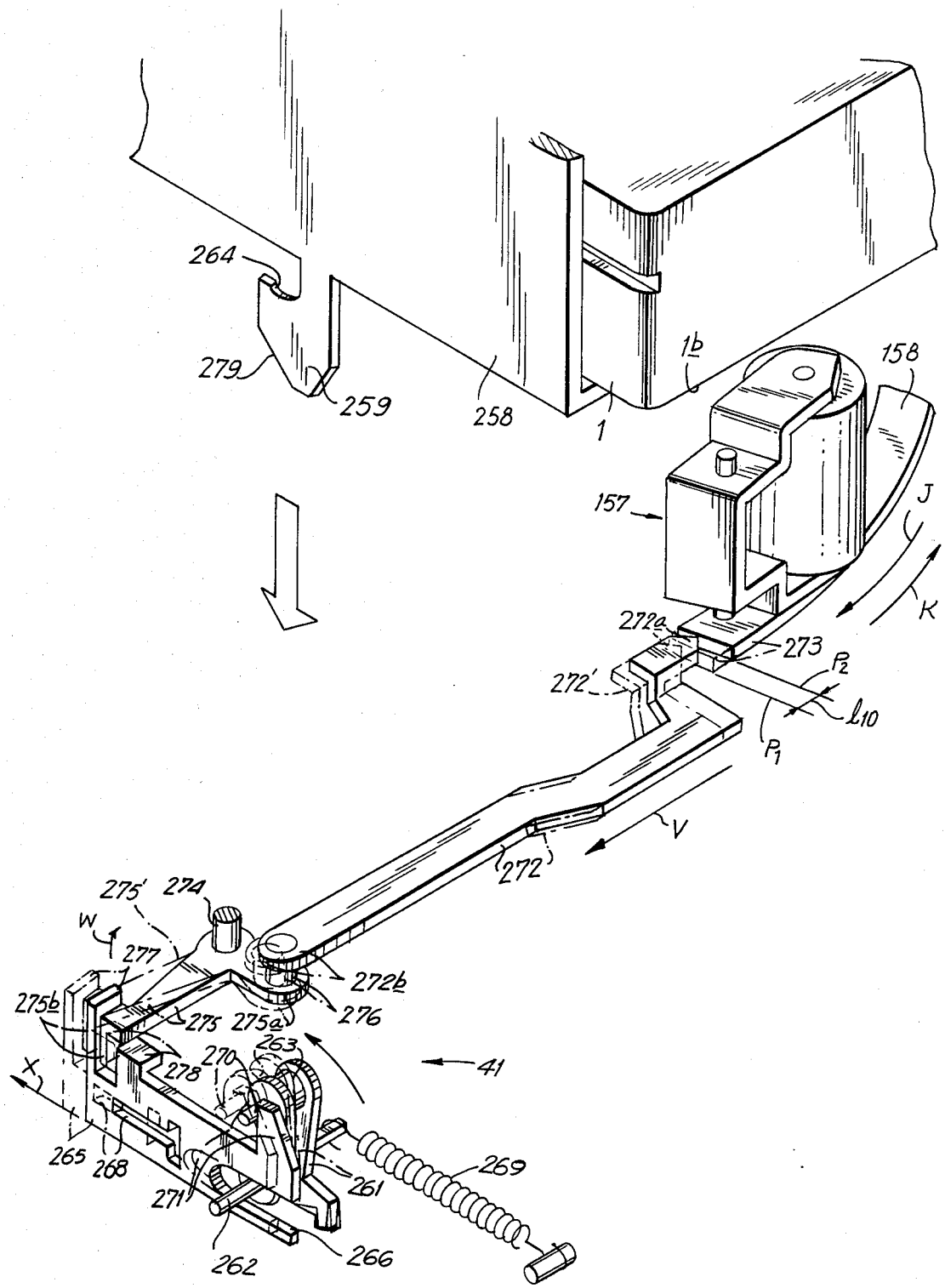
FIG. 48 is a perspective view of a cassette holder locking unit included in the VTR having a tape loading apparatus according to this invention.

Referring now to FIGS. 48–50, it will be seen that, as is well known, a cassette 1 to be employed in the VTR is inserted into a cassette holder 258 in an elevated position of the latter, whereupon the holder 258 is moved downwardly, while being maintained horizontally, for moving the cassette 1 therein onto reel mounts 6 and 7 from above. As shown, a substantially hook-shaped keeper 259 depends from one side of cassette holder 258 and, during the downward movement of cassette holder 258 to its operative position, keeper 259 extends downwardly through an opening 260 in chassis 5 (FIGS. 49 and 50). The keeper 259 forms part of the cassette holder locking unit 41 which further includes a latching lever 261 pivotally mounted, at its lower end, on a pivot shaft 262 which is suitably carried by chassis 5. A latching roller 263 is rotatably mounted on a shaft 270 carried by the upper end portion of latching lever 261 and is adapted to engage in a recess 264 of keeper 259 when locking unit 41 is in its engaged condition (FIG. 49). A slide plate 265 is mounted for longitudinal sliding along the inner surface of an adjacent side wall of chassis 5, for example, by means of an elongated slot 266 in slide plate 265 which slidably receives pivot shaft 262 extending from such side wall of the chassis, and further by means of a projection 267 extending from the side wall of the chassis and engaged in another elongated slot 268 in slide plate 265. Latching lever 261 is urged to pivot in the counterclockwise direction, as viewed on FIG. 49, by a helical tension spring 269 connected between lever 261 and chassis 5. One end of shaft 270 is engagable by a projection of 271 extending upwardly from an end portion of slide plate 265 for restricting the counterclockwise pivoting of lever 261 by spring 269. Sliding of plate 265 toward the left, as viewed on FIG. 49, under the influence of spring 269 acting on lever 261 is limited by the engagement of one end of elongated aperture 268 with the guiding projection 267.

As shown particularly on FIG. 48, an elongated slide 272 extends laterally under chassis 5 and is slidably mounted in respect to the latter. Slide 272 has one end 272a extending adjacent to the original or initial position of movable base 157 for engagement by an end 273 for lower slide plate 158. The opposite end 272b of slide 272 is connected by a pivot pin 276 with one arm 275a of a bell crank 275. The bell crank 275 is mounted, between its arms 275a and 275b, on a pivot pin 274 carried by chassis 5 for swinging in a horizontal plane below the chassis. The free end portion of arm 275b of the bell crank 275 is accommodated between spaced projections 277 and 278 and projecting upwardly from the end portion of slide plate 265 remote from projection 271.

The cassette holder locking unit 41 operates as follows:

Starting with cassette holder 258 in its elevated or cassette-receiving position and with loading units 14 and 15 in their initial positions indicated at 14' and 15' on FIG. 1, it will be seen that latch lever 261 and slide plate 265 occupy the positions shown in full lines on FIGS. 48 and 49. When a cassette 1 is inserted in the elevated holder 258 and the latter is moved downwardly to its operative position, an inclined edge 279 on keeper 259 acts against roller 263 to temporarily angularly displace lever 261 in the clockwise direction, as viewed on FIG. 49, until keeper 259 is disposed under roller 263, whereupon spring 269 is operative to return lever 261 in the counterclockwise direction for engaging roller 263 in recess 264, as shown in full lines on FIG. 49. With roller 263 thus engaged in recess 264 of keeper 259, cassette holder 258 with a cassette therein is locked in its operative position.

In response to movement of cassette holder 258 to its lowered or operative position, a suitable detecting switch (not shown) mounted on chassis 5 may be turned ON for automatically initiating a tape loading operation of the apparatus according to this invention. On the other hand, actuation of an eject push-button (not shown) may be effective to initiate a tape unloading operation of the apparatus.

At the completion of the tape unloading operation, movable base 157 of take-up side loading unit 15 moves in the direction of the arrow J on FIG. 48 to the position indicated at $P_1$, at which position end 273 of lower slide plate 158 abuts against the adjacent end 272a of slide 272 and pushes the latter longitudinally in the direction of the arrow V to the position indicated in broken lines at 272'. As a result of the foregoing, bell crank 275 is angularly displaced in the direction of the arrow W to the position indicated in broken lines at 275' on FIG. 48, which causes slide plate 265 to be longitudinally displaced in the direction of the arrow X to the position shown in full lines on FIG. 50. Such longitudinal displacement of plate 265 causes its projection 271 to act against shaft 270 for pivoting lever 261 in the direction of the arrow T, whereby roller 263 is disengaged from recess 264 of keeper 259 for unlocking cassette holder 258. Upon unlocking of cassette holder 258, the latter is returned upwardly to its elevated position at which the cassette 1 is ejected from the holder, as is well known.

Immediately after roller 263 has been disengaged from recess 264 to release keeper 259 and permit the initiation of upward movement of holder 258, movable base 157 of loading unit 15 is moved in the direction of the arrow K on FIG. 48 through a small distance $1_{10}$, for example, of 3–4 mm, as previously described, before finally coming to rest in its initial or stop position $P_2$. When movable base 157 comes to rest at the position $P_2$, slide 272, bell crank 275 and slide plate 265 are all free to be returned to the positions shown in full lines on FIG. 48, and spring 269 is effective to return lever 261 and roller 263 in the direction of the arrow U on FIG. 50 to the positions indicated in broken lines. With roller 263 and latch lever 261 thus positioned, locking device 41 is again in condition to lock holder 258 when the latter is again lowered to its operative position. It will be appreciated from the foregoing, that the releasing of cassette holder locking unit 41 and the return thereof to its operative condition are made responsive to movements of the movable base 157 of loading unit 15 through a relatively simple mechanism constituted by slide plate 265, bell crank 275 and slide 272.

Figure 51:
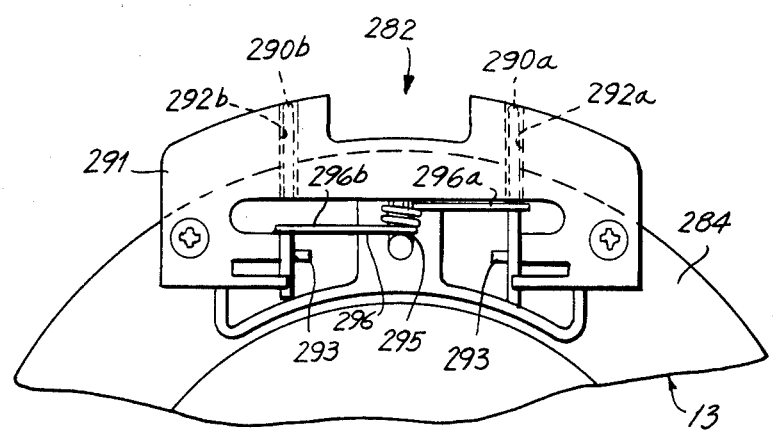
FIG. 51 is a plan view of a tape pressing unit mounted on a guide drum of the VTR having a tape loading apparatus according to this invention.
Figure 52:
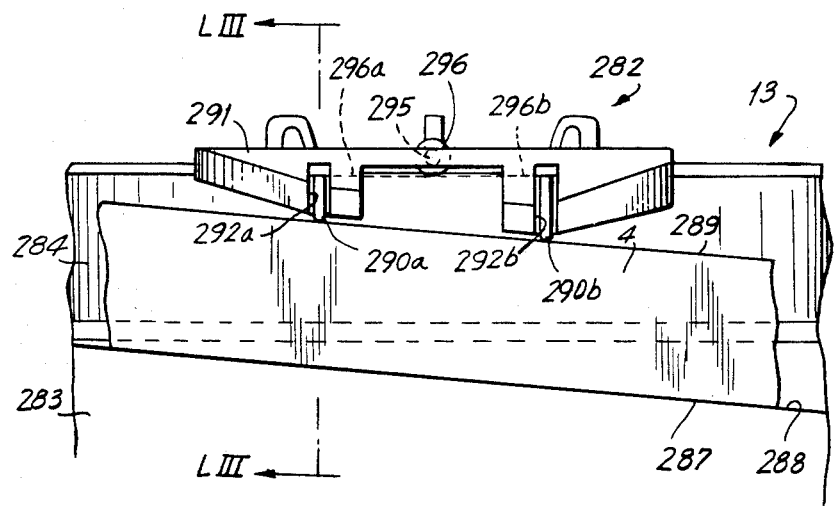
FIG. 52 is a front view of the tape pressing unit of FIG. 51, and showing how the same maintains the tape in contact with a guiding ledge on the drum.
Figure 53:
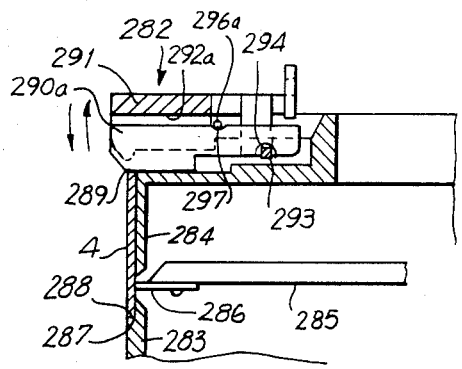
FIG. 53 is a sectional view taken along the line LIII—LIII on FIG. 52.

Referring now to FIGS. 51–53, it will be seen that the guide drum 13 of a VTR provided with a tape loading apparatus according to this invention desirably has a tape pressing unit 282 mounted thereon. As is well known, drum 13 may include a lower stationary drum portion 283, an upper stationary drum portion 284 and an intermediate rotary drum portion 285 having a rotary magnetic head 286 attached to its peripheral surface to extend outwardly through a circumferential gap between the stationary drum portions 283 and 284 for recording or reproducing video signals on the tape 4 when the latter is wrapped or wound helically about the periphery of drum 13. In order to precisely establish the helical path of the tape 4 on the peripheral surface of drum 13, lower stationary drum portion 282 is provided, on its outer peripheral surface, with an inclined guiding ledge 288 against which the lower longitudinal edge 287 of tape 4 is urged by the downward pressing action of unit 282 on the upper longitudinal edge 289 of the tape.

The illustrated tape pressing unit 282 is shown to comprise a pair of tape pressing elements 290a and 290b which are desirably molded from a suitable synthetic resin, and which are accommodated in respective slits 292a and 292b of a holder 291 fixed on top of upper stationary drum portion 284 so that outer end portions of elements 290a and 290b project over edge 289 of the tape wrapped on drum 13. Holder 291 is formed with internal ridges 293 which are received in corresponding recesses 294 provided in the lower edges of pressing elements 290a and 290b adjacent the inner ends of the latter, and such ridges 293 define fulcrums about which tape pressing elements 290a and 290b can pivot in respective substantially vertical planes. A horizontal pin 295 is mounted within holder 291 at a location between pressing elements 290a and 290b and a torsion spring 296 is wound around such pin 295 and has legs 296a and 296b which are engaged, at their ends, in recesses 297 formed in the upper edges of elements 290a and 290b at locations spaced outwardly from recesses 294. The legs 296a and 296b of spring 296 act downwardly on pressing elements 290a and 290b so that the latter are pivotally biased in the counterclockwise direction, as viewed on FIG. 53. Further, as shown on FIG. 53, each of the pressing elements 290a and 290b has a beveled corner at the bottom of its outer end portion so that, when the tape 4 is being wrapped about the outer peripheral surface of drum 13 during a tape loading operation, the upper longitudinal edge 289 of the tape acts against such beveled corner of each of the pressing elements 290a and 290b for deflecting the latter upwardly and thereby ensuring that, at the conclusion of the tape loading operation, the lower edges of both pressing elements will engage, and act downwardly upon edge 289. It will be apparent that, thereafter, the pressing elements 290a and 290b will exert relatively light elastically applied pressures downwardly on tape edge 289 at locations spaced apart along the latter so that the lower longitudinal edge 287 of the tape will accurately conform to the guiding ledge 288, that is, will not float away from the latter, as the tape is being longitudinally advanced or driven during a recording or reproducing operation.

Figure 55:
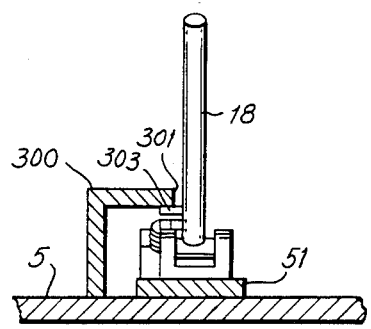
FIG. 55 is a sectional view taken along the line LV—LV on FIG. 54.
Figure 56:
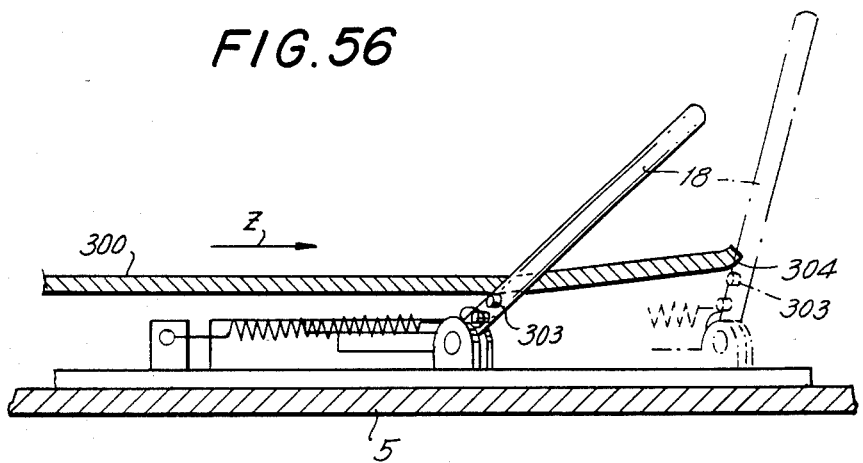
FIG. 56 is a sectional view taken along the line LVI—LVI on FIG. 54.
Figure 54:
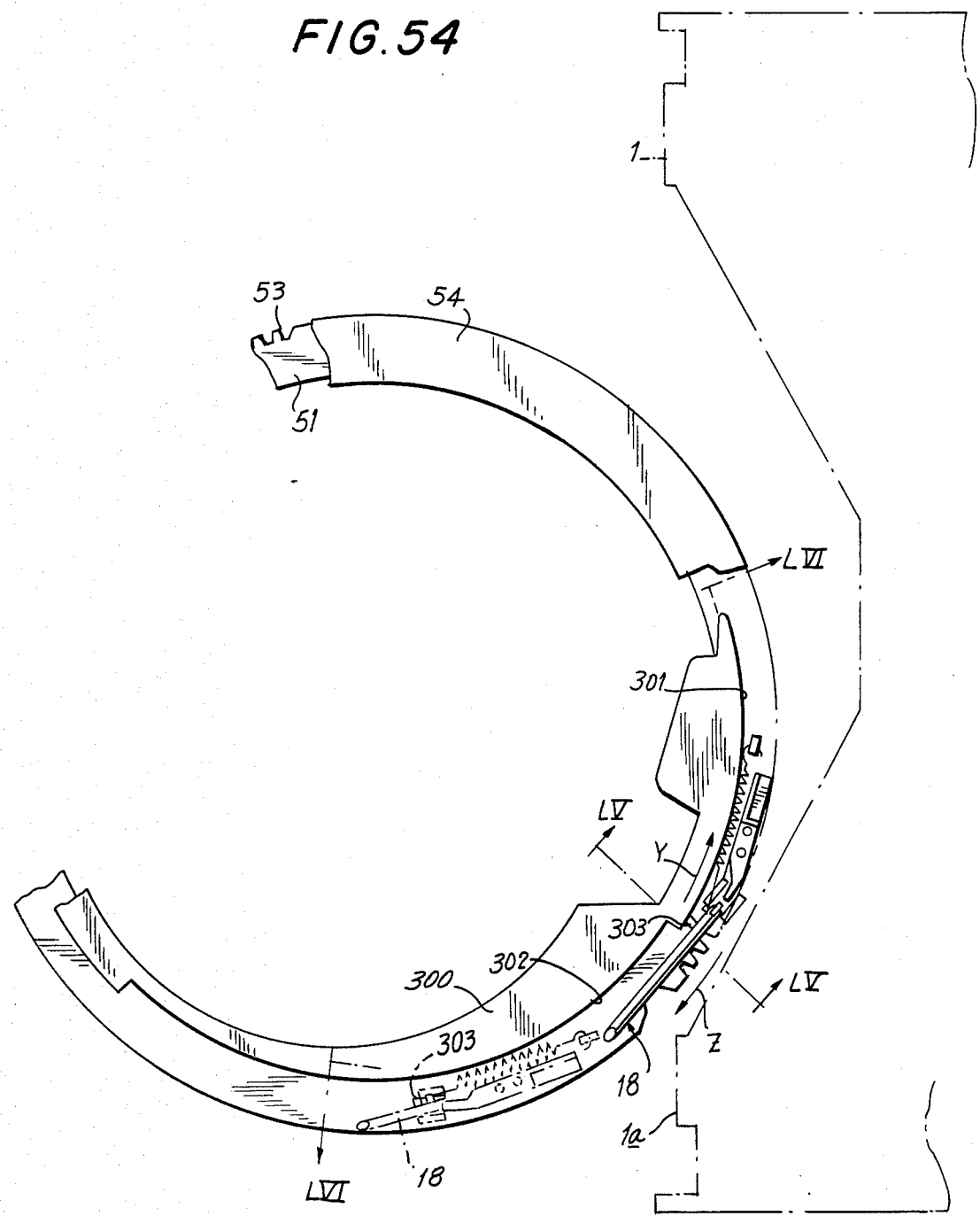
FIG. 54 is a plan view showing an additional arrangement for controlling the angular position of one of the collapsible tape guiding elements as the latter is moved toward its operative position.

Referring now to FIGS. 54–56, it will be seen that, in addition to the rising motion guide 33 and the guide depressing plate 54 for controlling the swinging movements of collapsible tape guiding elements 18 and 19 during tape loading and unloading operations, the apparatus according to this invention is further preferably provided with an arcuate guide plate 300 which is operative to control the rate at which guiding elements 18 and 19 rise when being drawn out of the cassette 1 while in engagement with the tape 4 in the course of a tape loading operation and, conversely, for controlling the rate at which tape guiding elements 18 and 19 are successively swung downwardly as the same enter the cassette 1 in the course of a tape unloading operation. More particularly, the arcuate guide plate 300, which may be suitably mounted under top wall 45 of track member 44, has an effective arcuate outer edge portion 301 formed along one end portion of guide plate 300, and being followed by an arcuate cut out 302. The edge portion 301 of guide plate 300 which extends radially outward beyond the edge of the latter defined by cut out 302 forms a cam surface which rises gradually in the direction of the arrow Z on FIGS. 54 and 56 to the end edge 304 at which cut out 302 commences. Each of tape guiding elements 18 and 19 has a follower pin 303 directed laterally therefrom so as to be engagable from below with the cam surface defined by edge portion 301 of plate 300.

In the course of a tape loading operation of the apparatus, during which drive ring 51 is turned in the direction of the arrow Z on FIG. 54, and as each of the tape guiding elements 18 and 19 exits from rising motion guide 33, the upward swinging motion of such guiding element by its respective spring 111 is controlled by the engagement of the respective follower pin 303 under edge portion 301 of guide plate 300. Due to the upward, gradual inclination of edge portion 301, each of guiding elements 18 and 19 is gradually raised as it moves out of cassette 1 in engagement with the tape 4 being withdrawn from the cassette. As the follower pin 303 of each of the guiding elements 18 and 19 moves out from under edge portion 301 at the end edge 304 thereof, such follower pin can move upwardly in cut out 302 and, therefore, the respective spring 111 can raise the guiding element 18 or 19 to the respective raised position, for example, as shown in broken lines on FIG. 26, and as determined by the engagement of stop 114 with spring 112. Thereafter, each of the guiding elements 18 and 19 is moved further in such raised state until attaining the respective operative position, as shown in full lines on FIG. 26, and at which the inclination of the guiding element 18 or 19 is determined by the respective positioning plate 34 or 35.

Conversely, in the course of a tape unloading operation during which ring 51 is turned in the direction of the arrow Y on FIG. 54, the follower pin 303 of each of the guiding elements 19 and 18, in succession, comes under edge portion 301 of guide plate 300 at the end edge 304, as shown on FIG. 56, and thereafter the downward inclination of such edge portion 301 causes gradual downward swinging of the guiding element 18 or 19 as the latter moves into the cassette 1 and is finally depressed by guide 33 and then by depressing plate 54.

It will be appreciated that the above described guide plate 300 represents a very simple structure by which the swinging movements of tape guiding elements 18 and 19 can be safely and smoothly controlled, particularly when moving out of and back into cassette 1 in the course of the tape loading and unloading operations, respectively.

Although it is believed that the operation of the tape loading apparatus according to this invention will be apparent from the earlier detailed descriptions of the several components thereof, the operation of the tape loading apparatus, as a whole, will be summarized as follows:

Starting with loading units 14 and 15 in their initial or inoperative positions, as indicated at 14′ and 15′ on FIG. 1, and assuming that the placement of a cassette 1 in holder 258 and the downward movement of the latter to its operative position will initiate operation of motor 216 in the direction for turning gears 211 and 212 in the direction of the arrows R on FIG. 40 for initiating the tape loading operation, as previously mentioned, drive ring 51 is thereby turned in the clockwise direction, as viewed on FIG. 8 with the result that connecting rod 89 pushes movable base 56 along track member 44. In the course of such movement of base 56 along track member 44, tape guiding elements 16 and 17 are moved from the original or initial positions indicated at 16′ and 17′ on FIG. 1, whereby the tape 4 is withdrawn from the feed side of cassette 1 and wrapped about drum 13, as shown in full lines on FIGS. 1-4. The described turning of ring 51 in the course of the loading operation further causes tape guiding elements 18 and 19, while in their collapsed or supine conditions, to pass under the tape 4 within cassette 1, and then to successively rise and engage the tape at the inside of the latter within the cassette, with such rising motion of elements 18 and 19 being determined by guides 33 and 300, and with the tape guiding elements 18 and 19 being finally moved to their respective operative positions shown in full lines on FIG. 1. In the course of such movements of tape guiding elements 16 and 17 to their operative positions, ring 51 is turned in a horizontal plane on chassis 5 while the movable base 56 carrying guiding elements 16 and 17 is moved along a curved path which is not parallel to the circular path of travel of ring 51, but rather is gradually raised along the inclination of top wall 45 of track member 44. During the tape loading operation, the driving force of ring 51 is transmitted to movable base 56 by way of spring 97 of connecting rod assembly 89 which accommodates the different paths of travel of ring 51 and of movable base 56 by relative actual movements of rod 90 and cylinder 91, and by pivoting of ball 101 in socket 102, at one end of the connecting rod assembly, and further by pivoting of projections 98 in circular seats 100 at the opposite end of rod assembly 89. By reason of the foregoing, connecting rod assembly 89 can effect extremely smooth movement of base 56 along the upwardly inclined portion of track member 44, while being driven from the ring 51 turning in a horizontal plane. It will be appreciated that the path of movement of movable base 56 on track member 44 can be selected independently of the horizontal path of movement of ring 51 so that the ring can be easily driven, while the path of the tape guiding elements 16 and 17 on movable base 56 achieves the optimum conditions for handling of the tape 4 during the loading operation. More particularly, the end portion 45a of the top wall 45 of track member 44 which is adjacent to the operatively positioned cassette 1 can be arranged horizontal, as previously described, so that the base 56 moves horizontally along such portion 45a with the result that tape guiding element 16 contacts the run 4′ of the tape in cassette 1 with the axis of guiding element 16 at right angles to the longitudinal median of the tape and parallel to the surface of the tape. By reason of such engagement of element 16 with the tape, the latter can be drawn out from cassette 1 extremely safely and smoothly, and the exertion of excess force on the tape 4, such as would result from twisting of the tape, can be avoided.

As tape guiding elements 16 and 17 near their operative positions shown in full lines on FIG. 1, movable base 56 rides onto guide plate 47 and inclined faces 85 of lower block 61 engage locking pin 86 to provide a wedge effect so that, in the final operative positions of guiding elements 16 and 17, the compressive force of spring 97 in connecting rod assembly 89 urges the protuberances 84a-84c tightly against the undersurface of guide plate 47 for stable positioning of guide elements 16 and 17.

Simultaneously with the arrival of tape guiding elements 16 and 17 at their operative positions, as described above, tape guiding elements 18 and 19 also attain their operative positions shown in full lines on FIG. 1 and are there securely positioned at predetermined angles by the respective positioning plates 34 and 35. Upon the described movements of tape guiding elements 16-19 to their respective operative positions, roller 135 on lever 132 engages in notch 142 of ring 51 for locking ring 51 in the corresponding position and for causing switch 137 to detect the end of the tape loading operation.

Upon the completion of the tape loading operation, the height adjusting unit 75 and the tilt adjusting unit 82 for tape guiding element 16 can be conveniently adjusted to ensure that the guiding element 16, in its operative position, has its axis at right angles to the longitudinal median of the tape and parallel to the surface of the tape which extends therefrom past the erasing head 27 and the guide 25 to the peripheral surface of drum 13.

Simultaneously with the turning of ring 51 by gear 211 for effecting the tape loading operation of feed side loading unit 14, gear 212 of drive unit 36, being rotated in the direction of the arrow R on FIG. 40, drives upper plate 159 of movable base 157 in the direction of arrow K on FIG. 30 for effecting the tape loading operation of take-up side loading unit 15. The movement of plate 159 in the direction of arrow K is transmitted through spring 166 to lower plate 158 which is correspondingly moved in the arcuate path lying in a horizontal plane and being determined by guides 160. Thus, tape guiding element 20 and pinch roller 21 are moved horizontally with lower plate 158 from their original positions indicated in broken lines at 20' and 21' on FIG. 1 to their operative positions shown in full lines on FIG. 1, whereby loading of the take-up side of the tape is effected. When tape guiding element 20 and pinch roller 21 attain their operative positions shown in full lines on FIG. 1, the conical head surface 180 of guide pin 161 engages the lower surface of inclined portion 183 of plate 181 to provide the wedge effect under the continued urging of spring 166, and by which movable base 157 is fixed and the tape guiding element 20 thereon is securely and stably located in its operative position. In such operative position of tape guiding element 20, its height adjusting unit 172 can be conveniently adjusted to ensure that its axis is at a predetermined angle perpendicular to the longitudinal median of the tape guided thereby and further is parallel to the face of the tape which extends thereto from the peripheral surface of drum 13 by way of guide 26, heads 28 and 29 and guide 24a.

Upon completion of the tape loading operation of unit 15, pinch roller 21 is disposed adjacent capstan 23 so that, upon energization of solenoid 202, pinch roller pressing unit 37 is effective to urge pinch roller 20 against capstan 23 with a predetermined contact pressure therebetween which is substantially uniform along the axial length of the pinch roller, and therefore across the width of the tape 4.

As earlier noted, actuation of an eject pushbutton (not shown) may be effective to initiate a tape unloading operation of the apparatus by causing motor 216 of drive unit 36 to operate in the direction for rotating gears 211 and 212 in the directions of the arrows S on FIG. 40. Such rotation of gear 211 causes turning of ring 51 in the counterclockwise direction, as viewed on FIG. 8, and connecting rod assembly 89 provides corresponding movement of movable base 56 from guide plate 47 along track member 44 so as to move tape guiding elements 16 and 17 back to their original or inoperative positions shown in broken lines at 16 and 17 on FIG. 1. The turning of ring 51 in the counterclockwise direction further causes tape guiding elements 18 and 19 to be returned to their respective original positions shown in broken lines at 18' and 19' on FIG. 1. In transmitting the movement of ring 51 to movable base 56 during the tape unloading operation, projections 93 on rod 90 are engaged against ends of the respective apertures 94 of cylinder 91 for directly transmitting the pull of rod 90 to cylinder 91. As movable base 56 moves along track member 44 and attains the horizontal end portion 45a of top wall 45, connecting rod assembly 89 is gradually returned from its inclined position, at the completion of the tape loading operation (FIG. 9), to its substantially horizontal position at the completion of the tape unloading operation (FIG. 10).

During the tape unloading operation of unit 14, tape guiding elements 19 and 18 are successively acted upon by guides 300 and 33 and by guide depressing plate 54 so that such guiding elements 18 and 19 are brought down to nearly horizontal positions against the force of the respective springs 111 and are maintained substantially supine under plate 54.

When the tape guiding elements 16–19 have reached their respective original positions indicated in broken lines at 16'–19' on FIG. 1, the unloading of the tape by unit 14 is completed and protuberance 154 acts on lever 144 so that the completion of unloading is detected by switch 147.

Simultaneously with the unloading operation of unit 14, the rotation of gear 212 in the direction of the arrow S on FIG. 40 causes movement of upper plate 159 of movable base 157 in the direction of the arrow J on FIG. 30. During such movement of upper plate 159, ends of slots 163 and 164 engage guide pins 161 and 162 to cause corresponding movement of lower plate 158 horizontally in the arcuate path defined by guides 160. Thus, tape guiding element 20 and pinch roller 21 are moved back to their original positions indicated in broken lines at 20' and 21' on FIG. 1, and at which the tape unloading operation of the take-up side unit 15 is also completed.

Since the driving unit 36 employs a single motor 216 for driving both loading units 14 and 15, it will be apparent that both of the loading units 14 and 15 are advanced or returned along their respective paths of motion, by forward or reverse rotation, respectively, of motor 216 in complete synchronism with each other so that the relative timing of the loading units 14 and 15 cannot be disturbed during successive loading and unloading operations.

It is also to be appreciated that, upon the completion of a loading operation, all of the tape guiding elements 16–20 of loading units 14 and 15 are accurately and securely positioned so that the tape 4 is securely guided without vibration thereof during a recording or reproducing operation to ensure the performance of such operations with a high degree of accuracy.

The fact that tape guiding elements 18 and 19 of feed side loading unit 14 are disposed nearly horizontally under depressing plate 54 in the completely unloaded state of the apparatus and, at the initial portion of a tape loading operation, such guiding elements 18 and 19 pass under the tape run 4' (FIG. 1) and then rise to engage the tape, makes it possible to provide a relatively small gap between the lower edge of tape run 4' in the operatively positioned cassette and the chassis 5, that is, the gap $h_1$ (FIG. 2) between the underside 1d of the operatively positioned cassette 1 and the chassis 5 can be quite small. Further, since tape guiding elements 18 and 19 are supine and drawn under depressing plate 54 in the completely unloaded state of the apparatus, only tape guiding elements 16, 17 and 20 and pinch roller 21 need to extend into the cutout 10 at the bottom of the operatively positioned cassette 1 at the time when the latter is moved downwardly to its operative position. Such tape guiding elements 16, 17 and 20 and pinch roller 21 can be reliably positioned so they do not strike against each other or come into accidental contact with the tape during the movement of the cassette to its operative position.

Since the movable base 56 carrying tape guiding elements 16 and 17 is only connected to drive ring 51 by means of the connecting rod assembly 89, and the tape guiding elements 18 and 19 are pivoted on ring 51 for swinging between their supine and erected positions, ring 51 can be simply rotated in a horizontal plane, while tape guiding elements 16 and 17 are moved along a predetermined inclined path which is most desirable for the tape loading operation and for the smooth transport of the loaded tape. Moreover, the path of movement of tape guiding elements 16 and 17 can be selected to minimize its maximum height $h_4$ (FIG. 2) above chassis 5 and to maintain such height approximately within the height $h_3$ necessary for the cassette 1 in its operative position which includes the height $h_2$ by which the cassette lid 9 projects above the remainder of the cassette in its opened position. Consequently, a VTR having a tape loading apparatus according to this invention may be provided with a very small height so as to constitute a so-called thin VTR.

It will also be appreciated that the operation of the take-up side loading unit 15 is simplified by reason of the fact that its base 157 is merely moved horizontally on the chassis 5. Since the range of movements of the base 57 is very small, the width $W_1$ (FIG. 4) of the tape loading apparatus according to this invention can be minimized, for example, so as to be completely within the width $W_2$ of the cassette 1 and, consequently, it is possible to provide a VTR whose width is very small.

Finally, by reason of the previously described arrangement and operation of the loading units 14 and 15 according to this invention, the overall dimension $l_1$ of the tape loading apparatus in the fore and aft direction, and the gap $l_2$ required between the front of the operatively positioned cassette 1 and the guide drum 13 may be relatively small so that it is also possible to provide a VTR having a very small dimension in the corresponding direction. In other words, a VTR having a tape loading apparatus according to this invention may be made very compact.

Although an embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A cassette-type tape recording and/or reproducing apparatus comprising:
   a tape guide drum with at least one rotary transducer moved in a circular path substantially coinciding with the circumference of said guide drum;
   holder means spaced from said guide drum for receiving a cassette containing a supply of tape wound on at least one spool and locating the cassette in an operative position at which a plane passing through the median of the tape on said spool in the cassette is inclined in respect to a plane of rotation of said rotary transducer;
   tape engaging means for withdrawing tape from a cassette in said operative position and wrapping the withdrawn tape about at least a portion of said circumference of the guide drum;
   means for guiding said tape engaging means in a path extending from a first position adjacent a cassette in said operative position to a second position spaced substantially from said first position and at which the engaged tape is wrapped about said circumference of the guide drum, with at least a portion of said path leading to said second position being inclined relative to said plane of rotation so that the tape wrapped on the circumference of the guide drum with said tape engaging means in said second position is arranged substantially helically in respect to the guide drum;
   driving means for effecting movements of said tape engaging means between said first and second positions, said driving means being movable in a plane substantially parallel to said plane passing through the median of the tape on said spool in the cassette at said operative position; and
   connecting means extending between said driving means and said tape engaging means and through which said driving means moving in said plane of movement thereof can effect movements of said tape engaging means in said path between said first and second positions.

2. A cassette-type tape recording and/or reproducing apparatus according to claim 1; in which said means for guiding the tape engaging means includes a track member extending from said first position to said second position; and said tape engaging means includes a base slidable on said track member, and at least a tape guiding element extending upwardly from said base.

3. A cassette-type tape recording and/or reproducing apparatus according to claim 2; in which said track member includes a portion extending from said first position and defining a respective portion of said path which lies in a plane parallel to said plane passing through the tape in the operatively positioned cassette.

4. A cassette-type tape recording and/or reproducing apparatus according to claim 2; in which said tape guiding element includes an upstanding shaft, means adjustably mounting said shaft on said base so as to permit adjustable tilting of the axis of said shaft relative to the base, a tape guiding roller rotatably mounted on said shaft, and means for adjusting the axial position of said roller on said shaft whereby, with said tape engaging means in said second position, adjustments of the tilting of said axis of the shaft and of the axial position of said roller on the shaft can ensure the smooth guiding of the tape by said roller.

5. A cassette-type tape recording and/or reproducing apparatus according to claim 2; further comprising clamping means acting on said base in said second position for stabilizing said tape guiding element thereat.

6. A cassette-type tape recording and/or reproducing apparatus according to claim 5; in which said base includes upper and lower relatively wide portions and a relatively narrow connecting portion therebetween; and said track member includes a curving wall having a slot extending longitudinally therealong which slidably accommodates said connecting portion of the base with said upper and lower base portions above and below said wall.

7. A cassette-type tape recording and/or reproducing apparatus according to claim 6; in which said body has ramp surfaces thereon which are inclined relative to the direction of slidable movement of said body along said slot; and said clamping means includes a wedging member fixed relative to said track member and engagable by said ramp surfaces of the body at said second position for exerting a wedging action of said body against said wall of the track member.

8. A cassette-type tape recording and/or reproducing apparatus according to claim 7; in which said lower base portion has protuberances extending therefrom at opposite sides of said connecting portion and being normally spaced from the underside of said wall of the track member when said upper base portion rests slidably on said wall; and in which said ramp surfaces are formed on said lower base portion and said wedging member is disposed below said wall so that said wedging action resulting from engagement of said wedging member with said ramp surfaces is effective to raise said protuberances into clamping engagement with the underside of said wall at opposite sides of said slot.

9. A cassette-type tape recording and/or reproducing apparatus according to claim 7; in which said connecting means includes spring means through which a driving force is transmitted from said driving means to said body for moving the latter to said second position and for maintaining said wedging action so long as said driving means is maintained at a position corresponding to said second position of the tape engaging means.

10. A cassette-type tape recording and/or reproducing apparatus according to claim 1; in which said connecting means includes relatively movable parts pivotally connected to said tape engaging means and said driving means, respectively, for accommodating changes in a distance between said path of the tape engaging means and said plane in which the driving means is movable, and spring means between said relatively movable parts and through which a driving force of said driving means is transmitted to said tape engaging means for movement of the latter from said first position to said second position.

11. A cassette-type tape recording and/or reproducing apparatus according to claim 10; in which said relatively movable parts are respectively constituted by an elongated cylinder and a rod axially slidable in said cylinder, and said spring means is interposed between said cylinder and said rod to yieldably resist retraction of the latter into the cylinder.

12. A cassette-type tape recording and/or reproducing apparatus according to claim 11; in which said connecting means further includes means for preventing axial removal of said rod from said cylinder when transmitting a driving force from said driving means to said tape engaging means for return movement of the latter from said second position to said first position.

13. A cassette-type tape recording and/or reproducing apparatus according to claim 1; further comprising a plurality of tape guiding elements mounted at spaced apart locations on said driving means for movement with the latter between initial positions corresponding to the disposition of said tape engaging means in said first position and operative positions corresponding to disposition of said tape engaging means in said second position, each of said tape guiding elements being individually movable relative to said driving means between a supine condition and a substantially erect condition, and guide means operable on said tape guiding elements for disposing each tape guiding element in said supine condition at said initial position, and for moving each of said tape guiding elements to said erect condition in moving with said driving means to said operative position of the respective tape guiding element.

14. A cassette-type tape recording and/or reproducing apparatus according to claim 13; further comprising locating means disposed at said operative positions of the tape guiding elements and engaging the latter, in the erect conditions thereof, for stabilizing the respective tape guiding elements in the operative positions thereof.

15. A cassette-type tape recording and/or reproducing apparatus according to claim 14; in which each of said tape guiding elements is in the form of an elongated pin pivoted at one end on said driving means for swinging between said supine and erect conditions, and said locating means includes, for each of said tape guiding elements, a fixedly disposed locating plate spaced upwardly from said driving means and having a notch to receive the upper end portion of the respective pin being moved in its erect condition to the respective operative position.

16. A cassette-type tape recording and/or reproducing apparatus according to claim 15; further comprising resilient means for urging each of said tape guiding elements to its erect condition, and elastic stop means yieldably limiting the swinging of each of said tape guiding elements in said erect condition, each of said locating plates engaging the upper end portion of the respective pin for stopping further movement of the upper end portion of the latter prior to the arrival of said tape engaging means in said second position, whereby each said tape guiding element, in said operative position thereof, is pivoted beyond its respective erected condition against the force of the respective elastic stop means.

17. A cassette-type tape recording and/or reproducing apparatus according to claim 14; in which said driving means includes a substantially circular drive ring turnable about the center thereof in said plane of movement of the driving means, with said tape guiding elements being pivoted on said ring so as to each extend generally tangentially thereon in said supine condition.

18. A cassette-type tape recording and/or reproducing apparatus according to claim 17; in which the cassette has an opening along the side thereof which is at the front of the cassette in said operative position of the latter, a cutout at the bottom of the cassette communicates with the front opening, a lid for normally closing the front opening is pivoted upwardly to an open position upon disposition of the cassette in said operative position of the latter, and a run of the tape in the cassette is guided to extend across said front opening of the cassette; and in which said tape engaging means, in said first position, extends upwardly in said cutout of the cassette so as to be disposed in back of said tape run, and said tape engaging means is moved through said front opening of the cassette in moving from said first position toward said second position for engaging said tape run and thereby withdrawing tape from the cassette.

19. A cassette-type tape recording and/or reproducing apparatus according to claim 18; further comprising a rising motion guide extending upwardly into said cutout of a cassette in said operative position of the latter and being engagable by said tape guiding elements, in succession, in the course of the movement of said tape guiding elements from their initial positions to said operative positions of the tape guiding elements for controlling the upward swinging movements of the tape guiding elements from said supine conditions thereof as the tape guiding elements move through said cutout and front opening of the operatively positioned cassette and engage the tape being withdrawn therefrom.

20. A cassette-type tape recording and/or reproducing apparatus according to claim 19; further comprising an arcuate guide plate positioned along the path of movement of said drive ring and being operative on each of said tape guiding elements, in succession, as the tape guiding elements move between the operatively positioned cassette and the operative positions of the tape guiding elements for achieving controlled gradual swinging movements of the tape guiding elements to and from said erect conditions thereof.

21. A cassette-type tape recording and/or reproducing apparatus according to claim 1; further comprising a rotated capstan engagable with the tape for driving the latter;

second tape engaging means for withdrawing tape from a cassette in said operative position and leading the withdrawn tape adjacent said capstan; and means for guiding said second tape engaging means in a path lying in a plane parallel with said plane of movement of said driving means and extending from a first position adjacent the cassette in said operative position of the latter to a second position spaced substantially from said first position of the second tape engaging means and at which the engaged tape is led adjacent said capstan;

said driving means being operative for effecting movements of said second tape engaging means between said first and second positions of the latter simultaneously with said movements of the first mentioned tape engaging means between said first and second positions of said first tape engaging means.

22. A cassette-type tape recording and/or reproducing apparatus according to claim 21; in which said second tape engaging means includes a movable base guided for movement in said path of the second tape engaging means, a tape guiding element extending upwardly from said base and being engagable with the tape withdrawn from the cassette, and a pinch roller also mounted on said base and being disposed adjacent said capstan with the tape therebetween in said second position of the second tape engaging means; and further comprising pressing means located adjacent said second position of said second tape engaging means and being operative on said pinch roller for pressing the latter against said rotated capstan so that the latter drive the tape therebetween.

23. A cassette-type tape recording and/or reproducing apparatus according to claim 22; in which said pinch roller is rotatable between upper and lower arms of a supporting lever which is pivoted on said base; and said pressing means includes upper and lower pressing rollers acting against said upper and lower arms, respectively, of the supporting lever so as to establish uniform contact pressure between said pinch roller and said capstan along the entire axial length of the pinch roller.

24. A cassette-type tape recording and/or reproducing apparatus according to claim 23; in which said pressing means further includes solenoid means energizable to cause said pressure rollers to act against the respective arms of said supporting lever, and toggle means operable, upon energizing of said solenoid means, for generating a relatively large pressure of said rollers against said supporting lever.

25. A cassette-type tape recording and/or reproducing apparatus according to claim 22; in which said base includes upper and lower slide plates guided for movement in said path of the second tape engaging means and being relatively movable in respect to each other to a limited extent in the direction along said path, said tape guiding element and pinch roller are mounted on said lower plate, said upper plate is driven by said driving means, and spring means are connected between said upper and lower plates for transmitting to said lower plate a driving force applied by said driving means to said upper plate in the direction for movement of said second tape engaging means from said first position to said second position thereof.

26. A cassette-type tape recording and/or reproducing apparatus according to claim 25; further comprising clamping means acting on said base in said second position of the second tape engaging means for stabilizing said tape guiding element thereof.

27. A cassette-type tape recording and/or reproducing apparatus according to claim 26; in which said clamping means includes a fixed plate positioned over said path of the base and having an inclined surface portion, and an element on said lower plate of the base slidably engagable against said inclined surface of the fixed plate to provide a wedging action for stabilizing said tape guiding element in said second position of the second tape engaging means, said spring means being loaded for maintaining said wedging action so long as said driving means is maintained at a position corresponding to said second positions of the first and second tape engaging means.

28. A cassette-type tape recording and/or reproducing apparatus according to claim 25; in which said driving means includes a substantially circular drive ring turnable about the center thereof in said plane of movement of the driving means, said connecting means is coupled to said first tape engaging means and to said drive ring, said drive ring and said upper plate of the base of said second tape engaging means having respective toothed peripheries, and said driving means further includes a single reversible electric motor and a gear transmission driven by said reversible electric motor and being in meshing engagement with the toothed peripheries of said drive ring and said upper plate so as to simultaneously move said first and second tape engaging means between the respective first and second positions thereof.

29. A cassette-type tape recording and/or reproducing apparatus according to claim 28; further comprising means for locking said drive ring in the position thereof corresponding to said second positions of said first and second tape engaging means, and means sensing said locking of the drive ring for indicating the completion of a tape loading operation.

30. A cassette-type tape recording and/or reproducing apparatus according to claim 28; further comprising tension detecting means operative upon the completion of a tape loading operation for detecting the tension in the tape between the cassette and the tape wrapped on the circumference of said guide drum.

31. A cassette-type tape recording and/or reproducing apparatus according to claim 28; further comprising means operable upon the return of said first tape engaging means to said first position thereof for detecting the completion of a tape unloading operation.

32. A cassette-type tape recording and/or reproducing apparatus according to claim 22; in which said holder means is movable downwardly to a lowered position for locating the cassette in said operative position thereof, and is returnable to an elevated position for ejection of a cassette from the holder means; and further comprising latch means for locking said holder means in said lowered position, and latch releasing means operative in response to the return of said base of the second tape engaging means from said second position of the latter to said first position thereof for permitting return of said holder means from said lowered position to said elevated position.

* * * * *